(12) United States Patent
Matsuki et al.

(10) Patent No.: US 9,917,377 B2
(45) Date of Patent: Mar. 13, 2018

(54) ANTENNA DEVICE AND ANTENNA EXCITATION METHOD

(71) Applicant: Mitsubishi Electric Corporation, Tokyo (JP)

(72) Inventors: Makoto Matsuki, Tokyo (JP); Kazunari Kihira, Tokyo (JP); Masataka Otsuka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/545,896

(22) PCT Filed: Feb. 1, 2016

(86) PCT No.: PCT/JP2016/052920
§ 371 (c)(1),
(2) Date: Jul. 24, 2017

(87) PCT Pub. No.: WO2016/125743
PCT Pub. Date: Aug. 11, 2016

(65) Prior Publication Data
US 2018/0019524 A1 Jan. 18, 2018

(30) Foreign Application Priority Data
Feb. 2, 2015 (JP) ................. 2015-018617

(51) Int. Cl.
*H01Q 25/02* (2006.01)
*H01Q 3/34* (2006.01)
(Continued)

(52) U.S. Cl.
CPC ............ *H01Q 25/02* (2013.01); *G01S 3/32* (2013.01); *G01S 13/44* (2013.01);
(Continued)

(58) Field of Classification Search
CPC .......... H01Q 25/02; H01Q 21/00; G01S 7/02; G01S 3/32; G01S 3/325; G01S 13/44;
(Continued)

(56) References Cited

U.S. PATENT DOCUMENTS

| 4,616,230 A * | 10/1986 | Antonucci | H01Q 25/02 342/152 |
| 4,713,666 A * | 12/1987 | Poux | G01S 13/4436 342/152 |
| 6,661,366 B2 * | 12/2003 | Yu | G01S 13/4409 342/13 |

FOREIGN PATENT DOCUMENTS

| JP | 58153404 A * | 9/1983 | ........... H01Q 25/02 |
| JP | S64-23183 A | 1/1989 | |

(Continued)

OTHER PUBLICATIONS

International Search Report issued in PCT/JP2016/052920; dated Feb. 23, 2016.

*Primary Examiner* — Gregory C. Issing
(74) *Attorney, Agent, or Firm* — Studebaker & Brackett PC

(57) ABSTRACT

Disclosed is an antenna device in which an excitation phase changing unit (4) for changing the excitation phases of element antennas ($2\text{-}1_n$) to ($2\text{-}8_n$) by controlling phase shifters ($3\text{-}1_n$) to ($3\text{-}8_n$) dependently on preset phase values is disposed, and every time the excitation phases are changed by the excitation phase changing unit (4), a radiation pattern forming unit (12) shifts the phases of a sum signal and a difference signal, and forms a monopulse sum pattern by time-integrating the sum signal after phase shift and also forms a monopulse difference pattern by time-integrating the difference signal after phase shift.

14 Claims, 23 Drawing Sheets

(51) Int. Cl.
  *G01S 3/32* (2006.01)
  *G01S 13/44* (2006.01)
  *H01Q 3/26* (2006.01)

(52) U.S. Cl.
  CPC ........... *G01S 13/4463* (2013.01); *H01Q 3/34* (2013.01); *H01Q 3/2682* (2013.01)

(58) Field of Classification Search
  CPC ............. G01S 13/4409; G01S 13/4418; G01S 13/4427; G01S 13/4436; G01S 13/4463
  USPC ....................................................... 342/427
  See application file for complete search history.

(56) References Cited

FOREIGN PATENT DOCUMENTS

| | | | | |
|---|---|---|---|---|
| JP | 01066584 A | * | 3/1989 | ............. G01S 13/44 |
| JP | H11-27043 A | | 1/1999 | |
| JP | 3086870 B2 | | 9/2000 | |
| JP | 2012-175469 A | | 9/2012 | |
| JP | 5665595 B2 | | 2/2015 | |

* cited by examiner

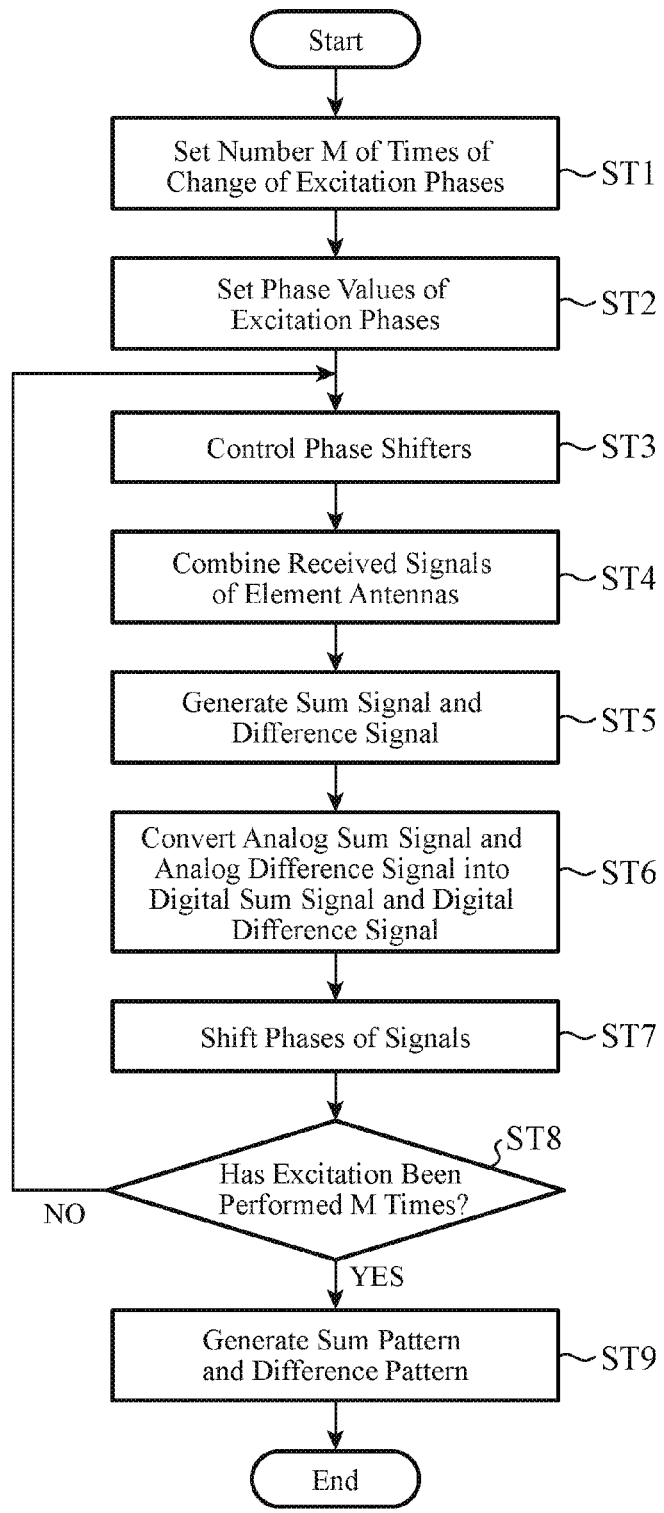

ANTENNA DEVICE AND ANTENNA EXCITATION METHOD

TECHNICAL FIELD

The present invention relates to a monopulse-type antenna device and an antenna excitation method used for detection of a direction in which a target exists, and so on. Particularly, it relates to an improvement in the sidelobe levels of a radiation pattern.

BACKGROUND ART

A monopulse-type antenna device used for detection of a direction in which a target exists, and so on is typically comprised of: a plurality of sub array antennas each including a plurality of element antennas for receiving signals and a plurality of phase shifters for adjusting the excitation phases of the element antennas; a phase shifter controlling unit for controlling the plurality of phase shifters; and a monopulse comparator for forming a radiation pattern which is a sum pattern by in-phase combining the received signals of the plurality of sub array antennas, and for also forming a radiation pattern which is a difference pattern by out-of-phase combining the received signals of the plurality of sub array antennas.

In a monopulse-type antenna device, because the accuracy of detection of targets degrades due to the influence of unnecessary waves, it is necessary to reduce the sidelobes of a sum pattern and the sidelobes of a difference pattern, the sum and difference patterns being formed by the monopulse comparator.

When forming a sum pattern, the sidelobes are reduced in many cases by controlling the amplitude of the received signal of each of the element antennas, to provide an aperture distribution having an amplitude taper. A problem is, however, that when forming a difference pattern by using this aperture distribution, the sidelobe levels of the difference pattern become high.

The following Patent Literature 1 discloses an antenna device in which a power supply circuit is divided into two portions respectively corresponding to a central portion and a perimeter portion of a plurality of element antennas, and two monopulse comparators are disposed independently for the central portion and the perimeter portion.

In this antenna device, while when forming a sum pattern, a reduction in the sidelobes is accomplished by using the above-mentioned aperture distribution having an amplitude taper, when forming a difference pattern, by using only the received signals of the antenna perimeter portion, a distribution having a low amplitude in the antenna central portion is generated as an aperture distribution suitable for a reduction in the sidelobes of the difference pattern, and a reduction in the sidelobes of the difference pattern is accomplished by using the aperture distribution.

Further, the following Patent Literature 2 discloses a technique for generating an aperture distribution which is the average of an aperture distribution suitable for a reduction in the sidelobes of a sum pattern, and an aperture distribution suitable for a reduction in the sidelobes of a difference pattern, and controlling the amplitudes of element antennas by using the averaged aperture distribution, by means of a variable attenuator, thereby accomplishing a reduction in the sidelobes of the sum pattern and in the sidelobes of the difference pattern. A feature of this technique is that the scale of the power supply circuit does not become large.

CITATION LIST

Patent Literatures

Patent Literature 1: Japanese Patent No. 3086870.
Patent Literature 2: Japanese Patent No. 5665595.

SUMMARY OF INVENTION

Technical Problem

Because the conventional antenna devices are configured as above, in the case of Patent Literature 1, it is necessary to dispose a complicated power supply circuit which is divided into two portions respectively corresponding to the central portion and the perimeter portion of the plurality of element antennas. It is further necessary to connect two monopulse comparators which are disposed independently for the central portion and the perimeter portion of the plurality of element antennas. Therefore, a problem is that the hardware cost increases.

In the case of Patent Literature 2, because the variable attenuator controls the amplitude of each of the element antennas by using the aperture distribution which is the average of the aperture distribution suitable for a reduction in the sidelobes of a sum pattern, and the aperture distribution suitable for a reduction in the sidelobes of a difference pattern, a reduction in the sidelobes of the sum pattern and in the sidelobes of the difference pattern can be accomplished, and the direction in which the sum pattern is formed and the direction in which the difference pattern is formed can be changed. However, it is necessary to control the variable attenuator that adjusts the amplitude of each of the element antennas with a high degree of accuracy in order to form a sum pattern and a difference pattern in desired directions, and it is necessary to provide a plurality of expensive variable attenuators whose number is equal to the number of element antennas in order to implement the high-accuracy control. Therefore, a problem is that the hardware cost increases.

The present invention is made in order to solve the above-mentioned problems, and it is therefore an object of the present invention to provide an antenna device and an antenna excitation method capable of reducing the sidelobes of a sum pattern and the sidelobes of a difference pattern without causing an increase in the hardware cost, and forming a sum pattern and a difference pattern in desired directions.

Solution to Problem

According to the present invention, there is provided an antenna device including: a plurality of sub array antennas each including a plurality of element antennas for receiving signals and a plurality of phase shifters for adjusting excitation phases of the element antennas; an excitation phase changing unit for changing the excitation phases of the plurality of element antennas by controlling the plurality of phase shifters; a plurality of electric power combining units disposed respectively for the plurality of sub array antennas, each for combining a plurality of received signals of the plurality of element antennas included in a corresponding one of the sub array antennas into a composite signal, and outputting the composite signal; and a signal combining unit for generating a sum signal by in-phase combining the composite signals outputted from the plurality of electric power combining units, and for also generating a difference signal by out-of-phase combining the composite signals outputted from the plurality of electric power combining units, in which a radiation pattern forming unit shifts the phases of the sum and difference signals generated by the signal combining unit every time the excitation phases are changed by the excitation phase changing unit, forms a radiation pattern associated with a sum pattern by time-integrating the sum signal after phase shift, and also forms a radiation pattern associated with a difference pattern by time-integrating the difference signal after phase shift.

Advantageous Effects of Invention

Because the antenna device according to the present invention is configured in such a way that the antenna device includes: the excitation phase changing unit for changing the excitation phases of the plurality of element antennas by controlling the plurality of phase shifters; the plurality of electric power combining units disposed respectively for the plurality of sub array antennas, each for combining the plurality of received signals of the plurality of element antennas included in the corresponding one of the sub array antennas into a composite signal, and outputting the composite signal; and the signal combining unit for generating a sum signal by in-phase combining the composite signals outputted from the plurality of electric power combining units, and for also generating a difference signal by out-of-phase combining the composite signals outputted from the plurality of electric power combining units, and the radiation pattern forming unit shifts the phases of the sum and difference signals generated by the signal combining unit every time the excitation phases are changed by the excitation phase changing unit, forms a radiation pattern associated with a sum pattern by time-integrating the sum signal after phase shift, and also forms a radiation pattern associated with a difference pattern by time-integrating the difference signal after phase shift, there is provided an advantage of being able to accomplish a reduction in the sidelobes of the sum pattern and in the sidelobes of the difference pattern without causing an increase in the hardware cost, and also form the sum pattern and the difference pattern in desired directions.

BRIEF DESCRIPTION OF DRAWINGS

FIG. 4 is a flow chart showing an antenna excitation method corresponding to processing performed by the antenna device according to Embodiment 1 of the present invention;

DESCRIPTION OF EMBODIMENTS

Hereafter, in order to explain this invention in greater detail, the preferred embodiments of the present invention will be described with reference to the accompanying drawings.

Embodiment 1

In this Embodiment 1, an antenna device that forms a monopulse sum pattern in a one-dimensional direction (a radiation pattern associated with a sum pattern), and a monopulse difference pattern in a one-dimensional direction (a radiation pattern associated with a difference pattern) will be explained.

Figure 1:
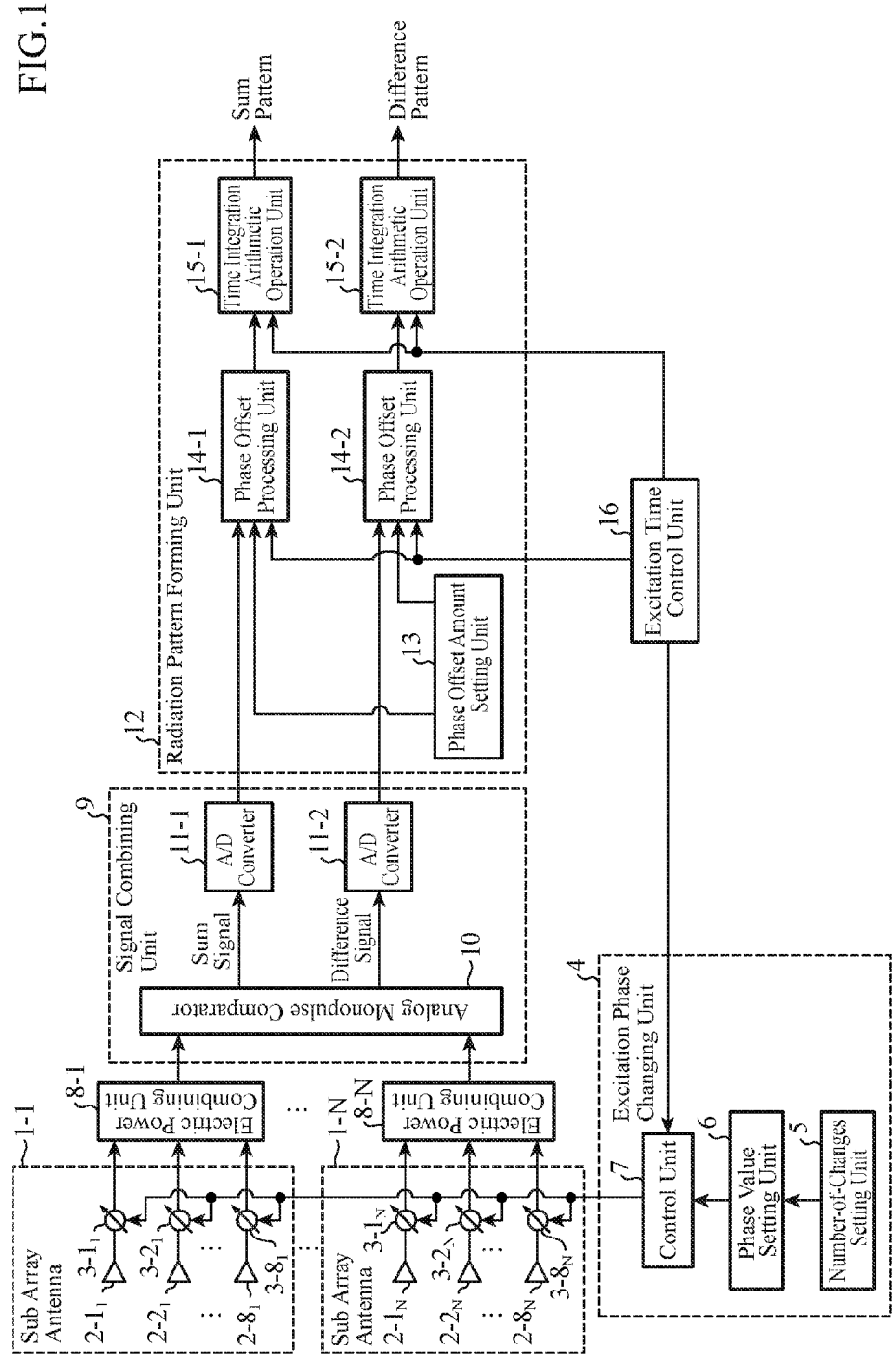
FIG. 1 is a block diagram showing an antenna device according to Embodiment 1 of the present invention.
Figure 2:
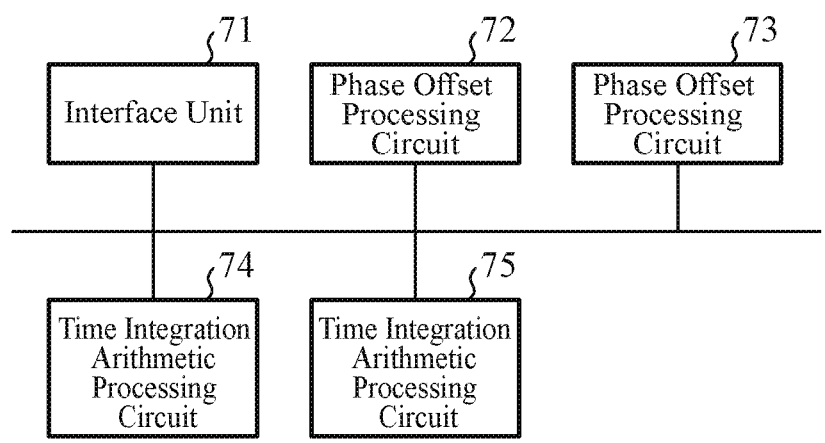
FIG. 2 is a hardware block diagram of a radiation pattern forming unit 12 in the antenna device according to Embodiment 1 of the present invention.

FIG. 1 is a block diagram showing the antenna device according to Embodiment 1 of the present invention, and FIG. 2 is a hardware block diagram of a radiation pattern forming unit 12 in the antenna device according to Embodiment 1 of the present invention.

In the configurations shown in FIGS. 1 and 2, each of sub array antennas 1-1 to 1-N (N is an integer) includes a plurality of element antennas each for receiving a signal, and a plurality of phase shifters for adjusting the excitation phases of the element antennas.

In this Embodiment 1, for the sake of expediency in explanation, an example in which each sub array antenna 1-$n$ ($n$=1, 2, . . . , N) includes eight element antennas will be explained.

For example, the sub array antenna 1-1 includes element antennas 2-$1_1$ to 2-$8_1$ and phase shifters 3-$1_1$ to 3-$8_1$, and the sub array antenna 1-N includes element antennas 2-$1_N$ to 2-$8_N$ and phase shifters 3-$1_N$ to 3-$8_N$.

However, the number of element antennas which each sub array antenna 1-$n$ includes is not limited to eight, and it is needless to say that the number of element antennas which each sub array antenna 1-$n$ includes is either seven or less, or nine or more.

An excitation phase changing unit 4 includes a number-of-changes setting unit 5, a phase value setting unit 6 and a control unit 7, and changes the excitation phases of the element antennas 2-$1_n$ to 2-$8_n$ ($n$=1, 2, . . . , N) of each sub array antenna 1-$n$ by controlling the phase shifters 3-$1_n$ to 3-$8n$ ($n$=1, 2, . . . , N) dependently on the preset phase values of the excitation phases of the element antennas 2-$1_n$ to 2-$8_n$.

The number-of-changes setting unit 5 is comprised of, for example, either a man-machine interface such as a keyboard or a mouse, or an input/output interface for receiving information provided therefor from outside the number-of-changes setting unit, and performs a process of receiving a setting of the number M of times of change that the excitation phases of the element antennas 2-$1_n$ to 2-$8_n$ ($n$=1, 2, . . . , N) are to be changed. As the input/output interface, for example, a serial port, a USB port or the like can be considered.

The phase value setting unit 6 is comprised of, for example, a man-machine interface or an input/output interface, and performs a process of receiving a setting of the phase values of the excitation phases of the element antennas 2-$1_n$ to 2-$8_n$ ($n$=1, 2, . . . , N) only M times, M being the number of times of change.

The control unit 7 performs a process of, under an instruction from an excitation time control unit 16, changing the excitation phases of the element antennas 2-$1_n$ to 2-$8_n$ ($n$=1, 2, . . . , N) only M times, M being the number of times of change whose setting is received by the number-of-changes setting unit 5, by controlling the phase shifters 3-$1_n$ to 3-$8n$ ($n$=1, 2, . . . , N) dependently on the phase values whose setting is received by the phase value setting unit 6.

Each electric power combining unit 8-$n$ ($n$=1, 2, . . . , N) combines a plurality of received signals of the element antennas 2-$1_n$ to 2-$8_n$, which construct the sub array antenna 1-$n$, into a composite signal, and outputs the composite signal to an analog monopulse comparator 10.

A signal combining unit 9 includes the analog monopulse comparator 10 and A/D converters 11-1 and 11-2, and generates a sum signal by in-phase combining the composite signals outputted from the electric power combining units 8-1 to 8-N and also generates a difference signal by out-of-phase combining the composite signals outputted from the electric power combining units 8-1 to 8-N.

The analog monopulse comparator 10 of the signal combining unit 9 is a processing unit that generates an analog sum signal by in-phase combining the composite signals outputted from the electric power combining units 8-1 to 8-N, and also generates an analog difference signal by out-of-phase combining the composite signals outputted from the electric power combining units 8-1 to 8-N.

The A/D converter 11-1, which is a first analog-to-digital converter, converts the analog sum signal generated by the analog monopulse comparator 10 into a digital sum signal, and outputs the digital sum signal to the radiation pattern forming unit 12.

The A/D converter 11-2, which is a second analog-to-digital converter, converts the analog difference signal generated by the analog monopulse comparator 10 into a digital difference signal, and outputs the digital difference signal to the radiation pattern forming unit 12.

The radiation pattern forming unit 12 includes a phase offset amount setting unit 13, phase offset processing units 14-1 and 14-2, and time integration arithmetic operation units 15-1 and 15-2, and forms a monopulse sum pattern in a one-dimensional direction from the digital sum signal outputted from the A/D converter 11-1 and also forms a monopulse difference pattern in a one-dimensional direction from the digital difference signal outputted from the A/D converter 11-2.

The phase offset amount setting unit 13 is implemented by an interface unit 71 comprised of, for example, a man-machine interface or an input/output interface, and performs a process of receiving a setting of phase offset amounts which are amounts by which the phases of the digital sum and difference signals outputted from the A/D converters 11-1 and 11-2 are to be shifted.

The phase offset processing unit 14-1 is implemented by a phase offset processing circuit 72 comprised of, for example, a semiconductor integrated circuit equipped with a CPU (Central Processing Unit), a one chip microcomputer or the like, and performs a process of, under an instruction from the excitation time control unit 16, shifting the phase of the digital sum signal outputted from the A/D converter 11-1 by the phase offset amount whose setting is received by the phase offset amount setting unit 13, and outputting the sum signal after phase shift to the time integration arithmetic operation unit 15-1.

The phase offset processing unit 14-2 is implemented by a phase offset processing circuit 73 comprised of, for example, a semiconductor integrated circuit equipped with a CPU, a one chip microcomputer or the like, and performs a process of, under an instruction from the excitation time control unit 16, shifting the phase of the digital difference signal outputted from the A/D converter 11-2 by the phase offset amount whose setting is received by the phase offset amount setting unit 13, and outputting the difference signal after phase shift to the time integration arithmetic operation unit 15-2.

The time integration arithmetic operation unit 15-1 is implemented by a time integration arithmetic processing circuit 74 comprised of, for example, a semiconductor integrated circuit equipped with a CPU, a one chip microcomputer or the like, and performs a process of, under an instruction from the excitation time control unit 16, storing the sum signal after phase shift outputted from the phase offset processing unit 14-1 and forming a monopulse sum pattern in a one-dimensional direction by time-integrating a plurality of sum signals whose number is equal to the number M of times of change set by the number-of-changes setting unit 5.

The time integration arithmetic operation unit 15-2 is implemented by a time integration arithmetic processing circuit 75 comprised of, for example, a semiconductor integrated circuit equipped with a CPU, a one chip microcomputer or the like, and performs a process of, under an instruction from the excitation time control unit 16, storing the difference signal after phase shift outputted from the phase offset processing unit 14-2 and forming a monopulse difference pattern in a one-dimensional direction by time-integrating a plurality of difference signals whose number is equal to the number M of times of change set by the number-of-changes setting unit 5.

The excitation time control unit 16 performs synchronous control on the control unit 7, the phase offset processing units 14-1 and 14-2 and the time integration arithmetic operation units 15-1 and 15-2, in order to synchronize a control period of the excitation phases of the element antennas $2\text{-}1_n$ to $2\text{-}8_n$, and phase offset processing periods and time integration periods of the sum signal and the difference signal with one another.

In the example shown in FIG. 1, it is assumed that the phase offset amount setting unit 13, the phase offset processing units 14-1 and 14-2 and the time integration arithmetic operation units 15-1 and 15-2, which are the components of the radiation pattern forming unit 12, are comprised of pieces of hardware for exclusive use, respectively. As an alternative, the radiation pattern forming unit 12 can consist of a computer.

Figure 3:
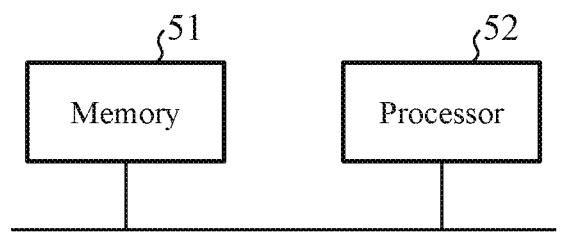
FIG. 3 is a hardware block diagram in a case in which the radiation pattern forming unit 12 consists of a computer.

FIG. 3 is a hardware block diagram in the case in which the radiation pattern forming unit 12 consists of a computer.

In the case in which the radiation pattern forming unit 12 consists of a computer, a program in which processes performed by the phase offset amount setting unit 13, the phase offset processing units 14-1 and 14-2 and the time integration arithmetic operation units 15-1 and of 15-2 are described can be stored in a memory 51 of the computer, and a processor 52 of the computer can be made to execute the program stored in the memory 51.

FIG. 4 is a flow chart showing an antenna excitation method corresponding to processing performed by the antenna device according to Embodiment 1 of the present invention.

Next, operations will be explained.

In this Embodiment 1, for the sake of simplicity, it is assumed that N is two, and a sub array antenna 1-1 comprised of eight element antennas $2\text{-}1_1$ to $2\text{-}8_1$ and a sub array antenna 1-2 comprised of eight element antennas $2\text{-}1_2$ to $2\text{-}8_2$ are disposed.

It is further assumed that the element antennas $2\text{-}1_1$ to $2\text{-}8_1$ which construct the sub array antenna 1-1 and the element antennas $2\text{-}1_2$ to $2\text{-}8_2$ which construct the sub array antenna 1-2 are arranged in a line.

The number-of-changes setting unit 5 of the excitation phase changing unit 4 receives a setting of the number M of times of change that the excitation phases of the element antennas $2\text{-}1_1$ to $2\text{-}8_1$ and $2\text{-}1_2$ to $2\text{-}8_2$ are to be changed, and outputs the number M of times of change to the phase value setting unit 6 (step ST1 of FIG. 4).

A user is enabled to set the number M of times of change of the excitation phases by manually operating the number-of-changes setting unit 5. As an alternative, the number-of-changes setting unit 5 can set the number M of times of change of the excitation phases by receiving information showing the number M of times of change of the excitation phases from outside the number-of-changes setting unit.

In this Embodiment 1, for the sake of simplicity, an example in which the number M of times of change of the excitation phases is two will be explained. The example in which the number M of times of change is two means that the excitation phases of the element antennas $2\text{-}1_1$ to $2\text{-}8_1$ and $2\text{-}1_2$ to $2\text{-}8_2$ are set twice, and the element antennas $2\text{-}1_1$ to $2\text{-}8_1$ and $2\text{-}1_2$ to $2\text{-}8_2$ are excited twice.

However, the number M of times of change has only to be two or more, and is not limited to two.

When the number-of-changes setting unit 5 sets the number M of times of change of the excitation phases, the phase value setting unit 6 of the excitation phase changing unit 4 receives a setting of the phase values of the excitation phases of the element antennas $2\text{-}1_1$ to $2\text{-}8_1$ and $2\text{-}1_2$ to $2\text{-}8_2$ only M times, M being the number of times of change, and outputs the phase values of the excitation phases to the control unit 7 (step ST2).

In this example, because the number M of times of change of the excitation phases is two, the phase value setting unit 6 receives two settings of the phase values of the excitation phases for the element antennas $2\text{-}1_1$ to $2\text{-}8_1$ and $2\text{-}1_2$ to $2\text{-}8_2$.

Figure 5A:
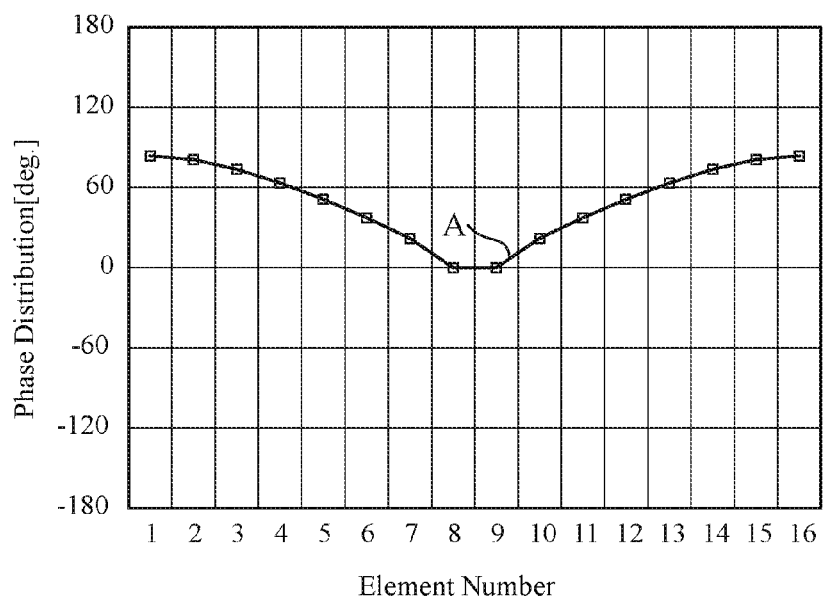
FIG. 5A is an explanatory drawing showing an example of a distribution of first excitation phases A whose setting is received by a phase value setting unit 6.
Figure 5B:
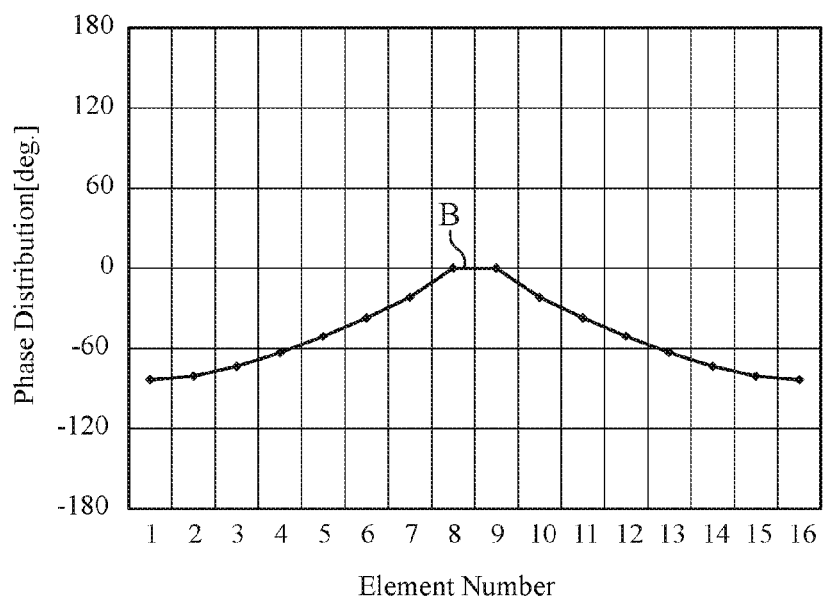
FIG. 5B is an explanatory drawing showing an example of a distribution of second excitation phases B whose setting is received by the phase value setting unit 6.

FIGS. 5A and 5B are explanatory drawings showing examples of distributions of the excitation phases whose settings are received by the phase value setting unit 6.

Numerals attached to the horizontal axes of FIGS. 5A and 5B are provided to identify the element antennas, and the numerals 1 to 8 denote the element antennas $2\text{-}1_1$ to $2\text{-}8_1$ which construct the sub array antenna 1-1 and the numerals 9 to 16 denote the element antennas $2\text{-}1_2$ to $2\text{-}8_2$ which construct the sub array antenna 1-2.

The vertical axes of FIGS. 5A and 5B show the phase values of the excitation phases of the element antennas $2\text{-}1_1$ to $2\text{-}8_1$ and $2\text{-}1_2$ to $2\text{-}8_2$.

FIG. 5A shows the first excitation phases A, and FIG. 5B shows the second excitation phases B. The phase values of the first and second excitation phases are set in such a way that the first excitation phases A and the second excitation phases B have a conjugate relation with each other.

In this Embodiment 1, because the example in which the number M of times of change of the excitation phases is two is shown, in order to make the sum total of the phase values of the first excitation phases A and those of the second excitation phases B get close to a target excitation phase, the phase values of the first and second excitation phases are set in such a way that the first excitation phases A and the second excitation phases B have a conjugate relation with each other.

In this embodiment, although because the number M of times of change of the excitation phases is two, the example in which the phase values of the first and second excitation phases are set in such a way that the first excitation phases A and the second excitation phases B have a conjugate relation with each other is shown above, when the number M of times of change of the excitation phases is three or more, the phase values of the first to M-th excitation phases are set in such a way that the sum total of the phase values of the first to M-th excitation phases gets close to a target excitation phase.

The phase values of the element antennas $2\text{-}8_1$ and $2\text{-}1_2$ disposed in a central portion, among the element antennas $2\text{-}1_1$ to $2\text{-}8_1$ and $2\text{-}1_2$ to $2\text{-}8_2$, are set to zero, and a phase value having a larger absolute value is set to each of the other element antennas as this element antenna is located at a position at a longer distance from the element antennas $2\text{-}8_1$ and $2\text{-}1_2$.

Although an example of the excitation phases which are suitable when forming a monopulse sum pattern and a monopulse difference pattern in directions ahead of the element antennas $2\text{-}1_1$ to $2\text{-}8_1$ and $2\text{-}1_2$ to $2\text{-}8_2$ which are arranged in a line is shown in FIGS. 5A and 5B, a monopulse sum pattern and a monopulse difference pattern can be formed in desired directions different from the directions ahead of the element antennas $2\text{-}1_1$ to $2\text{-}8_1$ and $2\text{-}1_2$ to $2\text{-}8_2$ by changing the phase values of the excitation phases of the element antennas $2\text{-}1_1$ to $2\text{-}8_1$ and $2\text{-}1_2$ to $2\text{-}8_2$ as appropriate.

In this Embodiment 1, a monopulse sum pattern and a monopulse difference pattern can be formed in desired directions by simply changing the phase values of the excitation phases as appropriate, without using such a variable attenuator as described in Patent Literature 2.

After the phase value setting unit 6 receives a number of settings of the phase values of the excitation phases, i.e. the excitation phases A and B, the number of settings being equal to the number M of times of change (M=2), when receiving a first excitation instruction from the excitation time control unit 16, the control unit 7 of the excitation phase changing unit 4 sets the excitation phases of the element antennas $2\text{-}1_1$ to $2\text{-}8_1$ and $2\text{-}1_2$ to $2\text{-}8_2$ to the first excitation phases A by controlling the phase shifters $3\text{-}1_1$ to $3\text{-}8_1$ and $3\text{-}1_2$ to $3\text{-}8_2$ dependently on the phase values whose setting is received by the phase value setting unit 6 (step ST3).

When receiving signals, the element antennas $2\text{-}1_1$ to $2\text{-}8_1$ which construct the sub array antenna 1-1 output the received signals to the electric power combining unit 8-1.

When receiving signals, the element antennas $2\text{-}1_2$ to $2\text{-}8_2$ which construct the sub array antenna 1-2 output the received signals to the electric power combining unit 8-2.

The electric power combining unit 8-1 combines the plurality of received signals of the element antennas $2\text{-}1_1$ to $2\text{-}8_1$ which construct the sub array antenna 1-1 into a composite signal, and outputs the composite signal to the analog monopulse comparator 10 (step ST4).

The electric power combining unit 8-2 combines the plurality of received signals of the element antennas $2\text{-}1_2$ to $2\text{-}8_2$ which construct the sub array antenna 1-2 into a composite signal, and outputs the composite signal to the analog monopulse comparator 10 (step ST4).

When receiving the composite signals from the electric power combining units 8-1 and 8-2, the analog monopulse comparator 10 generates an analog sum signal by in-phase combining the two composite signals and also generates an analog difference signal by out-of-phase combining the two composite signals (step ST5).

The in-phase combining of the two composite signals means that the analog monopulse comparator simply adds the two composite signals without changing the phases of the two composite signals, like in the case in which each of the electric power combining units 8-1 and 8-2 combines a plurality of received signals.

In contrast, the out-of-phase combining of the two composite signals means that the analog monopulse comparator shifts the phase of the composite signal outputted from the electric power combining unit 8-2 by 180 degrees, and then adds the composite signal after phase shift and the composite signal outputted from the electric power combining unit 8-1.

When the analog monopulse comparator 10 generates an analog sum signal, the A/D converter 11-1 converts the analog sum signal into a digital sum signal and outputs the digital sum signal to the radiation pattern forming unit 12 (step ST6).

When the analog monopulse comparator 10 generates an analog difference signal, the A/D converter 11-2 converts the analog difference signal into a digital difference signal and outputs the digital difference signal to the radiation pattern forming unit 12 (step ST6).

The phase offset amount setting unit 13 of the radiation pattern forming unit 12 receives, in advance, a setting of the phase offset amounts $\Phi_{m,k}$ which are amounts by which the phases of the digital sum and difference signals outputted from the A/D converters 11-1 and 11-2 are to be shifted, and outputs the phase offset amounts $\Phi_{m,k}$ to the phase offset processing units 14-1 and 14-2.

Because m is a variable showing a number of control of the excitation phases and M is 2, m is 1 or 2. k is a variable showing whether the corresponding phase offset amount corresponds to either a sum pattern or a difference pattern. For example, when k=1, the phase offset amount corresponds to a sum pattern, and when k=2, the phase offset amount corresponds to a difference pattern.

Therefore, the phase offset amount setting unit 13 outputs the phase offset amount $\Phi_{1,1}$ and the phase offset amount $\Phi_{2,1}$ to the phase offset processing unit 14-1, and outputs the phase offset amount $\Phi_{1,2}$ and the phase offset amount $\Phi_{2,2}$ to the phase offset processing unit 14-2.

Because it is assumed in this Embodiment 1 that the antenna device forms a monopulse sum pattern having low sidelobes and a monopulse difference pattern having low sidelobes in directions ahead of the element antennas $2\text{-}1_1$ to $2\text{-}8_1$ and $2\text{-}1_2$ to $2\text{-}8_2$ arranged in a line, there can be considered a case in which values as will be shown below are set as the phase offset amounts $\Phi_{m,k}$.

$$\Phi_{1,1}=\Phi_{2,1}=\Phi_{1,2}=0$$

$$\Phi_{2,2}=180$$

It is preferable that the phase offset amounts $\Phi_{m,k}$ are set in such a way that a reduction in the sidelobes of the monopulse sum pattern and in the sidelobes of the monopulse difference pattern is accomplished. The phase offset amounts $\Phi_{m,k}$ can be set arbitrarily in consideration of the shapes of a desired monopulse sum pattern and a desired monopulse difference pattern, the arrangement of the element antennas, the number of element antennas, the number M of times of change of the excitation phases, etc.

Because $\Phi_{1,2}$ and $\Phi_{2,2}$ are the phase offset amounts associated with the difference signal, it is preferable that the difference between $\Phi_{1,2}$ and $\Phi_{2,2}$ is 180. For example, $\Phi_{1,2}$ and $\Phi_{2,2}$ can be set to 90 and −90, respectively.

A user is enabled to set the phase offset amounts $\Phi_{m,k}$ by manually operating the phase offset amount setting unit 13. As an alternative, the phase offset amount setting unit 13 can set the phase offset amounts $\Phi_{m,k}$ by receiving information showing the phase offset amounts $\Phi_{m,k}$ from outside the phase offset amount setting unit.

Because it is assumed in this embodiment that the phase offset amounts $\Phi_{m,k}$ are set in advance, but not set in real time, the step of setting the offset amounts $\Phi_{m,k}$ is not included in the flow chart of FIG. 4. However, when the phase offset amounts $\Phi_{m,k}$ are set in real time, the step of setting the offset amounts $\Phi_{m,k}$ is added between the step of ST6 and the step of ST7.

When receiving a phase offset instruction corresponding to a first excitation from the excitation time control unit 16, the phase offset processing unit 14-1 of the radiation pattern forming unit 12 shifts the phase of the digital sum signal outputted from the A/D converter 11-1 by the phase offset amount $\Phi_{1,1}$ whose setting is received by the phase offset amount setting unit 13, and outputs the sum signal after phase shift to the time integration arithmetic operation unit 15-1 (step ST7).

When receiving a phase offset instruction corresponding to the first excitation from the excitation time control unit 16, the phase offset processing unit 14-2 of the radiation pattern forming unit 12 shifts the phase of the digital difference signal outputted from the A/D converter 11-2 by the phase offset amount $\Phi_{1,2}$ whose setting is received by the phase offset amount setting unit 13, and outputs the difference signal after phase shift to the time integration arithmetic operation unit 15-2 (step ST7).

Because the example in which the phase offset amounts $\Phi_{1,1}$ and $\Phi_{1,2}$ whose setting is received by the phase offset amount setting unit 13 are $\Phi_{1,1}=\Phi_{1,2}=0$ is shown in this Embodiment 1, the phase shifts provided by the phase offset processing units 14-1 and 14-2 are 0 degrees. Therefore, the phase of the digital sum signal outputted from the A/D converter 11-1 is not shifted and the sum signal is outputted to the time integration arithmetic operation unit 15-1, just as it is, while the phase of the digital difference signal outputted from the A/D converter 11-2 is not shifted and the difference signal is outputted to the time integration arithmetic operation unit 15-2, just as it is.

When receiving the sum signal after phase shift from the phase offset processing unit 14-1, the time integration arithmetic operation unit 15-1 of the radiation pattern forming unit 12 stores the sum signal after phase shift.

When receiving the difference signal after phase shift from the phase offset processing unit 14-2, the time integration arithmetic operation unit 15-2 of the radiation pattern forming unit 12 stores the difference signal after phase shift.

The excitation time control unit 16 determines whether or not excitations whose number is equal to the number M of times of change whose setting is received by the number-of-changes setting unit 5 have been completed (step ST8).

At this time, because only the first excitation has been completed, but a second excitation has not been completed (when NO in step ST8), the excitation time control unit 16 outputs a second excitation instruction to the control unit 7 of the excitation phase changing unit 4.

When receiving the second excitation instruction from the excitation time control unit 16, the control unit 7 of the excitation phase changing unit 4 sets the excitation phases of the element antennas 2-1$_1$ to 2-8$_1$ and 2-1$_2$ to 2-8$_2$ to the second excitation phases B by controlling the phase shifters 3-1$_1$ to 3-8$_1$ and 3-1$_2$ to 3-8$_2$ dependently on the phase values whose setting is received by the phase value setting unit 6 (step ST3).

When receiving signals, the element antennas 2-1$_1$ to 2-8$_1$ which construct the sub array antenna 1-1 output the received signals to the electric power combining unit 8-1. When receiving signals, the element antennas 2-1$_2$ to 2-8$_2$ which construct the sub array antenna 1-2 output the received signals to the electric power combining unit 8-2.

The electric power combining unit 8-1 combines the plurality of received signals of the element antennas 2-1$_1$ to 2-8$_1$ which construct the sub array antenna 1-1 into a composite signal, and outputs the composite signal to the analog monopulse comparator 10 (step ST4).

The electric power combining unit 8-2 combines the plurality of received signals of the element antennas 2-1$_2$ to 2-8$_2$ which construct the sub array antenna 1-2 into a composite signal, and outputs the composite signal to the analog monopulse comparator 10 (step ST4).

When receiving the composite signals from the electric power combining units 8-1 and 8-2, the analog monopulse comparator 10 generates an analog sum signal by in-phase combining the two composite signals and also generates an analog difference signal by out-of-phase combining the two composite signals (step ST5).

When the analog monopulse comparator 10 generates an analog sum signal, the A/D converter 11-1 converts the analog sum signal into a digital sum signal and outputs the digital sum signal to the radiation pattern forming unit 12 (step ST6).

When the analog monopulse comparator 10 generates an analog difference signal, the A/D converter 11-2 converts the analog difference signal into a digital difference signal and outputs the digital difference signal to the radiation pattern forming unit 12 (step ST6).

When receiving a phase offset instruction corresponding to the second excitation from the excitation time control unit 16, the phase offset processing unit 14-1 of the radiation pattern forming unit 12 shifts the phase of the digital sum signal outputted from the A/D converter 11-1 by the phase offset amount $\Phi_{2,1}$ whose setting is received by the phase offset amount setting unit 13, and outputs the sum signal after phase shift to the time integration arithmetic operation unit 15-1 (step ST7).

When receiving a phase offset instruction corresponding to the second excitation from the excitation time control unit 16, the phase offset processing unit 14-2 of the radiation pattern forming unit 12 shifts the phase of the digital difference signal outputted from the A/D converter 11-2 by the phase offset amount $\Phi_{2,2}$ whose setting is received by the phase offset amount setting unit 13, and outputs the difference signal after phase shift to the time integration arithmetic operation unit 15-2 (step ST7).

Because the example in which the phase offset amount $\Phi_{2,1}$ whose setting is received by the phase offset amount setting unit 13 is $\Phi_{2,1}=0$ is shown in this Embodiment 1, the phase shift provided by the phase offset processing unit 14-1 is 0 degrees. Therefore, the phase of the digital sum signal outputted from the A/D converter 11-1 is not shifted and the sum signal is outputted to the time integration arithmetic operation unit 15-1, just as it is.

On the other hand, because the example in which the phase offset amount $\Phi_{2,2}$ whose setting is received by the phase offset amount setting unit 13 is $\Phi_{2,2}=180$ is shown, the phase shift provided by the phase offset processing unit 14-2 is 180 degrees. Therefore, the phase of the digital difference signal outputted from the A/D converter 11-2 is shifted by 180 degrees, and the difference signal whose phase is shifted by 180 degrees is outputted to the time integration arithmetic operation unit 15-2.

Figure 6A:
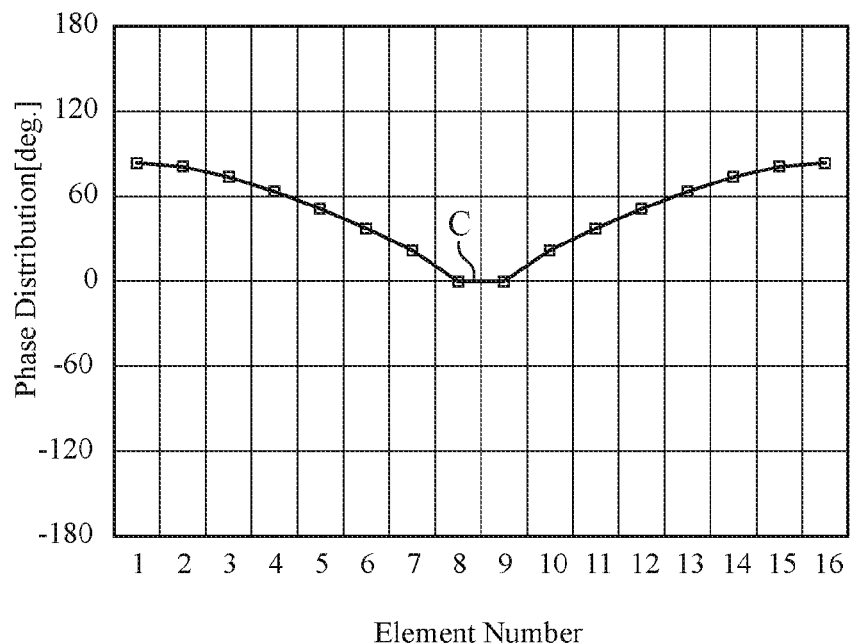
FIG. 6A is an explanatory drawing showing an example of a distribution of excitation phases C after the excitation phases A shown in FIG. 5A are shifted.
Figure 6B:
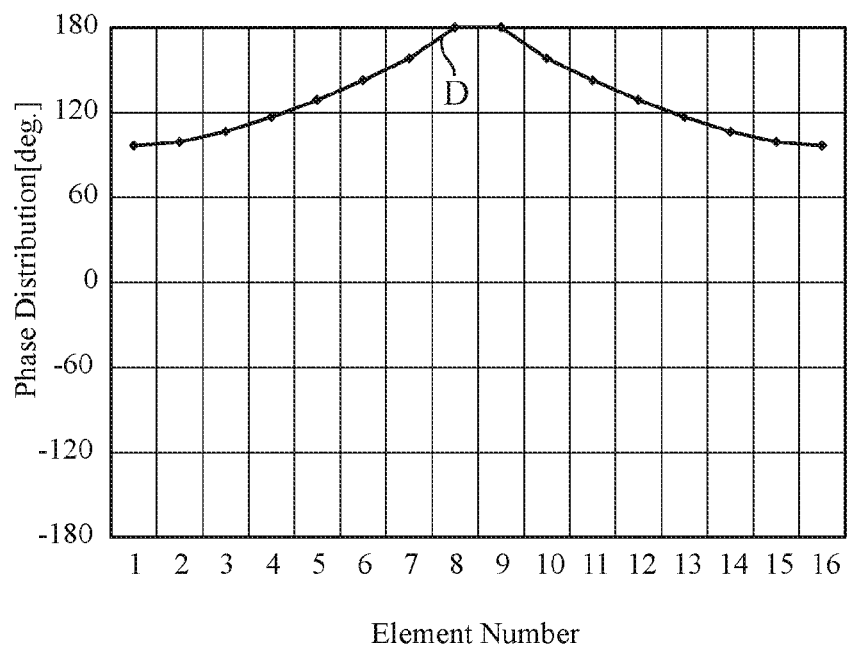
FIG. 6B is an explanatory drawing showing an example of a distribution of excitation phases D after the excitation phases B shown in FIG. 5B are shifted.

FIGS. 6A and 6B are explanatory drawings showing examples of distributions of excitation phases after the excitation phases shown in FIGS. 5A and 5B are shifted.

FIG. 6A shows excitation phases C after the excitation phases A shown in FIG. 5A are shifted. Because the phase offset amount $\Phi_{1,2}$ is 0, the phase of the difference signal is not shifted, and the excitation phases C of the difference signal are the same as the excitation phases A shown in FIG. 5A whose setting is received by the phase value setting unit 6.

On the other hand, FIG. 6B shows excitation phases D after the excitation phases B shown in FIG. 5B are shifted. Because the phase offset amount $\Phi_{2,2}$ is 180, the phase of the difference signal is shifted by 180 degrees, and the excitation phases D of the difference signal after phase shift are shifted, by 180 degrees, from the excitation phases B shown in FIG. 5B whose setting is received by the phase value setting unit 6.

When receiving the sum signal after phase shift from the phase offset processing unit 14-1, the time integration arithmetic operation unit 15-1 of the radiation pattern forming unit 12 stores the sum signal after phase shift.

When receiving the difference signal after phase shift from the phase offset processing unit 14-2, the time integration arithmetic operation unit 15-2 of the radiation pattern forming unit 12 stores the difference signal after phase shift.

The excitation time control unit 16 determines whether or not excitations whose number is equal to the number M of times of change whose setting is received by the number-of-changes setting unit 5 have been completed (step ST8).

At this time, because the second excitation has been completed (when YES in step ST8), the excitation time control unit 16 outputs a time integration instruction to the time integration arithmetic operation units 15-1 and 15-2.

When receiving the time integration instruction from the excitation time control unit 16, the time integration arithmetic operation unit 15-1 of the radiation pattern forming unit 12 forms a monopulse sum pattern in a one-dimensional direction by time-integrating the plurality of sum signals stored whose number is equal to the number M of times of change (M=2) (step ST9).

When receiving the time integration instruction from the excitation time control unit 16, the time integration arithmetic operation unit 15-2 of the radiation pattern forming unit 12 forms a monopulse difference pattern in a one-dimensional direction by time-integrating the plurality of difference signals stored whose number is equal to the number M of times of change (M=2) (step ST9).

In this embodiment, the time integration arithmetic operation unit 15-1 forms a monopulse sum pattern by time-integrating the plurality of sum signals stored whose number is equal to the number M of times of change. As an alternative, the time integration arithmetic operation unit can form a monopulse sum pattern by performing a discrete Fourier transform on the plurality of sum signals stored whose number is equal to the number M of times of change.

Further, the time integration arithmetic operation unit 15-2 forms a monopulse difference pattern by time-integrating the plurality of difference signals stored whose number is equal to the number M of times of change. As an alternative, the time integration arithmetic operation unit can form a monopulse difference pattern by performing a discrete Fourier transform on the plurality of difference signals stored whose number is equal to the number M of times of change.

Because the discrete Fourier transform processes on the sum signal and the difference signal include processes corresponding to time integration processes on the sum signal and the difference signal, respectively, the time integration arithmetic operation units can form a monopulse sum pattern and a monopulse difference pattern.

Figure 7A:
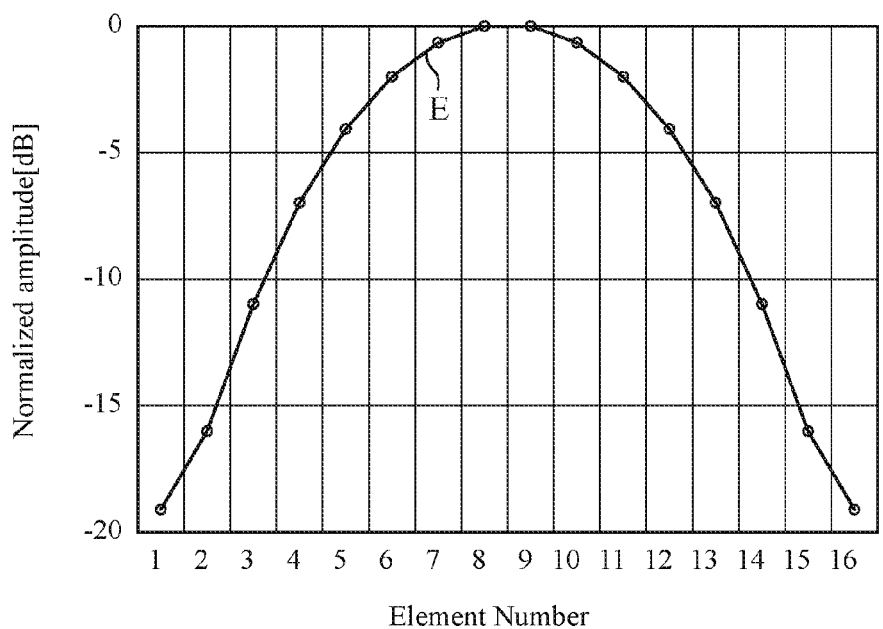
FIG. 7A is an explanatory drawing showing excitation amplitudes E for a monopulse sum pattern.
Figure 7B:
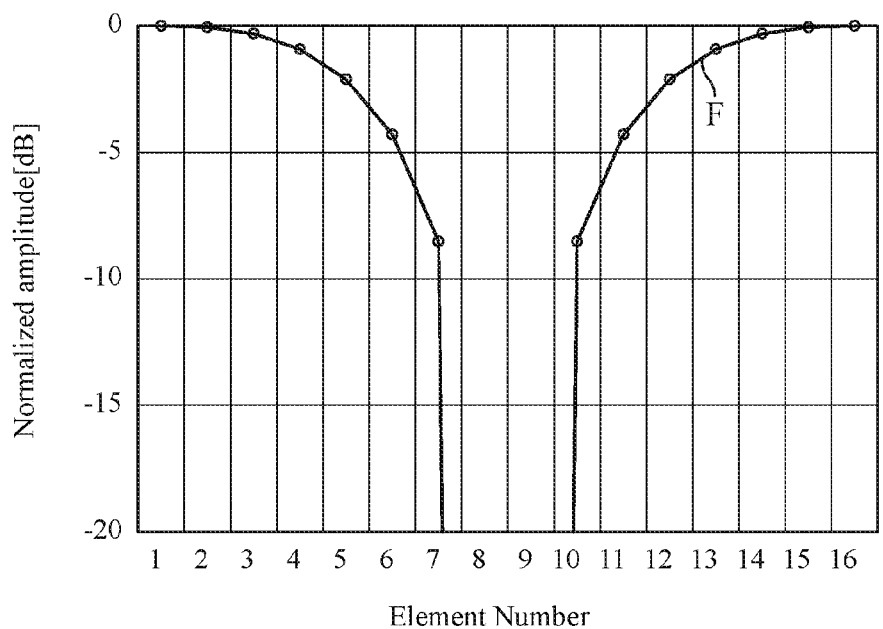
FIG. 7B is an explanatory drawing showing excitation amplitudes F for a monopulse difference pattern.

FIGS. 7A and 7B are explanatory drawings showing examples of excitation amplitudes for the monopulse sum pattern, and excitation amplitudes for the monopulse difference pattern.

FIG. 7A shows excitation amplitudes E for the monopulse sum pattern, and FIG. 7B shows excitation amplitudes F for the monopulse difference pattern.

Therefore, for the monopulse sum pattern, the above-mentioned process is equivalent to exciting the element antennas 2-1$_1$ to 2-8$_1$ and 2-1$_2$ to 2-8$_2$ with the excitation amplitudes E shown in FIG. 7A. For the monopulse difference pattern, the above-mentioned process is equivalent to exciting the element antennas 2-1$_1$ to 2-8$_1$ and 2-1$_2$ to 2-8$_2$ with the excitation amplitudes F shown in FIG. 7B.

Therefore, it can be seen that different aperture distributions are provided for the formation of the sum pattern and for the formation of the difference pattern.

Figure 8A:
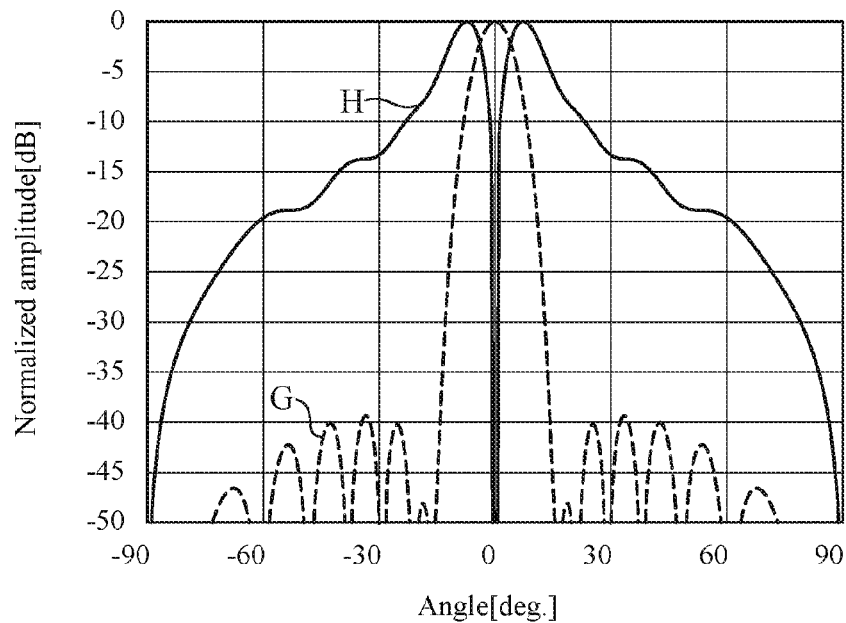
FIG. 8A is an explanatory drawing showing a sum pattern and a difference pattern which are formed using the same aperture distribution.
Figure 8B:
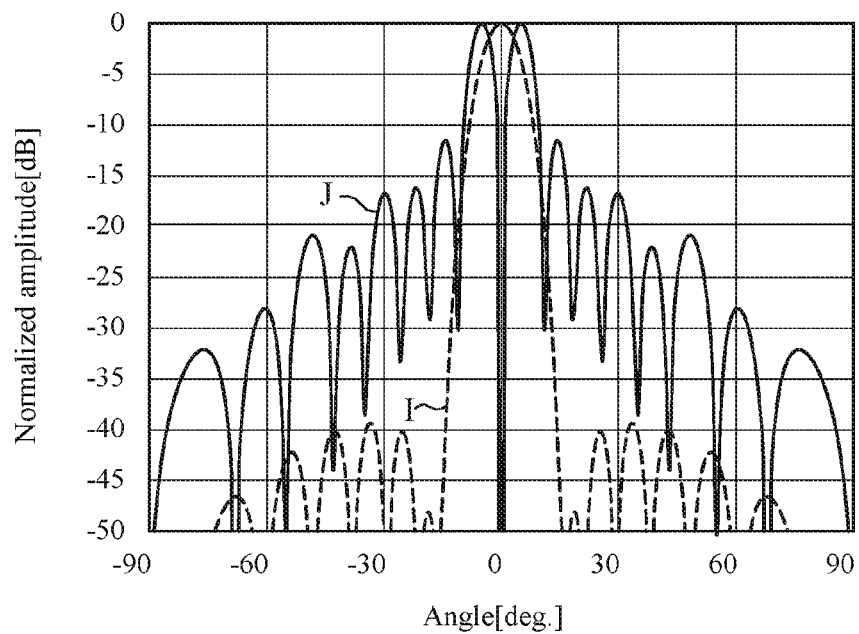
FIG. 8B is an explanatory drawing showing a monopulse sum pattern and a monopulse difference pattern which are formed by the radiation pattern forming unit 12.

FIGS. 8A and 8B are explanatory drawings showing examples of the monopulse sum pattern and monopulse difference pattern which are formed by the radiation pattern forming unit 12.

FIG. 8A shows a case in which a difference pattern is formed by using the same aperture distribution as that used for the formation of a sum pattern. More specifically, FIG. 8A shows a conventional example of forming a sum pattern and a difference pattern by using the same aperture distribution. In this case, while a reduction in the sidelobes of the sum pattern G is accomplished, the difference pattern H has high sidelobe levels, and no reduction in the sidelobes of the difference pattern is accomplished.

A sum pattern I shown in FIG. 8B is an example of the monopulse sum pattern formed by the radiation pattern forming unit 12 in this Embodiment 1, a reduction in the sidelobes of the sum pattern is accomplished.

Further, a difference pattern J shown in FIG. 8B is an example of the monopulse difference pattern formed by the radiation pattern forming unit 12, and a reduction in the sidelobes of the difference pattern is accomplished, as compared with those of the difference pattern H shown in FIG. 8A.

As can be seen from the above description, because the antenna device according to this Embodiment 1 is configured in such a way that the antenna device includes: the excitation phase changing unit 4 that changes the excitation phases of the element antennas 2-1$_1$ to 2-8$_1$ and 2-1$_2$ to 2-8$_2$ by controlling the phase shifters 3-1$_1$ to 3-8$_1$ and 3-1$_2$ to 3-8$_2$ dependently on the preset phase values; the electric power combining unit 8-1 that combines the plurality of received signals of the element antennas 2-1$_1$ to 2-8$_1$ into a composite signal, and outputs the composite signal; the electric power combining unit 8-2 that combines the plurality of received signals of the element antennas 2-1$_2$ to 2-8$_2$ into a composite signal, and outputs the composite signal; the analog monopulse comparator 10 that generates a sum signal by in-phase combining the composite signals outputted from the electric power combining units 8-1 and 8-2, and also generates a difference signal by out-of-phase combining the composite signals outputted from the electric power combining units 8-1 and 8-2; the A/D converter 11-1 that converts the analog sum signal generated by the analog monopulse comparator 10 into a digital sum signal; and the A/D converter 11-2 that converts the analog difference signal generated by the analog monopulse comparator 10 into a digital difference signal, and, every time the excitation phases are changed by the excitation phase changing unit 4, the radiation pattern forming unit 12 shifts the phases of the digital sum and difference signals after conversion by the A/D converter 11-1, and forms a monopulse sum pattern by time-integrating the sum signal after phase shift and also forms a monopulse difference pattern by time-integrating the difference signal after phase shift, there is provided an advantage of being able to accomplish a reduction in the sidelobes of the monopulse sum pattern and in the sidelobes of the monopulse difference pattern without causing an increase in the hardware cost, and also orient the monopulse sum pattern and the monopulse difference pattern toward desired directions.

Embodiment 2

Although the example of forming a monopulse sum pattern in a one-dimensional direction and a monopulse difference pattern in a one-dimensional direction is shown in above-mentioned Embodiment 1, monopulse difference patterns in two dimensions (one in an azimuth angle direction and one in an elevation angle direction) can be formed.

Figure 9:
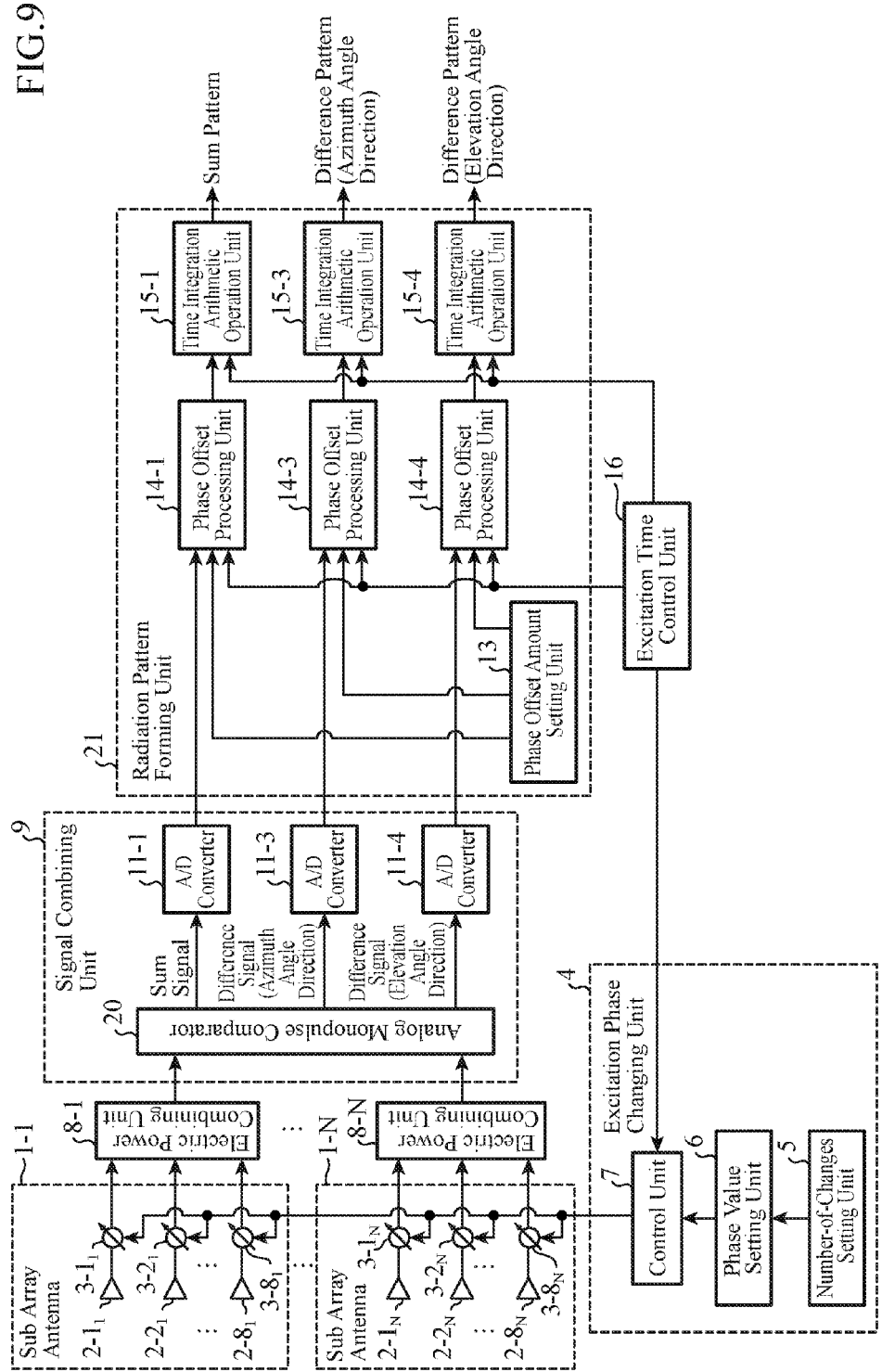
FIG. 9 is a block diagram showing an antenna device according to Embodiment 2 of the present invention.
Figure 10:
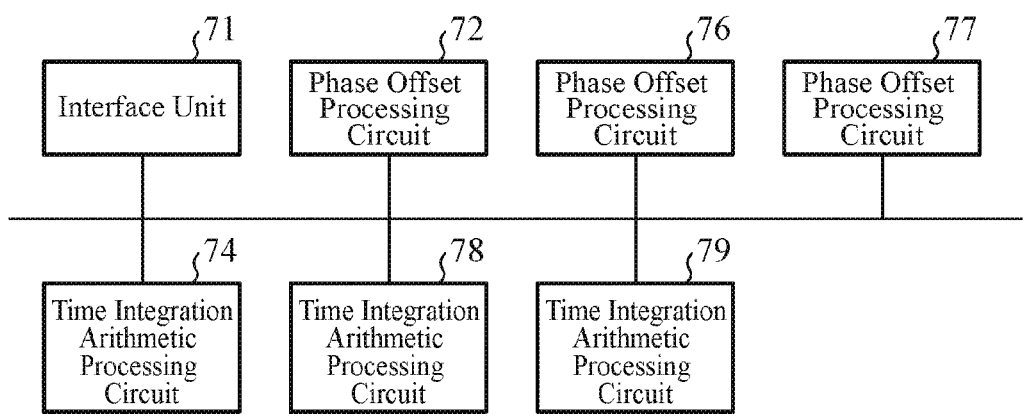
FIG. 10 is a hardware block diagram of a radiation pattern forming unit 21 in the antenna device according to Embodiment 2 of the present invention.

FIG. 9 is a block diagram showing an antenna device according to Embodiment 2 of the present invention, and FIG. 10 is a hardware block diagram of a radiation pattern forming unit 21 in the antenna device according to Embodiment 2 of the present invention.

In FIGS. 9 and 10, because the same reference numerals as those shown in FIGS. 1 and 2 denote the same components or like components, the explanation of the components will be omitted hereafter.

An analog monopulse comparator 20 generates an analog sum signal by in-phase combining composite signals outputted from electric power combining units 8-1 to 8-N, like the analog monopulse comparator 10 shown in FIG. 1.

The analog monopulse comparator 20 further generates an analog difference signal in an azimuth angle direction by out-of-phase combining, in the azimuth angle direction, the composite signals outputted from the electric power combining units 8-1 to 8-N, and also generates an analog difference signal in an elevation angle direction by out-of-phase combining, in the elevation angle direction, the composite signals outputted from the electric power combining units 8-1 to 8-N.

An A/D converter 11-3, which is a second analog-to-digital converter, converts the analog difference signal in the azimuth angle direction generated by the analog monopulse comparator 20 into a digital difference signal in the azimuth angle direction and outputs the digital difference signal in the azimuth angle direction to a radiation pattern forming unit 21.

An A/D converter 11-4, which is a third analog-to-digital converter, converts the analog difference signal in the elevation angle direction generated by the analog monopulse comparator 20 into a digital difference signal in the elevation angle direction and outputs the digital difference signal in the elevation angle direction to the radiation pattern forming unit 21.

The radiation pattern forming unit 21 includes a phase offset amount setting unit 13, phase offset processing units 14-1, 14-3 and 14-4 and time integration arithmetic operation units 15-1, 15-3 and 15-4, and, every time the excitation phases are changed by an excitation phase changing unit 4, in addition to forming a monopulse sum pattern from a digital sum signal outputted from an A/D converter 11-1, forms a monopulse difference pattern in an azimuth angle direction from the digital difference signal in the azimuth angle direction outputted from the A/D converter 11-3 and also forms a monopulse difference pattern in an elevation angle direction from the digital difference signal in the elevation angle direction outputted from the A/D converter 11-4.

The phase offset processing unit 14-3 is implemented by a phase offset processing circuit 76 comprised of, for example, a semiconductor integrated circuit equipped with a CPU, a one chip microcomputer or the like, and performs a process of, under an instruction from an excitation time control unit 16, shifting the phase of the digital difference signal in the azimuth angle direction outputted from the A/D converter 11-3 by a phase offset amount whose setting is received by the phase offset amount setting unit 13, and outputting the difference signal after phase shift to the time integration arithmetic operation unit 15-3.

The phase offset processing unit 14-4 is implemented by a phase offset processing circuit 77 comprised of, for example, a semiconductor integrated circuit equipped with a CPU, a one chip microcomputer or the like, and performs a process of, under an instruction from the excitation time control unit 16, shifting the phase of the digital difference signal in the elevation angle direction outputted from the A/D converter 11-4 by a phase offset amount whose setting is received by the phase offset amount setting unit 13, and outputting the difference signal after phase shift to the time integration arithmetic operation unit 15-4.

The time integration arithmetic operation unit 15-3 is implemented by a time integration arithmetic processing circuit 78 comprised of, for example, a semiconductor integrated circuit equipped with a CPU, a one chip microcomputer or the like, and performs a process of, under an instruction from the excitation time control unit 16, storing the difference signal after phase shift outputted from the phase offset processing unit 14-3 and forming a monopulse difference pattern in the azimuth angle direction by time-integrating a plurality of difference signals whose number is equal to the number M of times of change set by a number-of-changes setting unit 5.

The time integration arithmetic operation unit 15-4 is implemented by a time integration arithmetic processing circuit 79 comprised of, for example, a semiconductor integrated circuit equipped with a CPU, a one chip microcomputer or the like, and performs a process of, under an instruction from the excitation time control unit 16, storing the difference signal after phase shift outputted from the phase offset processing unit 14-4 and forming a monopulse difference pattern in the elevation angle direction by time-integrating a plurality of difference signals whose number is equal to the number M of times of change set by the number-of-changes setting unit 5.

In the example shown in FIG. 9, it is assumed that the phase offset amount setting unit 13, the phase offset processing units 14-1, 14-3 and 14-4 and the time integration arithmetic operation units 15-1, 15-3 and 15-4, which are the components of the radiation pattern forming unit 21, are comprised of pieces of hardware for exclusive use, respectively. As an alternative, the radiation pattern forming unit 21 can consist of a computer.

In the case in which the radiation pattern forming unit 21 consists of a computer, a program in which processes performed by the phase offset amount setting unit 13, the phase offset processing units 14-1, 14-3 and 14-4 and the time integration arithmetic operation units 15-1, 15-3 and 15-4 are described can be stored in a memory 51 of the computer shown in FIG. 3 and a processor 52 of the computer shown in FIG. 3 can be made to execute the program stored in the memory 51.

Figure 11:
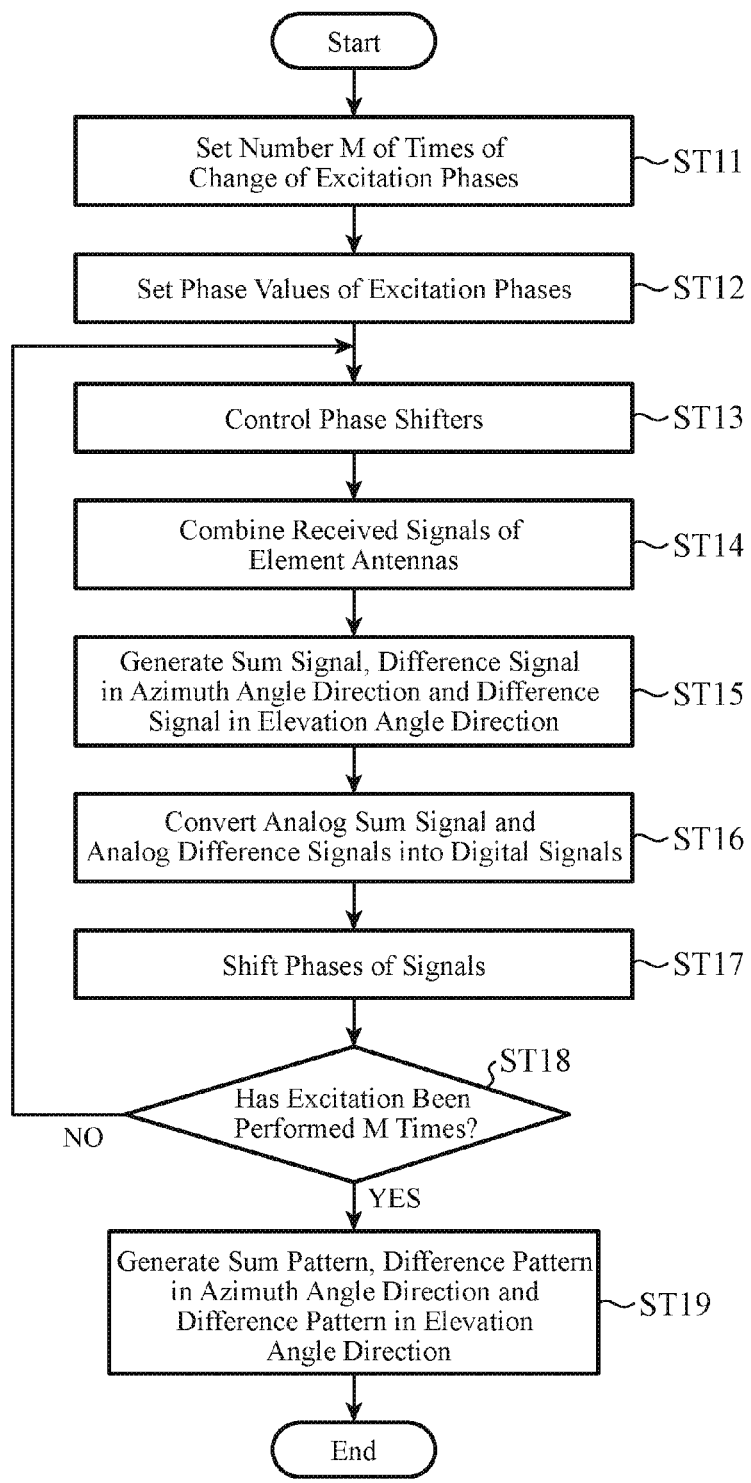
FIG. 11 is a flow chart showing an antenna excitation method corresponding to processing performed by the antenna device according to Embodiment 2 of the present invention.

FIG. 11 is a flow chart showing an antenna excitation method corresponding to processing performed by the antenna device according to Embodiment 2 of the present invention.

Next, operations will be explained.

This Embodiment 2 differs from above-mentioned Embodiment 1 in that the antenna device forms a monopulse difference pattern in an azimuth angle direction and a monopulse difference pattern in an elevation angle direction, in addition to forming a monopulse sum pattern.

In this Embodiment 2, it is assumed that, for example, N is 32, and sub array antennas 1-$n$ ($n$=1, 2, . . . , 32) each comprised of eight element antennas 2-1$_n$ to 2-8$_n$ are arranged in two dimensions.

Figure 12:
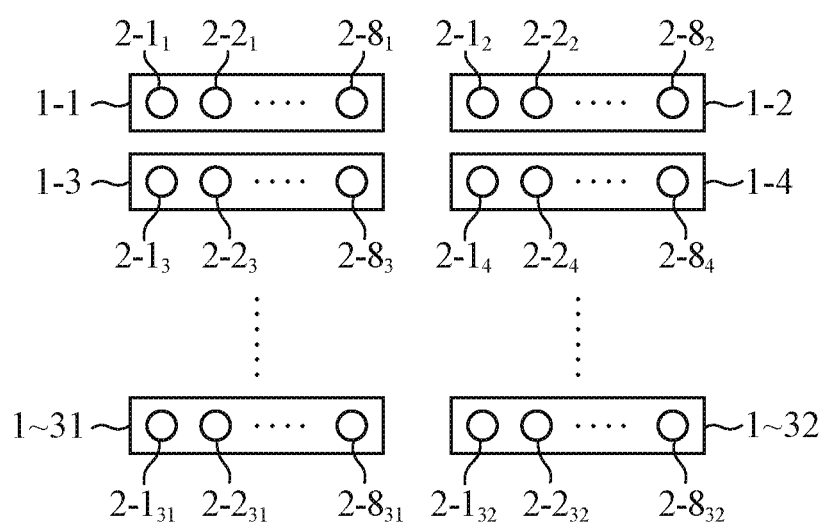
FIG. 12 is an explanatory drawing showing an example of the arrangement of 32 sub array antennas 1-1 to 1-32.

FIG. 12 is an explanatory drawing showing an example of the arrangement of the 32 sub array antennas 1-1 to 1-32.

Concretely, it is assumed that the plural sets of element antennas 2-1$_n$ to 2-8$_n$ whose number is 256 in total and which construct the 32 sub array antennas 1-1 to 1-32 are arranged in the form of a grid, as shown in FIG. 12.

More specifically, it is assumed that the number of element antennas aligned in an azimuth angle direction and the number of element antennas aligned in an elevation angle direction of the plural sets of element antennas 2-1$_n$ to 2-8$_n$ whose number is 256 in total and which construct the 32 sub array antennas 1-1 to 1-32 are 16×16.

Although it is assumed in this embodiment that the plurality of element antennas 2 are arranged in the form of a grid, the plurality of element antennas should just be arranged in two dimensions, and, for example, the plurality of element antennas can be alternatively arranged in the shape of an "L."

Further, the number of element antennas 2 which each sub array antenna 1 includes is not limited to eight, and it is needless to say that the number of element antennas 2 which each sub array antenna 1 includes is either seven or less, or nine or more.

The number-of-changes setting unit 5 of the excitation phase changing unit 4 receives a setting of the number M of times of change that the excitation phases of the element antennas 2-1$_1$ to 2-8$_1$, . . . , and 2-1$_{32}$ to 2-8$_{32}$ are to be changed, and outputs the number M of times of change to a phase value setting unit 6 (step ST11 of FIG. 11).

A user is enabled to set the number M of times of change of the excitation phases by manually operating the number-of-changes setting unit 5. As an alternative, the number-of-changes setting unit 5 can set the number M of times of change of the excitation phases by receiving information showing the number M of times of change of the excitation phases from outside the number-of-changes setting unit.

In this Embodiment 2, for the sake of simplicity, an example in which the number M of times of change of the excitation phases is two will be explained. The case in which the number M of times of change is two means that the excitation phases of the element antennas 2-1$_1$ to 2-8$_1$, . . . , and 2-1$_{32}$ to 2-8$_{32}$ are set twice, and the element antennas 2-1$_1$ to 2-8$_1$, . . . , and 2-1$_{32}$ to 2-8$_{32}$ are excited twice.

When the number-of-changes setting unit 5 sets the number M of times of change of the excitation phases, the phase value setting unit 6 of the excitation phase changing unit 4 receives a setting of the phase values of the excitation phases of the element antennas 2-1$_1$ to 2-8$_1$, . . . , and 2-1$_{32}$ to 2-8$_{32}$ only M times, M being the number of times of change, and outputs the phase values of the excitation phases to a control unit 7 (step ST12).

In this example, because the number M of times of change of the excitation phases is two, the phase value setting unit 6 receives two settings of the phase values of the excitation phases for the element antennas 2-1$_1$ to 2-8$_1$, . . . , and 2-1$_{32}$ to 2-8$_{32}$.

In this Embodiment 2, because the element antennas 2-1$_1$ to 2-8$_1$, . . . , and 2-1$_{32}$ to 2-8$_{32}$ are arranged in the form of a grid and the number of element antennas aligned in an azimuth angle direction and the number of element antennas aligned in an elevation angle direction are 16×16, there can be considered an example in which the phase values of the excitation phases of element antennas aligned in an azimuth angle direction are set to phase values as shown in FIGS. 5A and 5B, like in the case of the 16 element antennas 2-1$_1$ to 2-8$_1$ and 2-1$_2$ to 2-8$_2$ in above-mentioned Embodiment 1.

There can be considered an example in which the phase values of the excitation phases of element antennas aligned in an elevation angle direction are also set to phase value as shown in FIGS. 5A and 5B.

Although monopulse difference patterns and so on can be formed in a direction ahead of element antennas aligned in an azimuth angle direction and in a direction ahead of element antennas aligned in an elevation angle direction by setting phase values as shown in FIGS. 5A and 5B for the azimuth angle direction and the elevation angle direction, a monopulse sum pattern and a monopulse difference pattern can be formed in desired directions different from the directions ahead of element antennas by changing the phase values of the excitation phases as appropriate, like in the case of above-mentioned Embodiment 1.

In this Embodiment 2, a monopulse sum pattern and a monopulse difference pattern can be formed in desired directions by simply changing the phase values of the excitation phases as appropriate, without using such a variable attenuator as described in Patent Literature 2.

After the phase value setting unit 6 receives a number of settings of the phase values of the excitation phases, i.e. excitation phases A and B, the number of settings being equal to the number M of times of change (M=2), when receiving a first excitation instruction from the excitation time control unit 16, the control unit 7 of the excitation phase changing unit 4 sets the excitation phases of the element antennas 2-1$_1$ to 2-8$_1$, . . . , and 2-1$_{32}$ to 2-8$_{32}$ to the first excitation phases A by controlling phase shifters 3-1$_1$ to 3-8$_1$, . . . , and 3-1$_{32}$ to 3-8$_{32}$ dependently on the phase values whose setting is received by the phase value setting unit 6 (step ST13).

In this embodiment, for the sake of simplicity, it is assumed that for an azimuth angle direction and an elevation angle direction, phase values as shown in FIGS. 5A and 5B are set.

When receiving signals, the element antennas 2-1$_n$ to 2-8$_n$ ($n$=1, 2, . . . , 32) which construct each sub array antenna 1-$n$ output the received signals to the electric power combining unit 8-$n$.

The electric power combining unit 8-$n$ ($n$=1, 2, . . . , 32) combines the plurality of received signals of the element antennas 2-1$_n$ to 2-8$_n$ which construct the sub array antenna 1-$n$ into a composite signal and outputs the composite signal to the analog monopulse comparator 20 (step ST14).

When receiving the composite signals from the 32 electric power combining units 8-1 to 8-32, the analog monopulse comparator 20 generates an analog sum signal by in-phase combining the 32 composite signals (step ST15).

The in-phase combining of the 32 composite signals means that the analog monopulse comparator simply adds the 32 composite signals without changing the phases of the 32 composite signals, like in the case in which each electric power combining unit 8-$n$ ($n$=1, 2, ..., 32) combines a plurality of received signals.

The analog monopulse comparator 20 also generates an analog difference signal in an azimuth angle direction by out-of-phase combining, in the azimuth angle direction, the composite signals outputted from the 32 electric power combining units 8-1 to 8-32 (step ST15).

The analog monopulse comparator further generates an analog difference signal in an elevation angle direction by out-of-phase combining, in the elevation angle direction, the composite signals outputted from the 32 electric power combining units 8-1 to 8-32 (step ST15).

The out-of-phase combining in the azimuth angle direction of the 32 composite signals means that, for example, while the analog monopulse comparator calculates a first composite signal by simply adding the 16 composite signals outputted from the electric power combining units 8-1, 8-3, ..., and 8-31 without changing the phases of the 16 composite signals, the analog monopulse comparator shifts the phases of the 16 composite signals outputted from the electric power combining units 8-2, 8-4, ..., and 8-32 by 180 degrees and, after that, calculates a second composite signal by adding the 16 composite signals after phase shift, and then adds the first composite signal and the second composite signal.

Further, the out-of-phase combining in the elevation angle direction of the 36 composite signals means that while the analog monopulse comparator calculates a first composite signal by simply adding the 16 composite signals outputted from the electric power combining units 8-1 to 8-16 without changing the phases of the 16 composite signals, the analog monopulse comparator shifts the phases of the 16 composite signals outputted from the electric power combining units 8-17 to 8-32 by 180 degrees and, after that, calculates a second composite signal by adding the 16 composite signals after phase shift, and then adds the first composite signal and the second composite signal.

When the analog monopulse comparator 20 generates an analog sum signal, the A/D converter 11-1 converts the analog sum signal into a digital sum signal and outputs the digital sum signal to the radiation pattern forming unit 21 (step ST16).

When the analog monopulse comparator 20 generates an analog difference signal in an azimuth angle direction, the A/D converter 11-3 converts the analog difference signal in the azimuth angle direction into a digital difference signal and outputs the digital difference signal in the azimuth angle direction to the radiation pattern forming unit 21 (step ST16).

When the analog monopulse comparator 20 generates an analog difference signal in an elevation angle direction, the A/D converter 11-4 converts the analog difference signal in the elevation angle direction into a digital difference signal and outputs the digital difference signal in the elevation angle direction to the radiation pattern forming unit 21 (step ST16).

The phase offset amount setting unit 13 of the radiation pattern forming unit 21 receives, in advance, a setting of the phase offset amounts $\Phi_{m,k}$ which are amounts by which the phases of the digital sum signal and the digital difference signals in the azimuth angle direction and in the elevation angle direction, which are outputted from the A/D converters 11-1, 11-3 and 11-4, are to be shifted, and outputs the phase offset amounts $\Phi_{m,k}$ to the phase offset processing units 14-1, 14-3 and 14-4.

Because m is a variable showing a number of control of the excitation phases and M is 2, m is 1 or 2. k is a variable showing whether the corresponding phase offset amount corresponds to a sum pattern, a difference pattern in an azimuth angle direction, or a difference pattern in an elevation angle direction. For example, when k=1, the phase offset amount corresponds to a sum pattern, when k=2, the phase offset amount corresponds to a difference pattern in an azimuth angle direction, and when k=3, the phase offset amount corresponds to a difference pattern in an elevation angle direction.

Therefore, the phase offset amount setting unit 13 outputs the phase offset amount $\Phi_{1,1}$ and the phase offset amount $\Phi_{2,1}$ to the phase offset processing unit 14-1, outputs the phase offset amount $\Phi_{1,2}$ and the phase offset amount $\Phi_{2,2}$ to the phase offset processing unit 14-3, and outputs the phase offset amount $\Phi_{1,3}$ and the phase offset amount $\Phi_{2,3}$ to the phase offset processing unit 14-4.

Because it is assumed in this Embodiment 2 that, for example, the antenna device forms a monopulse sum pattern having low sidelobes and a monopulse difference pattern having low sidelobes in directions ahead of the element antennas 2-1₁ to 2-8₁ and 2-1₂ to 2-8₂ which construct the sub array antennas 1-1 to 1-2 and also forms a monopulse difference pattern having low sidelobes in a direction ahead of the element antennas 2-11, 2-13, ..., and 2-131, there can be considered a case in which values as will be shown below are set as the phase offset amounts $\Phi_{m,k}$.

$$\Phi_{1,1}=\Phi_{2,1}=\Phi_{1,2}=\Phi_{1,3}=0$$

$$\Phi_{2,2}=\Phi_{2,3}=180$$

It is preferable that the phase offset amounts $\Phi_{m,k}$ are set in such a way that a reduction in the sidelobes of the monopulse sum pattern and in the sidelobes of the monopulse difference pattern is accomplished. The phase offset amounts $\Phi_{m,k}$ can be set arbitrarily in consideration of the shapes of a desired monopulse sum pattern and desired monopulse difference patterns, the arrangement of the element antennas, the number of element antennas, the number M of times of change of the excitation phases, etc.

A user is enabled to set the phase offset amounts $\Phi_{m,k}$ by manually operating the phase offset amount setting unit 13. As an alternative, the phase offset amount setting unit 13 can set the phase offset amounts $\Phi_{m,k}$ by receiving information showing the phase offset amounts $\Phi_{m,k}$ from outside the phase offset amount setting unit.

Because it is assumed in this embodiment that the phase offset amounts $\Phi_{m,k}$ are set in advance, but not set in real time, the step of setting the offset amounts $\Phi_{m,k}$ is not included in the flow chart of FIG. 11. However, when the phase offset amounts $\Phi_{m,k}$ are set in real time, the step of setting the offset amounts $\Phi_{m,k}$ is added between the step of ST16 and the step of ST17.

When receiving a phase offset instruction corresponding to a first excitation from the excitation time control unit 16, the phase offset processing unit 14-1 of the radiation pattern forming unit 21 shifts the phase of the digital sum signal outputted from the A/D converter 11-1 by the phase offset amount $\Phi_{1,1}$ whose setting is received by the phase offset amount setting unit 13, and outputs the sum signal after phase shift to the time integration arithmetic operation unit 15-1 (step ST17).

When receiving a phase offset instruction corresponding to the first excitation from the excitation time control unit 16, the phase offset processing unit 14-3 of the radiation pattern forming unit 21 shifts the phase of the digital difference signal in the azimuth angle direction outputted from the A/D converter 11-3 by the phase offset amount $\Phi_{1,2}$ whose setting is received by the phase offset amount setting unit 13, and outputs the difference signal in the azimuth angle direction after phase shift to the time integration arithmetic operation unit 15-3 (step ST17).

When receiving a phase offset instruction corresponding to the first excitation from the excitation time control unit 16, the phase offset processing unit 14-4 of the radiation pattern forming unit 21 shifts the phase of the digital difference signal in the elevation angle direction outputted from the A/D converter 11-4 by the phase offset amount $\Phi_{1,3}$ whose setting is received by the phase offset amount setting unit 13, and outputs the difference signal in the elevation angle direction after phase shift to the time integration arithmetic operation unit 15-4 (step ST17).

Because the example in which the phase offset amounts $\Phi_{1,1}$, $\Phi_{1,2}$ and $\Phi_{1,3}$ whose setting is received by the phase offset amount setting unit 13 are $\Phi_{1,1}=\Phi_{1,2}=\Phi_{1,3}=0$ is shown in this Embodiment 2, the phase shifts provided by the phase offset processing units 14-1, 14-3 and 14-4 are 0 degrees. Therefore, the phase of the digital sum signal outputted from the A/D converter 11-1 is not shifted and the sum signal is outputted to the time integration arithmetic operation unit 15-1, just as it is, while the phase of the digital difference signal in the azimuth angle direction outputted from the A/D converter 11-3 is not shifted and the difference signal is outputted to the time integration arithmetic operation unit 15-3, just as it is. Further, the phase of the digital difference signal in the elevation angle direction outputted from the A/D converter 11-4 is not shifted and the difference signal is outputted to the time integration arithmetic operation unit 15-4, just as it is.

When receiving the sum signal after phase shift from the phase offset processing unit 14-1, the time integration arithmetic operation unit 15-1 of the radiation pattern forming unit 21 stores the sum signal after phase shift.

When receiving the difference signal in the azimuth angle direction after phase shift from the phase offset processing unit 14-3, the time integration arithmetic operation unit 15-3 of the radiation pattern forming unit 21 stores the difference signal in the azimuth angle direction after phase shift.

When receiving the difference signal in the elevation angle direction after phase shift from the phase offset processing unit 14-4, the time integration arithmetic operation unit 15-4 of the radiation pattern forming unit 21 stores the difference signal in the elevation angle direction after phase shift.

The excitation time control unit 16 determines whether or not excitations whose number is equal to the number M of times of change whose setting is received by the number-of-changes setting unit 5 have been completed (step ST18).

At this time, because only the first excitation has been completed, but a second excitation has not been completed (when NO in step ST18), the excitation time control unit 16 outputs a second excitation instruction to the control unit 7 of the excitation phase changing unit 4.

When receiving the second excitation instruction from the excitation time control unit 16, the control unit 7 of the excitation phase changing unit 4 sets the excitation phases of the element antennas $2\text{-}1_1$ to $2\text{-}8_1$, . . . , and $2\text{-}1_{32}$ to $2\text{-}8_{32}$ to the second excitation phases B by controlling the phase shifters $3\text{-}1_1$ to $3\text{-}8_1$, . . . , and $3\text{-}1_{32}$ to $3\text{-}8_{32}$ dependently on the phase values whose setting is received by the phase value setting unit 6 (step ST13).

When receiving signals, the element antennas $2\text{-}1_n$ to $2\text{-}8_n$ (n=1, 2, . . . , 32) which construct the sub array antenna 1-$n$ output the received signals to the electric power combining unit 8-$n$.

The electric power combining unit 8-$n$ (n=1, 2, . . . , 32) combines the plurality of received signals of the element antennas $2\text{-}1_n$ to $2\text{-}8_n$ which construct the sub array antenna 1-$n$ into a composite signal and outputs the composite signal to the analog monopulse comparator 20 (step ST14).

When receiving the composite signals from the 32 electric power combining units 8-1 to 8-32, the analog monopulse comparator 20 generates an analog sum signal by in-phase combining the 32 composite signals (step ST15).

The analog monopulse comparator 20 further generates an analog difference signal in an azimuth angle direction by out-of-phase combining, in the azimuth angle direction, the 32 composite signals outputted from the 32 electric power combining units 8-1 to 8-32, and also generates an analog difference signal in an elevation angle direction by out-of-phase combining, in the elevation angle direction, the 32 composite signals (step ST15).

When the analog monopulse comparator 20 generates an analog sum signal, the A/D converter 11-1 converts the analog sum signal into a digital sum signal and outputs the digital sum signal to the radiation pattern forming unit 21 (step ST16).

When the analog monopulse comparator 20 generates an analog difference signal in an azimuth angle direction, the A/D converter 11-3 converts the analog difference signal in the azimuth angle direction into a digital difference signal and outputs the digital difference signal in the azimuth angle direction to the radiation pattern forming unit 21 (step ST16).

When the analog monopulse comparator 20 generates an analog difference signal in an elevation angle direction, the A/D converter 11-4 converts the analog difference signal in the elevation angle direction into a digital difference signal and outputs the digital difference signal in the elevation angle direction to the radiation pattern forming unit 21 (step ST16).

When receiving a phase offset instruction corresponding to the second excitation from the excitation time control unit 16, the phase offset processing unit 14-1 of the radiation pattern forming unit 21 shifts the phase of the digital sum signal outputted from the A/D converter 11-1 by the phase offset amount $\Phi_{2,1}$ whose setting is received by the phase offset amount setting unit 13, and outputs the sum signal after phase shift to the time integration arithmetic operation unit 15-1 (step ST17).

When receiving a phase offset instruction corresponding to the second excitation from the excitation time control unit 16, the phase offset processing unit 14-3 of the radiation pattern forming unit 21 shifts the phase of the digital difference signal in the azimuth angle direction outputted from the A/D converter 11-3 by the phase offset amount $\Phi_{2,2}$ whose setting is received by the phase offset amount setting unit 13, and outputs the difference signal in the azimuth angle direction after phase shift to the time integration arithmetic operation unit 15-3 (step ST17).

When receiving a phase offset instruction corresponding to the second excitation from the excitation time control unit 16, the phase offset processing unit 14-4 of the radiation pattern forming unit 21 shifts the phase of the digital difference signal in the elevation angle direction outputted from A/D converter 11-4 by the phase offset amount $\Phi_{2,3}$ whose setting is received by the phase offset amount setting unit 13, and outputs the difference signal in the elevation angle direction after phase shift to the time integration arithmetic operation unit 15-4 (step ST17).

Because the example in which the phase offset amount $\Phi_{2,1}$ whose setting is received by the phase offset amount setting unit 13 is $\Phi_{2,1}=0$ is shown in this Embodiment 2, the phase shift provided by the phase offset processing unit 14-1 is 0 degrees. Therefore, the phase of the digital sum signal outputted from the A/D converter 11-1 is not shifted and the sum signal is outputted to the time integration arithmetic operation unit 15-1, just as it is.

On the other hand, because the example in which the phase offset amount $\Phi_{2,2}$ whose setting is received by the phase offset amount setting unit 13 is $\Phi_{2,2}=180$ is shown, the phase shift provided by the phase offset processing unit 14-3 is 180 degrees. Therefore, the phase of the digital difference signal in the azimuth angle direction outputted from the A/D converter 11-3 is shifted by 180 degrees, and the difference signal whose phase is shifted by 180 degrees is outputted to the time integration arithmetic operation unit 15-3.

Further, because the example in which the phase offset amount $\Phi_{2,3}$ whose setting is received by the phase offset amount setting unit 13 is $\Phi_{2,3}=180$ is shown, the phase shift provided by the phase offset processing unit 14-4 is 180 degrees. Therefore, the phase of the digital difference signal in the elevation angle direction outputted from the A/D converter 11-4 is shifted by 180 degrees, and the difference signal whose phase is shifted by 180 degrees is outputted to the time integration arithmetic operation unit 15-4.

When receiving the sum signal after phase shift from the phase offset processing unit 14-1, the time integration arithmetic operation unit 15-1 of the radiation pattern forming unit 21 stores the sum signal after phase shift.

When receiving the difference signal in the azimuth angle direction after phase shift from the phase offset processing unit 14-3, the time integration arithmetic operation unit 15-3 of the radiation pattern forming unit 21 stores the difference signal in the azimuth angle direction after phase shift.

When receiving the difference signal in the elevation angle direction after phase shift from the phase offset processing unit 14-4, the time integration arithmetic operation unit 15-4 of the radiation pattern forming unit 21 stores the difference signal in the elevation angle direction after phase shift.

The excitation time control unit 16 determines whether or not excitations whose number is equal to the number M of times of change whose setting is received by the number-of-changes setting unit 5 have been completed (step ST18).

At this time, because the second excitation has been completed (when YES in step ST18), the excitation time control unit 16 outputs a time integration instruction to the time integration arithmetic operation units 15-1, 15-3 and 15-4.

When receiving the time integration instruction from the excitation time control unit 16, the time integration arithmetic operation unit 15-1 of the radiation pattern forming unit 21 forms a monopulse sum pattern by time-integrating the plurality of sum signals stored whose number is equal to the number M of times of change (M=2) (step ST19).

When receiving the time integration instruction from the excitation time control unit 16, the time integration arithmetic operation unit 15-3 of the radiation pattern forming unit 21 forms a monopulse difference pattern in the azimuth angle direction by time-integrating the plurality of difference signals stored whose number is equal to the number M of times of change (M=2) (step ST19).

When receiving the time integration instruction from the excitation time control unit 16, the time integration arithmetic operation unit 15-4 of the radiation pattern forming unit 21 forms a monopulse difference pattern in the elevation angle direction by time-integrating the plurality of difference signals stored whose number is equal to the number M of times of change (M=2) (step ST19).

In this embodiment, the time integration arithmetic operation unit 15-1 forms a monopulse sum pattern by time-integrating the plurality of sum signals stored whose number is equal to the number M of times of change. As an alternative, the time integration arithmetic operation unit can form a monopulse sum pattern by performing a discrete Fourier transform on the plurality of sum signals stored whose number is equal to the number M of times of change.

Further, each of the time integration arithmetic operation units 15-3 and 15-4 forms a monopulse difference pattern by time-integrating the plurality of difference signals stored whose number is equal to the number M of times of change. As an alternative, each of the time integration arithmetic operation units can form a monopulse difference pattern by performing a discrete Fourier transform on the plurality of difference signals stored whose number is equal to the number M of times of change.

As can be seen from the above description, because the antenna device according to this Embodiment 2 is configured in such a way that the analog monopulse comparator 20 generates a difference signal in an azimuth angle direction by out-of-phase combining, in the azimuth angle direction, the composite signals outputted from the electric power combining units 8-1 to 8-32 and also generates a difference signal in an elevation angle direction by out-of-phase combining, in the elevation angle direction, the composite signals outputted from the electric power combining unit 8-1 to 8-32, in addition to generating a sum signal by in-phase combining the composite signals outputted from the electric power combining units 8-1 to 8-32, and, every time the excitation phases are changed by the excitation phase changing unit 4, the radiation pattern forming unit 21 shifts the phases of the digital sum signal and the digital difference signals in the azimuth angle direction and in the elevation angle direction, which are outputted from the A/D converters 11-1 to 11-3, and forms a monopulse difference pattern in the azimuth angle direction by time-integrating the difference signal in the azimuth angle direction after phase shift and also forms a monopulse difference pattern in the elevation angle direction by time-integrating the difference signal in the elevation angle direction after phase shift, in addition to forming a monopulse sum pattern by time-integrating the sum signal after phase shift, there is provided an advantage of being able to, even when simultaneously forming a monopulse sum pattern in an azimuth angle direction and a monopulse difference pattern in an elevation angle direction, accomplish a reduction in the sidelobes of a monopulse sum pattern and in the sidelobes of the monopulse difference patterns without causing an increase in the hardware cost, and also orient the monopulse sum pattern and the monopulse difference patterns toward desired directions.

Embodiment 3

Although the example in which the signal combining unit 9 includes the analog monopulse comparator 10 and the two A/D converters 11-1 and 11-2 is shown in above-mentioned Embodiment 1, the signal combining unit can alternatively include N A/D converters and a digital monopulse comparator.

Figure 13:
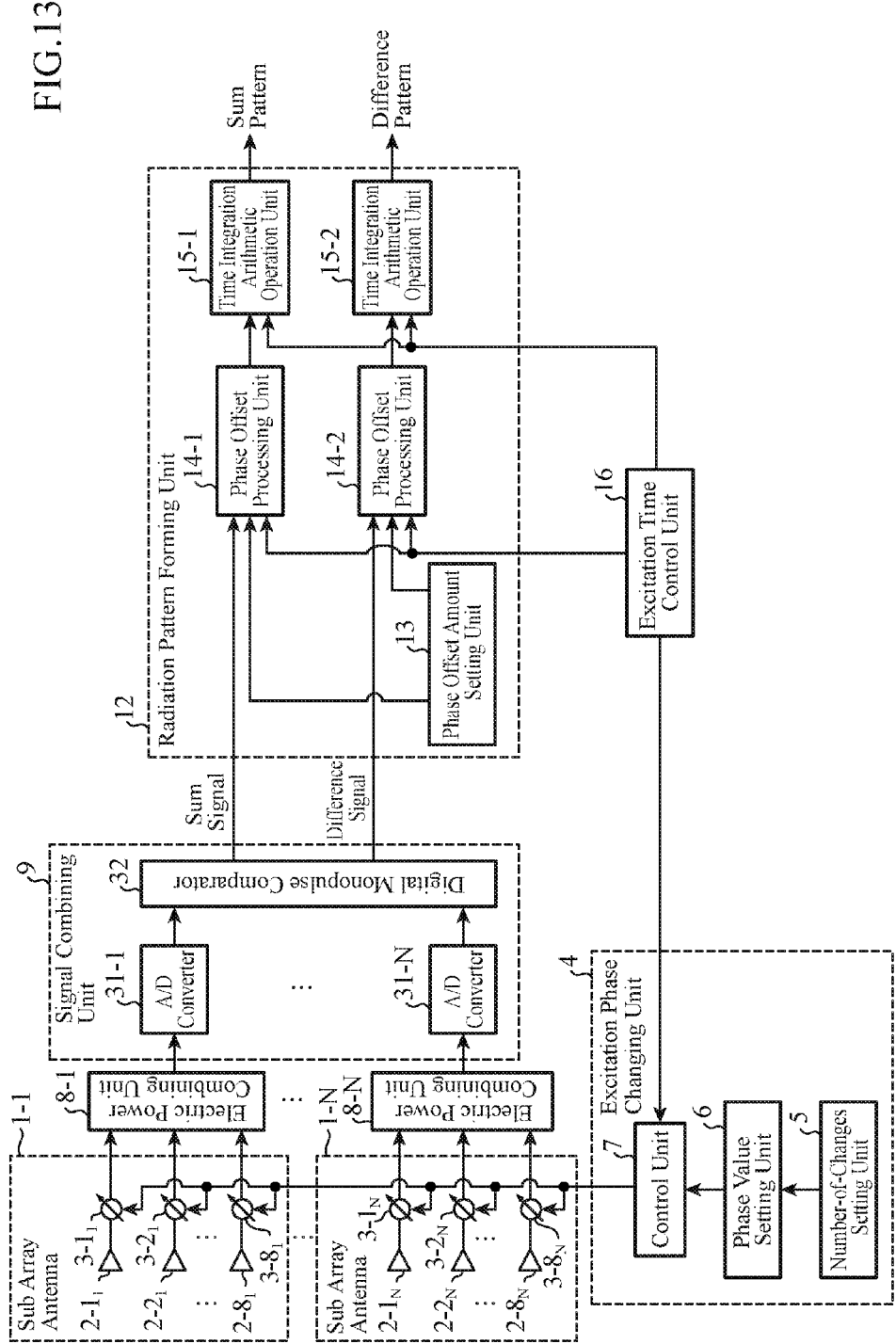
FIG. 13 is a block diagram showing an antenna device according to Embodiment 3 of the present invention.

FIG. 13 is a block diagram showing an antenna device according to Embodiment 3 of the present invention. In FIG. 13, because the same reference numerals as those shown in FIG. 1 denote the same components or like components, the explanation of the components will be omitted hereafter.

Each A/D converter 31-$n$ ($n$=1, 2, . . . , N) is an analog-to-digital converter that converts an analog composite signal outputted from an electric power combining unit 8-$n$ into a digital composite signal, and outputs the digital composite signal to a digital monopulse comparator 32.

The digital monopulse comparator 32 generates a digital sum signal by in-phase combining the digital composite signals outputted from the A/D converters 31-1 to 31-N and outputs a digital sum signal to the radiation pattern forming unit 12, and also generates a digital difference signal by out-of-phase combining the digital composite signals outputted from the A/D converters 31-1 to 31-N and outputs the digital difference signal to the radiation pattern forming unit 12.

Next, operations will be explained.

Because components other than a signal combining unit 9 are the same as those according to above-mentioned Embodiment 1, only the details of processing performed by the signal combining unit 9 will be explained hereafter.

The A/D converters 31-$n$ ($n$=1, 2, . . . , N) of the signal combining unit 9 are disposed respectively for the electric power combining units 8-$n$, and, when receiving the analog composite signal from the electric power combining unit 8-$n$, each of the A/D converters converts the composite signal into a digital signal and outputs the digital composite signal to the digital monopulse comparator 32.

When receiving the digital composite signals from the A/D converters 31-1 to 31-N, the digital monopulse comparator 32 of the signal combining unit 9 generates a digital sum signal by in-phase combining the 32 digital composite signals and outputs the digital sum signal to the radiation pattern forming unit 12.

The digital monopulse comparator 32 also generates a digital difference signal by out-of-phase combining the 32 digital composite signals outputted from the A/D converters 31-1 to 31-N and outputs the digital difference signal to the radiation pattern forming unit 12.

Although the in-phase combining process and the out-of-phase combining process performed by the digital monopulse comparator 32 differ from those performed by the analog monopulse comparator 10 in that digital signals are handled in the in-phase combining process and the out-of-phase combining process, the essence of the in-phase combining process and the out-of-phase combining process is the same as that of the in-phase combining process and the out-of-phase combining process performed by the analog monopulse comparator 10.

Embodiment 4

Although the example in which the signal combining unit 9 includes the analog monopulse comparator 20 and the three A/D converters 11-1, 11-3 and 11-4 is shown in above-mentioned Embodiment 2, the signal combining unit can alternatively include N A/D converters and a digital monopulse comparator.

Figure 14:
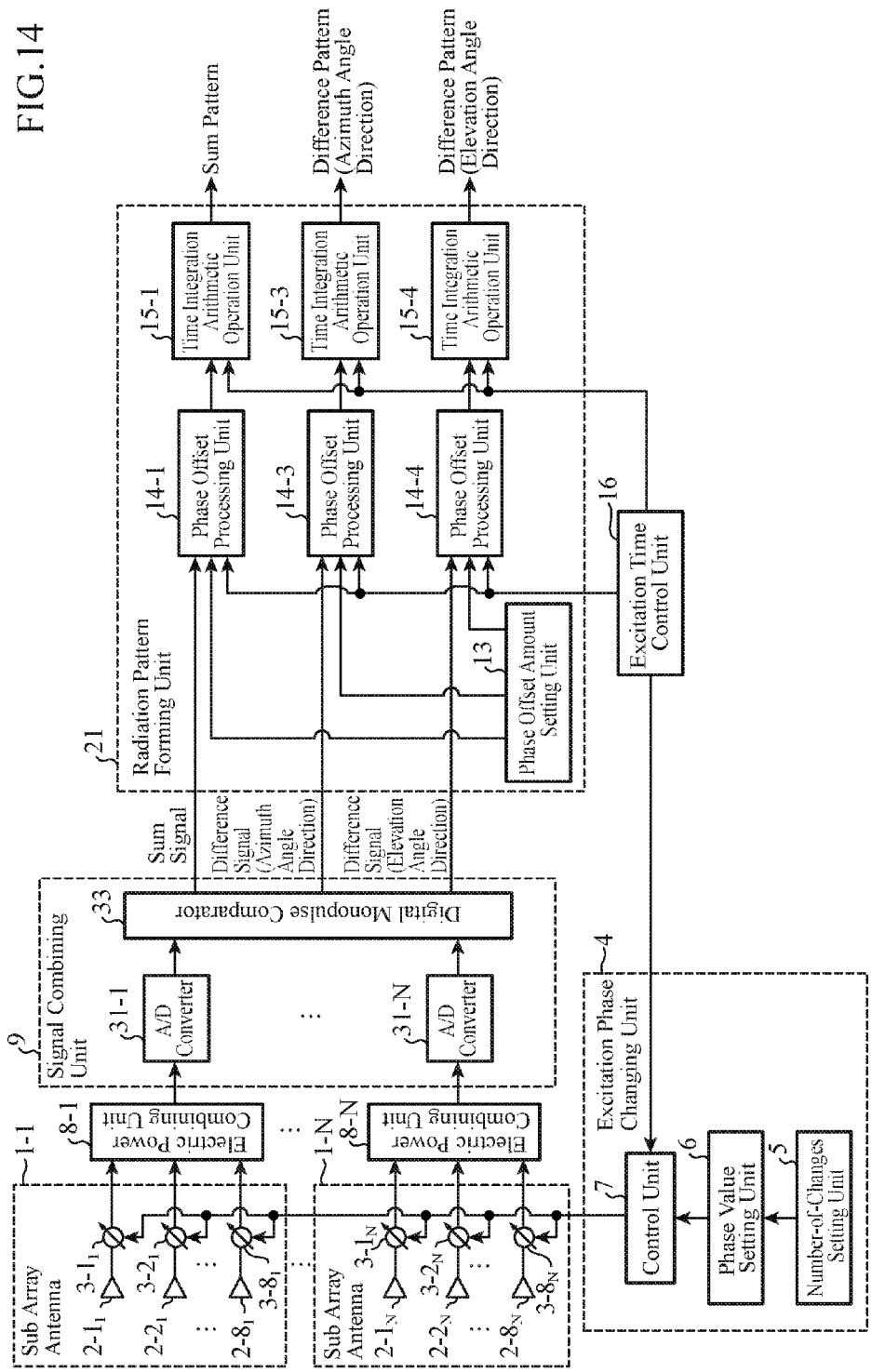
FIG. 14 is a block diagram showing an antenna device according to Embodiment 4 of the present invention.

FIG. 14 is a block diagram showing an antenna device according to Embodiment 4 of the present invention. In FIG. 14, because the same reference numerals as those shown in FIGS. 9 and 13 denote the same components or like components, the explanation of the components will be omitted hereafter.

A digital monopulse comparator 33 generates a digital sum signal by in-phase combining digital composite signals outputted from A/D converters 31-1 to 31-N.

The digital monopulse comparator 33 further generates a digital difference signal in an azimuth angle direction by out-of-phase combining, in the azimuth angle direction, the digital composite signals outputted from the A/D converters 31-1 to 31-N, and also generates a digital difference signal in an elevation angle direction by out-of-phase combining, in the elevation angle direction, the digital composite signals outputted from the A/D converters 31-1 to 31-N.

Next, operations will be explained.

Because components other than a signal combining unit 9 are the same as those according to above-mentioned Embodiment 2, only the details of processing performed by the signal combining unit 9 will be explained hereafter.

The A/D converters 31-$n$ ($n$=1, 2, . . . , N) of the signal combining unit 9 are disposed respectively for electric power combining units 8-$n$, and, when receiving the analog composite signal from the electric power combining unit 8-$n$, each of the A/D converters converts the composite signal into a digital signal and outputs the digital composite signal to the digital monopulse comparator 33.

When receiving the digital composite signals from the A/D converters 31-1 to 31-N, the digital monopulse comparator 33 of the signal combining unit 9 generates a digital sum signal by in-phase combining the 32 digital composite signals and outputs the digital sum signal to a radiation pattern forming unit 21.

The digital monopulse comparator 33 also generates a digital difference signal in an azimuth angle direction by out-of-phase combining, in the azimuth angle direction, the 32 digital composite signals outputted from the A/D converters 31-1 to 31-N and outputs the digital difference signal in the azimuth angle direction to the radiation pattern forming unit 21.

The digital monopulse comparator 33 further generates a digital difference signal in an elevation angle direction by out-of-phase combining, in the elevation angle direction, the 32 digital composite signals outputted from the A/D converters 31-1 to 31-N and outputs the digital difference signal in the elevation angle direction to the radiation pattern forming unit 21.

Although the in-phase combining process and the out-of-phase combining process performed by the digital monopulse comparator 33 differ from those performed by the analog monopulse comparator 20 in that digital signals are handled in the in-phase combining process and the out-of-phase combining process, the essence of the in-phase combining process and the out-of-phase combining process is the same as that of the in-phase combining process and the out-of-phase combining process performed by the analog monopulse comparator 20.

Embodiment 5

Although the example in which the signal combining unit 9 generates a digital sum signal and a digital difference signal and the radiation pattern forming unit 12 or 21 forms a monopulse sum pattern and a monopulse difference pattern is shown in above-mentioned Embodiments 1 to 4, the signal combining unit 9 can further form a radiation pattern which is different from both the monopulse sum pattern and the monopulse difference pattern by generating a signal for radiation pattern formation which is different from both the digital sum signal and the digital difference signal in addition to generating the digital sum signal and the digital difference signal.

Figure 15:
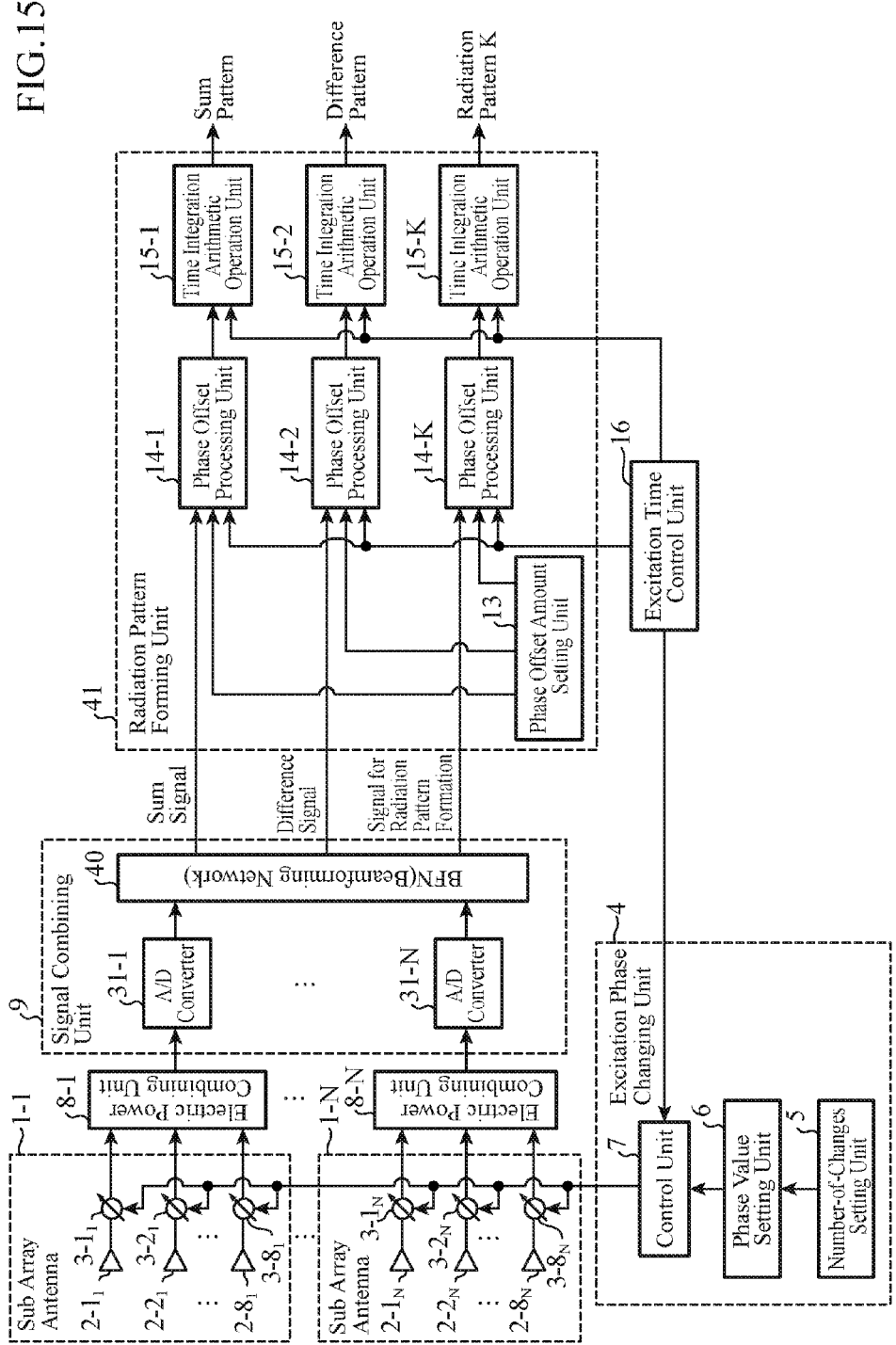
FIG. 15 is a block diagram showing an antenna device according to Embodiment 5 of the present invention.
Figure 16:
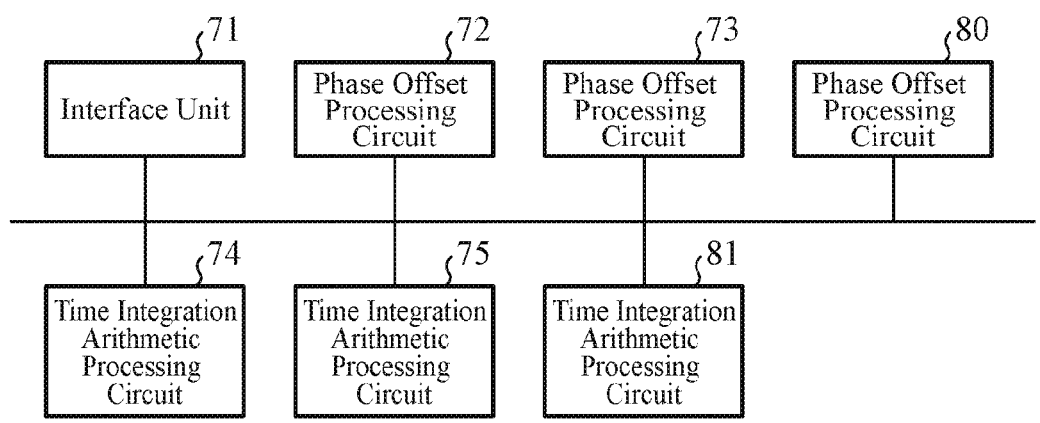
FIG. 16 is a hardware block diagram of a radiation pattern forming unit 41 in the antenna device according to Embodiment 5 of the present invention.

FIG. 15 is a block diagram showing an antenna device according to Embodiment 5 of the present invention, and FIG. 16 is a hardware block diagram of a radiation pattern forming unit 41 in the antenna device according to Embodiment 5 of the present invention.

In FIGS. 15 and 16, because the same reference numerals as those shown in FIGS. 1 and 2 denote the same components or like components, the explanation of the components will be omitted hereafter.

A BFN 40 is a beamforming network that generates a digital sum signal by in-phase combining digital composite signals outputted from A/D converters 31-1 to 31-N, generates a digital difference signal by out-of-phase combining the digitals composite signal outputted from the A/D converters 31-1 to 31-N, and generates at least one digital signal for radiation pattern formation by weighting and combining the digital composite signals outputted from the A/D converters 31-1 to 31-N.

A radiation pattern forming unit 41 includes a phase offset amount setting unit 13, phase offset processing units 14-1, 14-2 and 14-K and time integration arithmetic operation units 15-1, 15-2 and 15-K, and, every time the excitation phases are changed by an excitation phase changing unit 4, forms a monopulse sum pattern from the digital sum signal outputted from the BFN 40 and also forms a monopulse difference pattern from the digital difference signal outputted from the BFN 40. The radiation pattern forming unit further forms a radiation pattern which is different from both the monopulse sum pattern and the monopulse difference pattern from the signal for radiation pattern formation outputted from the BFN 40.

Each phase offset processing unit 14-K of the radiation pattern forming unit 41 is implemented by a phase offset processing circuit 80 comprised of a semiconductor integrated circuit equipped with a CPU, a one chip microcomputer or the like, and a plurality of phase offset processing units K can be disposed, the number of phase offset processing units being equal to the number of signals for radiation pattern formation generated by the BFN 40. For example, when the number of signals for radiation pattern formation generated by the BFN 40 is one, one phase offset processing unit 14-K is installed in the radiation pattern forming unit 41, and when the number of signals for radiation pattern formation generated by the BFN 40 is two, two phase offset processing units 14-K are installed in the radiation pattern forming unit 41.

Each phase offset processing unit 14-K performs a process of, under an instruction from an excitation time control unit 16, shifting the phase of the signal for radiation pattern formation outputted from the BFN 40 by a phase offset amount whose setting is received by the phase offset amount setting unit 13, and outputting the signal for radiation pattern formation after phase shift to the time integration arithmetic operation unit 15-K.

Each time integration arithmetic operation unit 15-K of the radiation pattern forming unit 41 is implemented by a time integration arithmetic processing circuit 81 comprised of a semiconductor integrated circuit equipped with a CPU, a one chip microcomputer or the like, and a plurality of time integration arithmetic operation units can be disposed, the number of time integration arithmetic operation units being equal to the number of signals for radiation pattern formation generated by the BFN 40.

Each time integration arithmetic operation unit 15-K performs a process of, under an instruction from the excitation time control unit 16, storing the signal for radiation pattern formation after phase shift outputted from the phase offset processing unit 14-K, and forming a radiation pattern which is different from both a monopulse sum pattern and a monopulse difference pattern by time-integrating a plurality of signals for radiation pattern formation, the number of signals for radiation pattern formation being equal to the number M of times of change set by a number-of-changes setting unit 5.

In the example shown in FIG. 15, it is assumed that the phase offset amount setting unit 13, the phase offset processing units 14-1, 14-2 and 14-K and the time integration arithmetic operation units 15-1, 15-2 and 15-4K, which are the components of the radiation pattern forming unit 41, are comprised of pieces of hardware for exclusive use, respectively. As an alternative, the radiation pattern forming unit 41 can consist of a computer.

In the case in which the radiation pattern forming unit 41 consists of a computer, a program in which processes performed by the phase offset amount setting unit 13, the phase offset processing units 14-1, 14-2 and 14-K and the time integration arithmetic operation units 15-1, 15-2 and 15-K are described can be stored in a memory 51 of the computer shown in FIG. 3 and a processor 52 of the computer shown in FIG. 3 can be made to execute the program stored in the memory 51.

Figure 17:
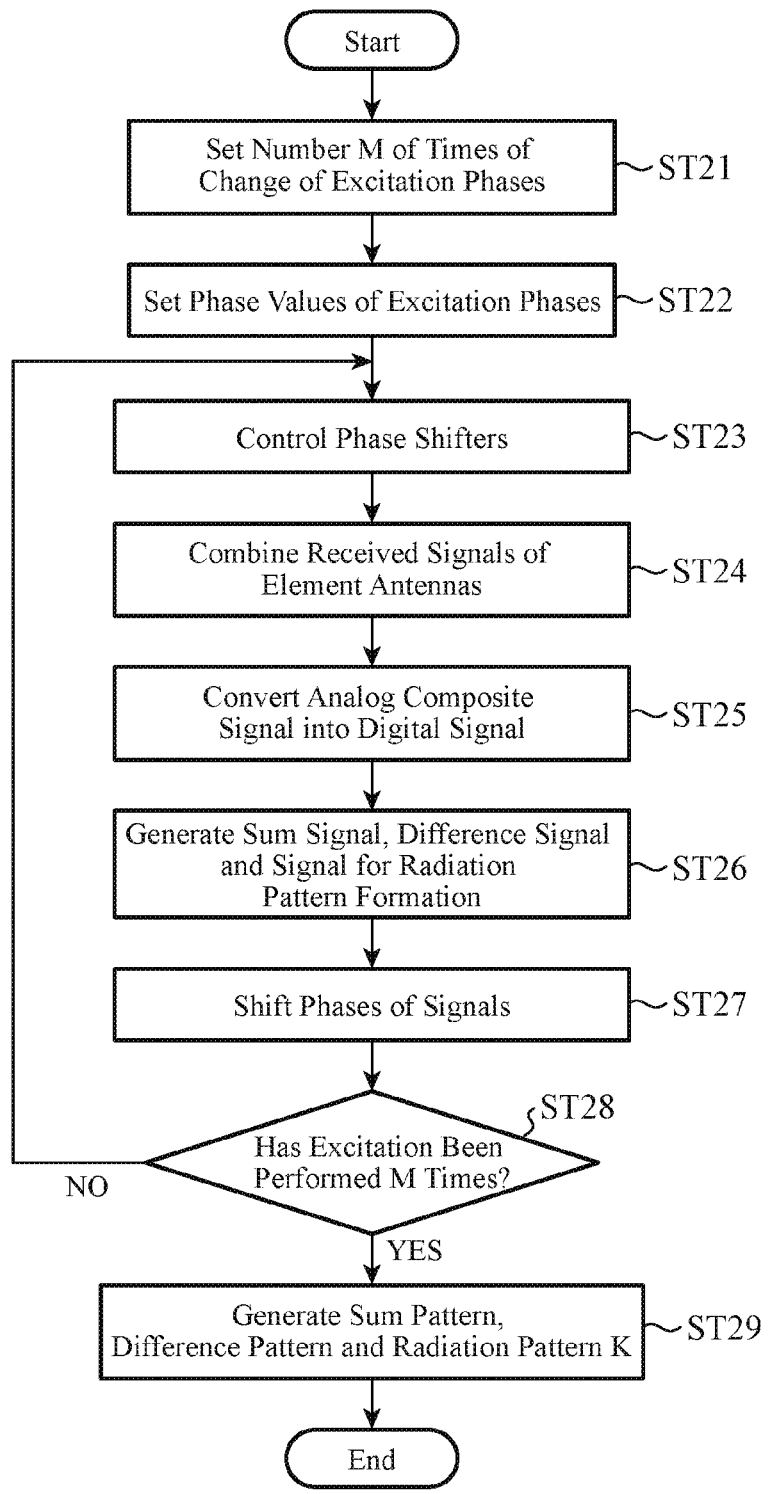
FIG. 17 is a flow chart showing an antenna excitation method corresponding to processing performed by the antenna device according to Embodiment 5 of the present invention.

FIG. 17 is a flow chart showing an antenna excitation method corresponding to processing performed by the antenna device according to Embodiment 5 of the present invention.

Next, operations will be explained.

This Embodiment 5 differs from above-mentioned Embodiment 1 in that the antenna device forms a radiation pattern which is different from both a monopulse sum pattern and a monopulse difference pattern, in addition to forming the monopulse sum pattern and the monopulse difference pattern.

In this Embodiment 5, it is assumed that, for example, N is 32, and sub array antennas 1-$n$ ($n=1, 2, \ldots, 32$) each comprised of eight element antennas 2-$1_n$ to 2-$8_n$ are arranged in two dimensions, as shown in FIG. 12.

Concretely, it is assumed that the plural sets of element antennas 2-$1_n$ to 2-$8_n$ whose number is 256 in total and which construct the 32 sub array antennas 1-1 to 1-32 are arranged in the form of a grid, as shown in FIG. 12.

More specifically, it is assumed that the number of element antennas aligned in an azimuth angle direction and the number of element antennas aligned in an elevation angle direction of the plural sets of element antennas 2-$1_n$ to 2-$8_n$ whose number is 256 in total and which construct the 32 sub array antennas 1-1 to 1-32 are 16×16.

Although it is assumed in this embodiment that the plurality of element antennas 2 are arranged in the form of a grid, the plurality of element antennas should just be arranged in two dimensions, and, for example, the plurality of element antennas can be alternatively arranged in the shape of an "L."

Further, the number of element antennas 2 which each sub array antenna 1 includes is not limited to eight, and it is needless to say that the number of element antennas 2 which each sub array antenna 1 includes is either seven or less, or nine or more.

The number-of-changes setting unit 5 of the excitation phase changing unit 4 receives a setting of the number M of times of change that the excitation phases of the element antennas $2\text{-}1_1$ to $2\text{-}8_1$, ..., and $2\text{-}1_{32}$ to $2\text{-}8_{32}$ are to be changed, and outputs the number M of times of change to a phase value setting unit 6 (step ST21 of FIG. 17).

A user is enabled to set the number M of times of change of the excitation phases by manually operating the number-of-changes setting unit 5. As an alternative, the number-of-changes setting unit 5 can set the number M of times of change of the excitation phases by receiving information showing the number M of times of change of the excitation phases from outside the number-of-changes setting unit.

In this Embodiment 5, for the sake of simplicity, an example in which the number M of times of change of the excitation phases is two will be explained. The case in which the number M of times of change is two means that the excitation phases of the element antennas $2\text{-}1_1$ to $2\text{-}8_1$, ..., and $2\text{-}1_{32}$ to $2\text{-}8_{32}$ are set twice, and the element antennas $2\text{-}1_1$ to $2\text{-}8_1$, ..., and $2\text{-}1_{32}$ to $2\text{-}8_{32}$ are excited twice.

When the number-of-changes setting unit 5 sets the number M of times of change of the excitation phases, the phase value setting unit 6 of the excitation phase changing unit 4 receives a setting of the phase values of the excitation phases of the element antennas $2\text{-}1_1$ to $2\text{-}8_1$, ..., and $2\text{-}1_{32}$ to $2\text{-}8_{32}$ only M times, M being the number of times of change, and outputs the phase values of the excitation phases to a control unit 7 (step ST22).

In this example, because the number M of times of change of the excitation phases is two, the phase value setting unit 6 receives two settings of the phase values of the excitation phases for the element antennas $2\text{-}1_1$ to $2\text{-}8_1$, ..., and $2\text{-}1_{32}$ to $2\text{-}8_{32}$.

In this Embodiment 5, because the element antennas $2\text{-}1_1$ to $2\text{-}8_1$, ..., and $2\text{-}1_{32}$ to $2\text{-}8_{32}$ are arranged in the form of a grid and the number of element antennas aligned in an azimuth angle direction and the number of element antennas aligned in an elevation angle direction are 16×16, there can be considered an example in which the phase values of the excitation phases of element antennas aligned in an azimuth angle direction are set to phase values as shown in FIGS. 5A and 5B, like in the case of the 16 element antennas $2\text{-}1_1$ to $2\text{-}8_1$ and $2\text{-}1_2$ to $2\text{-}8_2$ in above-mentioned Embodiment 1.

There can be considered an example in which the phase values of the excitation phases of element antennas aligned in an elevation angle direction are also set to phase value as shown in FIGS. 5A and 5B.

Although monopulse difference patterns and so on can be formed in a direction ahead of element antennas aligned in an azimuth angle direction and in a direction ahead of element antennas aligned in an elevation angle direction by setting phase values as shown in FIGS. 5A and 5B for the azimuth angle direction and the elevation angle direction, a monopulse sum pattern and a monopulse difference pattern can be formed in desired directions different from the directions ahead of element antennas by changing the phase values of the excitation phases as appropriate, like in the case of above-mentioned Embodiment 1.

In this Embodiment 5, a monopulse sum pattern, a monopulse difference pattern and so on can be formed in desired directions by simply changing the phase values of the excitation phases as appropriate, without using such a variable attenuator as described in Patent Literature 2.

After the phase value setting unit 6 receives a number of settings of the phase values of the excitation phases, i.e. excitation phases A and B, the number of settings being equal to the number M of times of change (M=2), when receiving a first excitation instruction from the excitation time control unit 16, the control unit 7 of the excitation phase changing unit 4 sets the excitation phases of the element antennas $2\text{-}1_1$ to $2\text{-}8_1$, ..., and $2\text{-}1_{32}$ to $2\text{-}8_{32}$ to the first excitation phases A by controlling phase shifters $3\text{-}1_1$ to $3\text{-}8_1$, ..., and $3\text{-}1_{32}$ to $3\text{-}8_{32}$ dependently on the phase values whose setting is received by the phase value setting unit 6 (step ST23).

In this embodiment, for the sake of simplicity, it is assumed that for an azimuth angle direction and an elevation angle direction, phase values as shown in FIGS. 5A and 5B are set.

When receiving signals, the element antennas $2\text{-}1_n$ to $2\text{-}8_n$ (n=1, 2, ..., 32) which construct the sub array antenna 1-n output the received signals to the electric power combining unit 8-n.

The electric power combining unit 8-n (n=1, 2, ..., 32) combines the plurality of received signals of the element antennas $2\text{-}1_n$ to $2\text{-}8_n$ which construct the sub array antenna 1-n into a composite signal and outputs the composite signal to a signal combining unit 9 (step ST24).

When receiving the analog composite signal from the electric power combining unit 8-n, the A/D converter 31-n (n=1, 2, ..., N) of the signal combining unit 9 converts the composite signal into a digital signal and outputs the digital composite signal to the BFN 40 (step ST25).

When receiving the digital composite signals from the A/D converter 31-1 to 31-N, the BFN 40 of the signal combining unit 9 generates a digital sum signal by in-phase combining the 32 digital composite signals and outputs the digital sum signal to the radiation pattern forming unit 41, like the digital monopulse comparator 32 shown in FIG. 13 (step ST26).

The BFN 40 also generates a digital difference signal by out-of-phase combining the digital composite signals outputted from the A/D converters 31-1 to 31-N, and outputs the digital difference signal to the radiation pattern forming unit 41, like the digital monopulse comparator 32 shown in FIG. 13 (step ST26).

The BFN 40 further generates, as at least one digital signal for radiation pattern formation which is different from both a digital sum signal and a digital difference signal, a signal for forming a radiation pattern in, for example, a direction which is shifted by a predetermined angle from a direction in which a monopulse difference pattern is formed, by weighting and combining the digital composite signals outputted from the A/D converters 31-1 to 31-N, and outputs the digital signal for radiation pattern formation to the radiation pattern forming unit 41 (step ST26).

For example, the weighting and combining process means that the BFN multiplies the 16 composite signals outputted from the A/D converter 31-1 to 31-16 by a weighting factor a ($0 \leq a \leq 1$) and calculates a first composite signal by simply adding the 16 composite signals without changing the phases of the 16 composite signals multiplied by the weighting factor a, while multiplying the 16 composite signals outputted from the A/D converters 31-17 to 31-32 by a weighting factor b ($0 \leq b \leq 1$) and, after shifting the phases of the 16 composite signals multiplied by the weighting factor b by 180 degrees, calculates a second composite signal by adding the 16 composite signals after phase shift, and then adds the first composite signal and the second composite signal.

The weighting factors a and b can be set arbitrarily in consideration of the shape and the direction of each radiation pattern K to be formed.

Although the example of shifting the phases of the 16 composite signals multiplied by the weighting factor b by 180 degrees without changing the phases of the 16 composite signals multiplied by the weighting factor a is shown above, this example is only an example. As an alternative, the phases of the 16 composite signals multiplied by the weighting factor a can be shifted, or the phases of the 16 composite signals multiplied by the weighting factor b can be shifted by a phase amount other than 180 degrees.

Further, although the example of multiplying the 16 composite signals by the same weighting factor a or b is shown above, the 32 composite signals can be multiplied by different weighting factors.

The phase offset amount setting unit 13 of the radiation pattern forming unit 41 receives, in advance, a setting of the phase offset amounts $\Phi_{m,k}$ which are amounts by which the phases of the digital sum signal, the digital difference signal and the digital signal for radiation pattern formation, which are outputted from the BFN 40, are to be shifted, and outputs the phase offset amounts $\Phi_{m,k}$ to the phase offset processing units 14-1, 14-2 and 14-K.

Because m is a variable showing a number of control of the excitation phases and M is 2, m is 1 or 2. K is a variable showing whether a phase offset amount corresponds to a sum pattern, a difference pattern or a pattern associated with a signal for radiation pattern formation. For example, when k=1, a phase offset amount corresponds to a sum pattern, when k=2, a phase offset amount corresponds to a difference pattern, and when k=3, a phase offset amount corresponds to a radiation pattern K. When the number of generations of a signal for radiation pattern formation is one, k=3 is a maximum, while when, for example, the number of generations of a signal for radiation pattern formation is two, k=4 is a maximum. In this Embodiment 5, for the sake of simplicity, it is assumed that the number of generations of a signal for radiation pattern formation is one.

Therefore, the phase offset amount setting unit 13 outputs the phase offset amount $\Phi_{1,1}$ and the phase offset amount $\Phi_{2,1}$ to the phase offset processing unit 14-1, outputs the phase offset amount $\Phi_{1,2}$ and the phase offset amount $\Phi_{2,2}$ to the phase offset processing unit 14-2, and outputs the phase offset amount $\Phi_{1,3}$ and the phase offset amount $\Phi_{2,3}$ to the phase offset processing unit 14-K.

Because it is assumed in this Embodiment 5 that, for example, the antenna device forms a monopulse sum pattern having low sidelobes and a monopulse difference pattern having low sidelobes in directions ahead of the antennas 2-1$_1$ to 2-8$_1$ and 2-1$_2$ to 2-8$_2$ which construct the sub array antennas 1-1 to 1-2 and also forms a radiation pattern K having low sidelobes, there can be considered a case in which values as will be shown below are set as the phase offset amounts $\Phi_{m,k}$.

$\Phi_{1,1}=\Phi_{2,1}=\Phi_{1,2}=\Phi_{1,3}=0$ $\Phi_{2,2}=\Phi_{2,3}=180$

It is preferable that the phase offset amounts $\Phi_{m,k}$ are set in such a way that a reduction in the sidelobes of the monopulse sum pattern, in the sidelobes of the monopulse difference pattern and in the sidelobes of the radiation pattern K is accomplished. The phase offset amounts $\Phi_{m,k}$ can be set arbitrarily in consideration of the shapes of a desired monopulse sum pattern, a desired monopulse difference pattern and a desired radiation pattern K, the arrangement of the element antennas, the number of element antennas, the number M of times of change of the excitation phases, etc.

A user is enabled to set the phase offset amounts $\Phi_{m,k}$ by manually operating the phase offset amount setting unit 13. As an alternative, the phase offset amount setting unit 13 can set the phase offset amounts $\Phi_{m,k}$ by receiving information showing the phase offset amounts $\Phi_{m,k}$ from outside the phase offset amount setting unit.

Because it is assumed in this embodiment that the phase offset amounts $\Phi_{m,k}$ are set in advance, but not set in real time, the step of setting the offset amounts $\Phi_{m,k}$ is not included in the flow chart of FIG. 17. However, when the phase offset amounts $\Phi_{m,k}$ are set in real time, the step of setting the offset amounts $\Phi_{m,k}$ is added between the step of ST26 and the step of ST27.

When receiving a phase offset instruction corresponding a first excitation from the excitation time control unit 16, the phase offset processing unit 14-1 of the radiation pattern forming unit 41 shifts the phase of the digital sum signal outputted from the BFN 40 by the phase offset amount $\Phi_{1,1}$ whose setting is received by the phase offset amount setting unit 13, and outputs the sum signal after phase shift to the time integration arithmetic operation unit 15-1 (step ST27).

When receiving a phase offset instruction corresponding the first excitation from the excitation time control unit 16, the phase offset processing unit 14-2 of the radiation pattern forming unit 41 shifts the phase of the digital difference signal outputted from the BFN 40 by the phase offset amount $\Phi_{1,2}$ whose setting is received by the phase offset amount setting unit 13, and outputs the difference signal after phase shift to the time integration arithmetic operation unit 15-2 (step ST27).

When receiving a phase offset instruction corresponding the first excitation from the excitation time control unit 16, the phase offset processing unit 14-K of the radiation pattern forming unit 41 shifts the phase of the digital signal for radiation pattern formation outputted from the BFN 40 by the phase offset amount $\Phi_{1,3}$ whose setting is received by the phase offset amount setting unit 13, and outputs the signal for radiation pattern formation after phase shift to the time integration arithmetic operation unit 15-K (step ST27).

Because the example in which the phase offset amounts $\Phi_{1,1}$, $\Phi_{1,2}$ and $\Phi_{1,3}$ whose setting is received by the phase offset amount setting unit 13 are $\Phi_{1,1}=\Phi_{1,2}=\Phi_{1,3}=0$ is shown in this Embodiment 5, the phase shifts provided by the phase offset processing units 14-1, 14-2 and 14-K are 0 degrees. Therefore, the phase of the digital sum signal outputted from the BFN 40 is not shifted and the sum signal is outputted to the time integration arithmetic operation unit 15-1, just as it is, while the phase of the digital difference signal outputted from the BFN 40 is not shifted and the difference signal is outputted to the time integration arithmetic operation unit 15-2, just as it is. Further, the phase of the digital signal for radiation pattern formation outputted from the BFN 40 is not shifted and the signal for radiation pattern formation is outputted to the time integration arithmetic operation unit 15-K, just as it is.

When receiving the sum signal after phase shift from the phase offset processing unit 14-1, the time integration arithmetic operation unit 15-1 of the radiation pattern forming unit 41 stores the sum signal after phase shift.

When receiving the difference signal after phase shift from the phase offset processing unit 14-2, the time integration arithmetic operation unit 15-2 of the radiation pattern forming unit 41 stores the difference signal after phase shift.

When receiving the signal for radiation pattern formation after phase shift from the phase offset processing unit 14-K, the time integration arithmetic operation unit 15-K of the radiation pattern forming unit 41 stores the signal for radiation pattern formation after phase shift.

The excitation time control unit 16 determines whether or not excitations whose number is equal to the number M of times of change whose setting is received by the number-of-changes setting unit 5 have been completed (step ST28).

At this time, because only the first excitation has been completed, but a second excitation has not been completed (when NO in step ST28), the excitation time control unit 16 outputs a second excitation instruction to the control unit 7 of the excitation phase changing unit 4.

When receiving the second excitation instruction from the excitation time control unit 16, the control unit 7 of the excitation phase changing unit 4 sets the excitation phases of the element antennas $2\text{-}1_1$ to $2\text{-}8_1$, ..., and $2\text{-}1_{32}$ to $2\text{-}8_{32}$ to the second excitation phases B by controlling the phase shifters $3\text{-}1_1$ to $3\text{-}8_1$, ..., and $3\text{-}1_{32}$ to $3\text{-}8_{32}$ dependently on the phase values whose setting is received by the phase value setting unit 6 (step ST23).

When receiving signals, the element antennas $2\text{-}1_n$ to $2\text{-}8_n$ (n=1, 2, ..., 32) which construct the sub array antenna 1-n output the received signals to the electric power combining unit 8-n.

The electric power combining unit 8-n (n=1, 2, ..., 32) combines the plurality of received signals of the element antennas $2\text{-}1_n$ to $2\text{-}8_n$ which construct the sub array antenna 1-n into a composite signal and outputs the composite signal to the signal combining unit 9 (step ST24).

When receiving the analog composite signal from the electric power combining unit 8-n, the A/D converter 31-n (n=1, 2, ..., N) of the signal combining unit 9 converts the composite signal into a digital signal and outputs the digital composite signal to the BFN 40 (step ST25).

When receiving the digital composite signals from the A/D converters 31-1 to 31-N, the BFN 40 of the signal combining unit 9 generates a digital sum signal by in-phase combining the 32 digital composite signals and outputs the digital sum signal to the radiation pattern forming unit 41, like the digital monopulse comparator 32 shown in FIG. 13 (step ST26).

The BFN 40 also generates a digital difference signal by out-of-phase combining the digital composite signals outputted from the A/D converters 31-1 to 31-N and outputs the digital difference signal to the radiation pattern forming unit 41, like the digital monopulse comparator 32 shown in FIG. 13 (step ST26).

The BFN 40 further generates a digital signal for radiation pattern formation, which are different from both the digital sum signal and the digital difference signal, by weighting and combining the digital composite signals outputted from the A/D converters 31-1 to 31-N, and outputs the digital signal for radiation pattern formation to the radiation pattern forming unit 41 (step ST26).

When receiving a phase offset instruction corresponding the second excitation from the excitation time control unit 16, the phase offset processing unit 14-1 of the radiation pattern forming unit 41 shifts the phase of the digital sum signal outputted from the BFN 40 by the phase offset amount $\Phi_{2,1}$ whose setting is received by the phase offset amount setting unit 13, and outputs the sum signal after phase shift to the time integration arithmetic operation unit 15-1 (step ST27).

When receiving a phase offset instruction corresponding the second excitation from the excitation time control unit 16, the phase offset processing unit 14-2 of the radiation pattern forming unit 41 shifts the phase of the digital difference signal outputted from the BFN 40 by the phase offset amount $\Phi_{2,2}$ whose setting is received by the phase offset amount setting unit 13, and outputs the difference signal after phase shift to the time integration arithmetic operation unit 15-2 (step ST27).

When receiving a phase offset instruction corresponding the second excitation from the excitation time control unit 16, the phase offset processing unit 14-K of the radiation pattern forming unit 41 shifts the phase of the digital signal for radiation pattern formation outputted from the BFN 40 by the phase offset amount $\Phi_{2,3}$ whose setting is received by the phase offset amount setting unit 13, and outputs the signal for radiation pattern formation after phase shift to the time integration arithmetic operation unit 15-K (step ST27).

Because the example in which the phase offset amount $\Phi_{2,1}$ whose setting is received by the phase offset amount setting unit 13 is $\Phi_{2,1}=0$ is shown in this Embodiment 5, the phase shift provided by the phase offset processing unit 14-1 is 0 degrees. Therefore, the phase of the digital sum signal outputted from the BFN 40 is not shifted and the sum signal is outputted to the time integration arithmetic operation unit 15-1, just as it is.

On the other hand, because the example in which the phase offset amount $\Phi_{2,2}$ whose setting is received by the phase offset amount setting unit 13 is $\Phi_{2,2}=180$ is shown, the phase shift provided by the phase offset processing unit 14-2 is 180 degrees. Therefore, the phase of the digital difference signal outputted from the BFN 40 is shifted by 180 degrees, and the difference signal whose phase is shifted by 180 degrees is outputted to the time integration arithmetic operation unit 15-2.

Further, because the example in which the phase offset amount $\Phi_{2,3}$ whose setting is received by the phase offset amount setting unit 13 is $\Phi_{2,3}=180$ is shown, the phase shift provided by the phase offset processing unit 14-K is 180 degrees. Therefore, the phase of the digital signal for radiation pattern formation outputted from the BFN 40 is shifted by 180 degrees, and the signal for radiation pattern formation whose phase is shifted 180 degrees is outputted to the time integration arithmetic operation unit 15-K.

When receiving the sum signal after phase shift from the phase offset processing unit 14-1, the time integration arithmetic operation unit 15-1 of the radiation pattern forming unit 41 stores the sum signal after phase shift.

When receiving the difference signal after phase shift from the phase offset processing unit 14-2, the time integration arithmetic operation unit 15-2 of the radiation pattern forming unit 41 stores the difference signal after phase shift.

When receiving the signal for radiation pattern formation after phase shift from the phase offset processing unit 14-K, the time integration arithmetic operation unit 15-K of the radiation pattern forming unit 41 stores the signal for radiation pattern formation after phase shift.

The excitation time control unit 16 determines whether or not excitations whose number is equal to the number M of times of change whose setting is received by the number-of-changes setting unit 5 have been completed (step ST28).

At this time, because the second excitation has been completed (when YES in step ST28), the excitation time control unit 16 outputs a time integration instruction to the time integration arithmetic operation units 15-1, 15-2 and 15-K.

When receiving the time integration instruction from the excitation time control unit 16, the time integration arithmetic operation unit 15-1 of the radiation pattern forming unit 41 forms a monopulse sum pattern by time-integrating the plurality of sum signals stored whose number is equal to the number M of times of change (M=2) (step ST29).

When receiving the time integration instruction from the excitation time control unit 16, the time integration arithmetic operation unit 15-2 of the radiation pattern forming unit 41 forms a monopulse difference pattern by time-integrating the plurality of difference signals stored whose number is equal to the number M of times of change (M=2) (step ST29).

When receiving the time integration instruction from the excitation time control unit 16, the time integration arithmetic operation unit 15-K of the radiation pattern forming unit 41 forms a radiation pattern K by time-integrating the plurality of signals for radiation pattern formation stored whose number is equal to the number M of times of change (M=2) (step ST29).

As can be seen from the above description, because the antenna device according to this Embodiment 5 is configured in such a way that the antenna device includes the BFN 40 that generates a digital sum signal by in-phase combining the digital composite signals outputted from the A/D converters 31-1 to 31-N, generates a digital difference signal by out-of-phase combining the digital composite signals outputted from the A/D converters 31-1 to 31-N, and generates a digital signal for radiation pattern formation by weighting and combining the digital composite signals outputted from the A/D converters 31-1 to 31-N, and the radiation pattern forming unit 41 shifts the phases of the sum signal, the difference signal and the signal for radiation pattern formation, which are generated by the BFN 40, and forms a radiation pattern associated with a sum pattern by time-integrating the sum signal after phase shift, forms a radiation pattern associated with a difference pattern by time-integrating the difference signal after the phase shift, and forms a radiation pattern K by time-integrating the signal for radiation pattern formation after phase shift, there is provided an advantage of being able to, even when simultaneously forming a monopulse sum pattern, a monopulse difference pattern and a radiation pattern K, accomplish a reduction in the sidelobes of the monopulse sum pattern, in the sidelobes of the monopulse difference patterns and in the sidelobes of the radiation pattern K without causing an increase in the hardware cost, and also orient the monopulse sum pattern, the monopulse difference pattern and the radiation pattern K toward desired directions.

Embodiment 6

Although the example in which the control unit 7 changes the excitation phases of the element antennas 2-1$_n$ to 2-8$_n$ (n=1, 2, ..., N) by controlling the phase shifters 3-1$_n$ to 3-8n (n=1, 2, ..., N) dependently on the phase values whose setting is received by the phase value setting unit 6 is shown in above-mentioned Embodiments 1 to 5, the phase values of the excitation phases of the element antennas 2-1$_n$ to 2-8$_n$ (n=1, 2, ..., N) can be calculated from a preset target excitation distribution of a sum pattern and a preset target excitation distribution of a difference pattern, and the excitation phases of the element antennas 2-1$_n$ to 2-8$_n$ (n=1, 2, ..., N) can be changed by controlling the phase shifters 3-1$_n$ to 3-8n (n=1, 2, ..., N) dependently on the phase values of the excitation phases.

Figure 18:
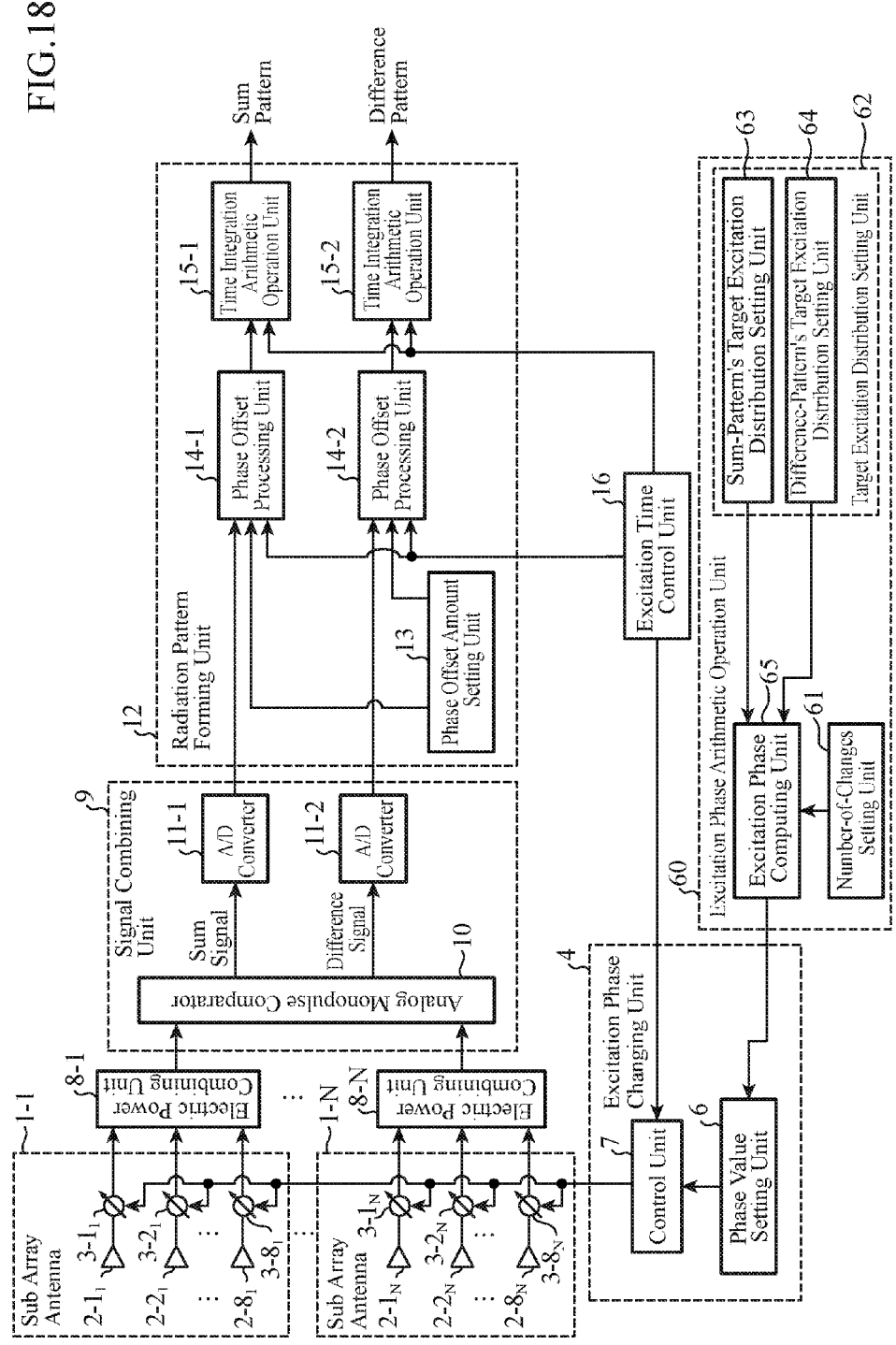
FIG. 18 is a block diagram showing an antenna device according to Embodiment 6 of the present invention.

FIG. 18 is a block diagram showing an antenna device according to Embodiment 6 of the present invention. In FIG. 18, because the same reference numerals as those shown in FIG. 1 denote the same components or like components, the explanation of the components will be omitted hereafter.

An excitation phase arithmetic operation unit 60 includes a number-of-changes setting unit 61, a target excitation distribution setting unit 62 and an excitation phase computing unit 65, and sets a sum-pattern's target excitation distribution required to acquire a desired sum pattern, a difference-pattern's target excitation distribution required to acquire a desired difference pattern, and the number of times M of change of the excitation phases.

The excitation phase arithmetic operation unit 60 also calculates the phase values of the excitation phases of element antennas 2-1$_n$ to 2-8$_n$ (n=1, 2, ..., N) from the sum-pattern's target excitation distribution and the difference-pattern's target excitation distribution only M times, M being the set number of times of change of the excitation phases.

The number-of-changes setting unit 61 is comprised of, for example, either a man-machine interface such as a keyboard or a mouse, or an input/output interface for receiving information provided therefor from outside the number-of-changes setting unit, and performs a process of receiving a setting of the number M of times of change that the excitation phases of the element antennas 2-1$_n$ to 2-8$_n$ (n=1, 2, ..., N) are to be changed. As the input/output interface, for example, a serial port, a USB port or the like can be considered.

The target excitation distribution setting unit 62 includes a sum-pattern's target excitation distribution setting unit 63 and a difference-pattern's target excitation distribution setting unit 64.

The sum-pattern's target excitation distribution setting unit 63 is comprised of, for example, a man-machine interface or an input/output interface, and performs a process of receiving a setting of the sum-pattern's target excitation distribution.

The difference-pattern's target excitation distribution setting unit 64 is comprised of, for example, a man-machine interface or an input/output interface, and performs a process of receiving a setting of the difference-pattern's target excitation distribution.

The excitation phase computing unit 65 is comprised of, for example, a semiconductor integrated circuit equipped with a CPU, a one chip microcomputer or the like, and performs a process of calculating the phase values of the excitation phases of the element antennas 2-1$_n$ to 2-8$_n$ (n=1, 2, ..., N) by computing an arc tangent of the sum-pattern's target excitation distribution whose setting is received by the sum-pattern's target excitation distribution setting unit 63 and the difference-pattern's target excitation distribution whose setting is received by the difference-pattern's target excitation distribution setting unit 64, only M times, M being the number of times of change of the excitation phases whose setting is received by the number-of-changes setting unit 61.

Figure 19:
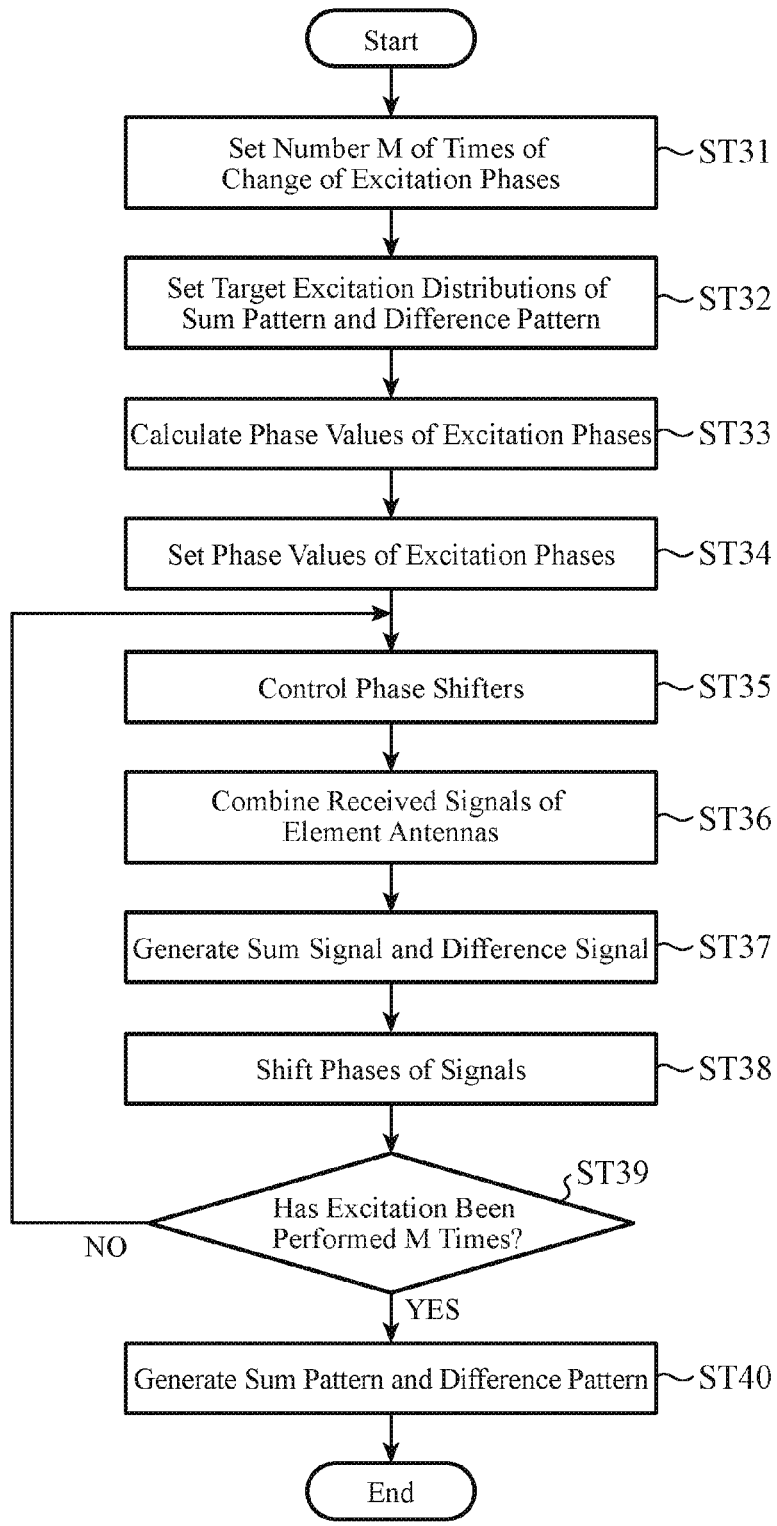
FIG. 19 is a flow chart showing an antenna excitation method corresponding to processing performed by the antenna device according to Embodiment 6 of the present invention.

FIG. 19 is a flow chart showing an antenna excitation method corresponding to processing performed by the antenna device according to Embodiment 6 of the present invention.

Next, operations will be explained.

In this Embodiment 6, for the sake of simplicity, it is assumed that N is two, and a sub array antenna 1-1 comprised of eight element antennas 2-1$_1$ to 2-8$_1$ and a sub array antenna 1-2 comprised of eight element antennas 2-1$_2$ to 2-8$_2$ are disposed.

It is further assumed that the element antennas 2-1$_1$ to 2-8$_1$ which construct the sub array antenna 1-1 and the element antennas 2-1$_2$ to 2-8$_2$ which construct the sub array antenna 1-2 are arranged in a line.

The number-of-changes setting unit 61 of the excitation phase arithmetic operation unit 60 receives a setting of the number M of times of change that the excitation phases of the element antennas $2\text{-}1_1$ to $2\text{-}8_1$ and $2\text{-}1_2$ to $2\text{-}8_2$ are to be changed, and outputs the number M of times of change to the excitation phase computing unit 65, like the number-of-changes setting unit 5 shown in FIG. 1 (step ST31 of FIG. 19).

A user is enabled to set the number M of times of change of the excitation phases by manually operating the number-of-changes setting unit 61. As an alternative, the number-of-changes setting unit 61 can set the number M of times of change of the excitation phases by receiving information showing the number M of times of change of the excitation phases from outside the number-of-changes setting unit.

In this Embodiment 6, for the sake of simplicity, an example in which the number M of times of change of the excitation phases is two will be explained. The case in which the number M of times of change is two means that the excitation phases of the element antennas $2\text{-}1_1$ to $2\text{-}8_1$ and $2\text{-}1_2$ to $2\text{-}8_2$ are set twice, and the element antennas $2\text{-}1_1$ to $2\text{-}8_1$ and $2\text{-}1_2$ to $2\text{-}8_2$ are excited twice.

However, the number M of times of change has only to be two or more, and is not limited to two.

The sum-pattern's target excitation distribution setting unit 63 of the excitation phase arithmetic operation unit 60 receives a setting of the sum-pattern's target excitation distribution and outputs the sum-pattern's target excitation distribution to the excitation phase computing unit 65 (step ST32).

Further, the difference-pattern's target excitation distribution setting unit 64 receives a setting of the difference-pattern's target excitation distribution and outputs the difference-pattern's target excitation distribution to the excitation phase computing unit 65 (step ST32).

A user is enabled to set the sum-pattern's target excitation distribution and the difference-pattern's target excitation distribution by manually operating the sum-pattern's target excitation distribution setting unit 63 and the difference-pattern's target excitation distribution setting unit 64. As an alternative, the sum-pattern's target excitation distribution setting unit 63 can set the sum-pattern's target excitation distribution by receiving information showing the sum-pattern's target excitation distribution from outside the sum-pattern's target excitation distribution setting unit, and the difference-pattern's target excitation distribution setting unit 64 can set the difference-pattern's target excitation distribution by receiving information showing the difference-pattern's target excitation distribution from outside the difference-pattern's target excitation distribution setting unit.

Figure 20A:
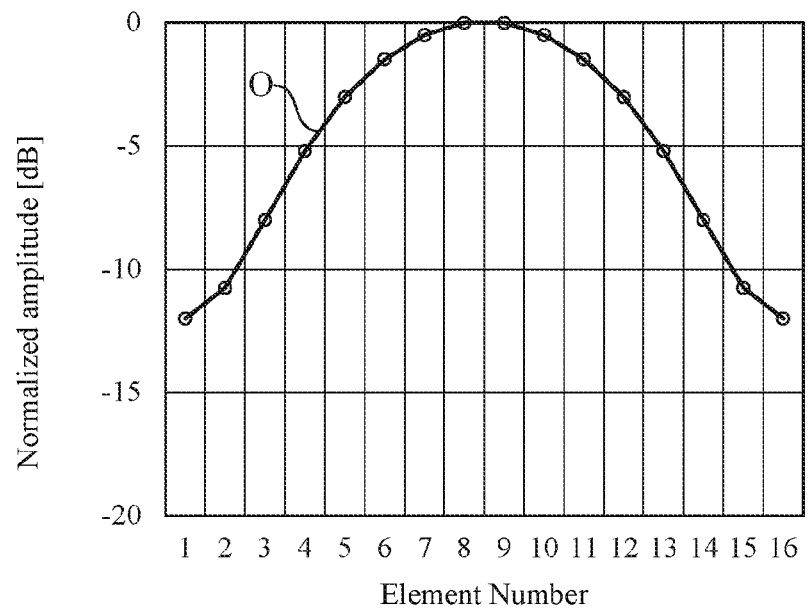
FIG. 20A is the explanatory drawing showing a sum-pattern's target excitation distribution whose setting is received by a sum-pattern's target excitation distribution setting unit 63.
Figure 20B:
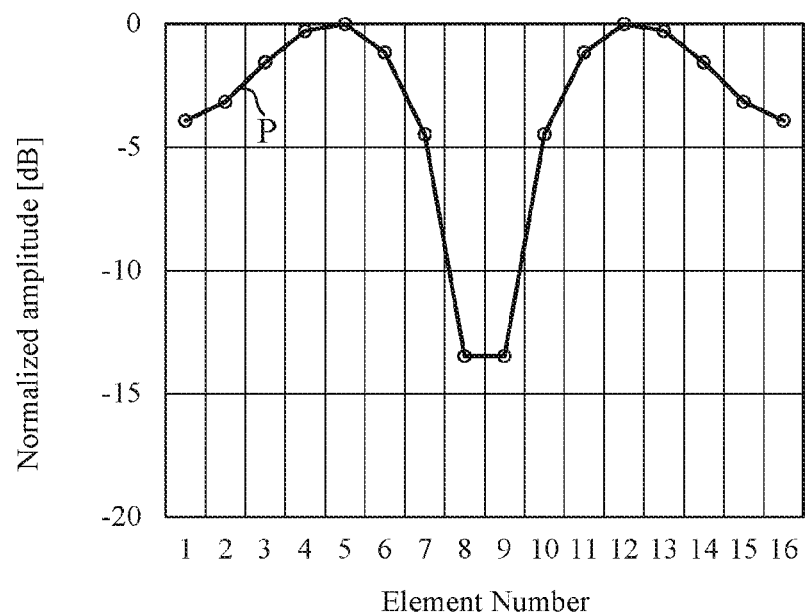
FIG. 20B is an explanatory drawing showing a difference-pattern's target excitation distribution whose setting is received by a difference-pattern's target excitation distribution setting unit 64.

FIGS. 20A and 20B are explanatory drawings showing examples of the excitation distributions whose settings are received by the sum-pattern's target excitation distribution setting unit 63 and the difference-pattern's target excitation distribution setting unit 64.

FIG. 20A shows the sum-pattern's target excitation distribution whose setting is received by the sum-pattern's target excitation distribution setting unit 63, and FIG. 20B shows the difference-pattern's target excitation distribution whose setting is received by the difference-pattern's target excitation distribution setting unit 64.

Numerals attached to each of the horizontal axes of FIGS. 20A and 20B are provided to identify the element antennas, and the numerals 1 to 8 denote the element antennas $2\text{-}1_1$ to $2\text{-}8_1$ which construct the sub array antenna 1-1 and the numerals 9 to 16 denote the element antennas $2\text{-}1_2$ to $2\text{-}8_2$ which construct the sub array antenna 1-2.

Each of the vertical axes of FIGS. 20A and 20B shows the amplitude values of the excitation amplitudes of the element antennas $2\text{-}1_1$ to $2\text{-}8_1$ and $2\text{-}1_2$ to $2\text{-}8_2$.

When the sum-pattern's target excitation distribution setting unit 63 receives a setting of the sum-pattern's target excitation distribution and the difference-pattern's target excitation distribution setting unit 64 receives a setting of the difference-pattern's target excitation distribution, the excitation phase computing unit 65 of the excitation phase arithmetic operation unit 60 calculates the phase values of the excitation phases of the element antennas $2\text{-}1_n$ to $2\text{-}8_n$ (n=1, 2, . . . , N) by computing an arc tangent of the sum-pattern's target excitation distribution and the difference-pattern's target excitation distribution, as shown in the following equation (1), only M (M=2) times, M being the number of times of change of the excitation phases whose setting is received by the number-of-changes setting unit 61 (step ST33 of FIG. 19).

$$\sum_{m=1}^{M} \theta_{n,m} = \tan^{-1}\left(\frac{A_n^{diff}}{A_n^{sum}}\right) \quad (1)$$

In the equation (1), the left side is the phase value of the excitation phase of the n-th element antenna, and $A_n^{sum}$ denotes a value of the sum-pattern's target excitation distribution of the n-th element antenna and $A_n^{diff}$ denotes a value of the difference-pattern's target excitation distribution of the n-th element antenna.

When the excitation phase computing unit 65 calculates the phase values of the excitation phases of the element antennas $2\text{-}1_n$ to $2\text{-}8_n$ (n=1, 2, . . . , N) only M (M=2) times, M being the number of times of change of the excitation phases, a phase value setting unit 6 of an excitation phase changing unit 4 receives a setting of the phase values of the excitation phases and outputs the phase values of the excitation phases to a control unit 7 (step ST34).

In this example, because the number M of times of change of the excitation phases is two, the phase value setting unit 6 receives two settings of the phase values of the excitation phases for the element antennas $2\text{-}1_1$ to $2\text{-}8_1$ and $2\text{-}1_2$ to $2\text{-}8_2$.

Figure 21A:
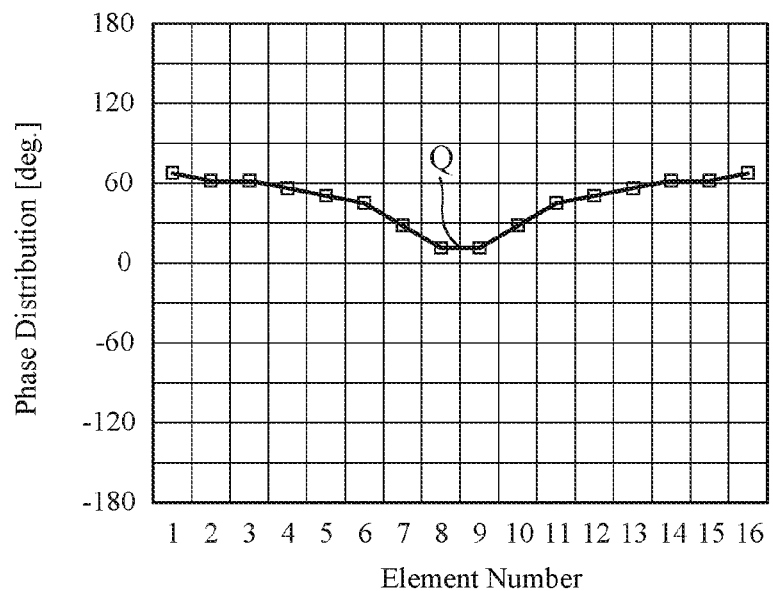
FIG. 21A is an explanatory drawing showing first excitation phases Q whose setting is received by a phase value setting unit 6.
Figure 21B:
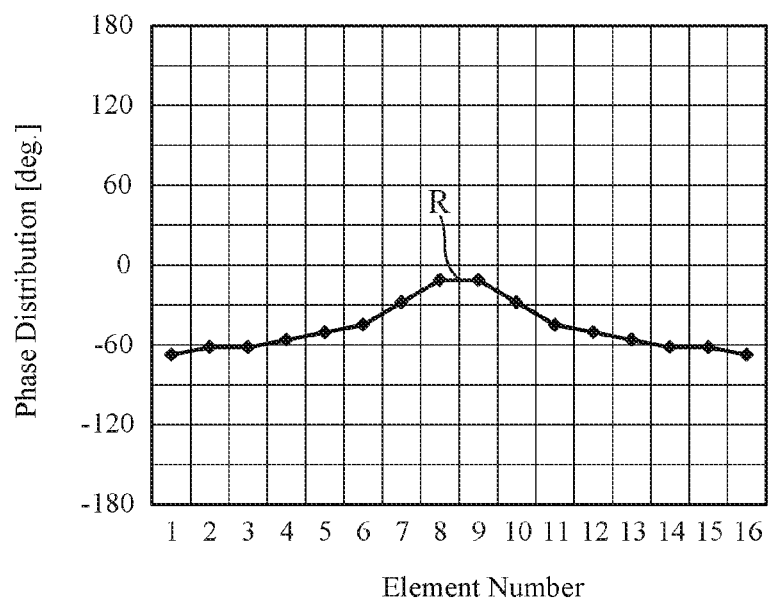
FIG. 21B is an explanatory drawing showing second excitation phases R whose setting is received by the phase value setting unit 6.

FIGS. 21A and 21B are explanatory drawings showing examples of the distributions of the excitation phases whose settings are received by the phase value setting unit 6.

FIG. 21A shows first excitation phases Q and FIG. 21B shows second excitation phases R, and the phase values of the first and second excitation phases are set in such a way that the first excitation phases Q and the second excitation phases R have a conjugate relation with each other.

Numerals attached to each of the horizontal axes of FIGS. 21A and 21B are provided to identify the element antennas, and the numerals 1 to 8 denote the element antennas $2\text{-}1_1$ to $2\text{-}8_1$ which construct the sub array antenna 1-1 and the numerals 9 to 16 denote the element antennas $2\text{-}1_2$ to $2\text{-}8_2$ which construct the sub array antenna 1-2.

Each of the vertical axes of FIGS. 21A and 21B shows the phase values of the excitation phases of the element antennas $2\text{-}1_1$ to $2\text{-}8_1$ and $2\text{-}1_2$ to $2\text{-}8_2$.

After the phase value setting unit 6 receives a number of settings of the phase values of the excitation phases, i.e. the excitation phases Q and R, the number of settings being equal to the number M of times of change (M=2), when receiving a first excitation instruction from an excitation time control unit 16, the control unit 7 of the excitation phase changing unit 4 sets the excitation phases of the element antennas $2\text{-}1_1$ to $2\text{-}8_1$ and $2\text{-}1_2$ to $2\text{-}8_2$ to the first excitation phases Q by controlling the phase shifters $3\text{-}1_1$ to $3\text{-}8_1$ and $3\text{-}1_2$ to $3\text{-}8_2$ dependently on the phase values whose setting is received by the phase value setting unit 6 (step ST35 of FIG. 19).

When receiving signals, the element antennas $2\text{-}1_1$ to $2\text{-}8_1$ which construct the sub array antenna 1-1 output the received signals to the electric power combining unit 8-1.

When receiving signals, the element antennas $2\text{-}1_2$ to $2\text{-}8_2$ which construct the sub array antenna 1-2 output the received signals to the electric power combining unit 8-2.

The electric power combining unit 8-1 combines the plurality of received signals of the element antennas $2\text{-}1_1$ to $2\text{-}8_1$ which construct the sub array antenna 1-1 into a composite signal, and outputs the composite signal to an analog monopulse comparator 10 (step ST36).

The electric power combining unit 8-2 combines the plurality of received signals of the element antennas $2\text{-}1_2$ to $2\text{-}8_2$ which construct the sub array antenna 1-2 into a composite signal, and outputs the composite signal to the analog monopulse comparator 10 (step ST36).

When receiving the composite signals from the electric power combining units 8-1 and 8-2, the analog monopulse comparator 10 generates an analog sum signal by in-phase combining the two composite signals and also generates an analog difference signal by out-of-phase combining the two composite signals (step ST37).

When the analog monopulse comparator 10 generates an analog sum signal, an A/D converter 11-1 converts the analog sum signal into a digital sum signal and outputs the digital sum signal to a radiation pattern forming unit 12.

When the analog monopulse comparator 10 generates an analog difference signal, an A/D converter 11-2 converts the analog difference signal into a digital difference signal and outputs the digital difference signal to the radiation pattern forming unit 12.

A phase offset amount setting unit 13 of the radiation pattern forming unit 12 receives, in advance, a setting of the phase offset amounts $\Phi_{m,k}$ which are amounts by which the phases of the digital sum and difference signals outputted from the A/D converters 11-1 and 11-2 are to be shifted, and outputs the phase offset amounts $\Phi_{m,k}$ to phase offset processing units 14-1 and 14-2.

In this Embodiment 6, because M is two, the phase offset amount setting unit outputs the phase offset amount $\Phi_{1,1}$ and the phase offset amount $\Phi_{2,1}$ to the phase offset processing unit 14-1, as the phase offset amounts corresponding to the sum pattern, and outputs the phase offset amount $\Phi_{1,2}$ and the phase offset amount $\Phi_{2,2}$ to the phase offset processing unit 14-2, as the phase offset amounts corresponding to the difference pattern.

Because it is assumed in this Embodiment 6 that the antenna device generates a monopulse sum pattern having low sidelobes and a monopulse difference pattern having low sidelobes in directions ahead of the element antennas $2\text{-}1_1$ to $2\text{-}8_1$ and $2\text{-}1_2$ to $2\text{-}8_2$ arranged in a line, there can be considered a case in which values as will be shown below are set as the phase offset amounts $\Phi_{m,k}$.

$\Phi_{1,1}=\Phi_{2,1}=\Phi_{1,2}=0$ $\Phi_{2,2}=180$

Because it is assumed in this embodiment that the phase offset amounts $\Phi_{m,k}$ are set in advance, but not set in real time, the step of setting the offset amounts $\Phi_{m,k}$ is not included in the flow chart of FIG. 19. However, when the phase offset amounts $\Phi_{m,k}$ are set in real time, the step of setting the offset amounts $\Phi_{m,k}$ is added between the step of ST37 and the step of ST38.

When receiving a phase offset instruction corresponding to a first excitation from the excitation time control unit 16, the phase offset processing unit 14-1 of the radiation pattern forming unit 12 shifts the phase of the digital sum signal outputted from the A/D converter 11-1 by the phase offset amount $\Phi_{1,1}$ whose setting is received by the phase offset amount setting unit 13, and outputs the sum signal after phase shift to a time integration arithmetic operation unit 15-1 (step ST38).

When receiving a phase offset instruction corresponding to the first excitation from the excitation time control unit 16, the phase offset processing unit 14-2 of the radiation pattern forming unit 12 shifts the phase of the digital difference signal outputted from the A/D converter 11-2 by the phase offset amount $\Phi_{1,2}$ whose setting is received by the phase offset amount setting unit 13, and outputs the difference signal after phase shift to a time integration arithmetic operation unit 15-2 (step ST38).

Because the example in which the phase offset amounts $\Phi_{1,1}$ and $\Phi_{1,2}$ whose setting is received by the phase offset amount setting unit 13 are $\Phi_{1,1}=\Phi_{1,2}=0$ is shown in this Embodiment 6, the phase shifts provided by the phase offset processing units 14-1 and 14-2 are 0 degrees. Therefore, the phase of the digital sum signal outputted from the A/D converter 11-1 is not shifted and the sum signal is outputted to the time integration arithmetic operation unit 15-1, just as it is, while the phase of the digital difference signal outputted from the A/D converter 11-2 is not shifted and the difference signal is outputted to the time integration arithmetic operation unit 15-2, just as it is.

When receiving the sum signal after phase shift from the phase offset processing unit 14-1, the time integration arithmetic operation unit 15-1 of the radiation pattern forming unit 12 stores the sum signal after phase shift.

When receiving the difference signal after phase shift from the phase offset processing unit 14-2, the time integration arithmetic operation unit 15-2 of the radiation pattern forming unit 12 stores the difference signal after phase shift.

The excitation time control unit 16 determines whether or not excitations whose number is equal to the number M of times of change (M=2) whose setting is received by the number-of-changes setting unit 5 have been completed (step ST39).

At this time, because only the first excitation has been completed, but a second excitation has not been completed (when NO in step ST39), the excitation time control unit 16 outputs a second excitation instruction to the control unit 7 of the excitation phase changing unit 4.

When receiving the second excitation instruction from the excitation time control unit 16, the control unit 7 of the excitation phase changing unit 4 sets the excitation phases of the element antennas $2\text{-}1_1$ to $2\text{-}8_1$ and $2\text{-}1_2$ to $2\text{-}8_2$ to the second excitation phases P by controlling the phase shifters $3\text{-}1_1$ to $3\text{-}8_1$ and $3\text{-}1_2$ to $3\text{-}8_2$ dependently on the phase values whose setting is received by the phase value setting unit 6 (step ST35).

When receiving signals, the element antennas $2\text{-}1_1$ to $2\text{-}8_1$ which construct the sub array antenna 1-1 output the received signals to the electric power combining unit 8-1.

When receiving signals, the element antennas $2\text{-}1_2$ to $2\text{-}8_2$ which construct the sub array antenna 1-2 output the received signals to the electric power combining unit 8-2.

The electric power combining unit 8-1 combines the plurality of received signals of the element antennas 2-1₁ to 2-8₁ which construct the sub array antenna 1-1 into a composite signal, and outputs the composite signal to the analog monopulse comparator 10 (step ST36).

The electric power combining unit 8-2 combines the plurality of received signals of the element antennas 2-1₂ to 2-8₂ which construct the sub array antenna 1-2 into a composite signal, and outputs the composite signal to the analog monopulse comparator 10 (step ST36).

When receiving the composite signals from the electric power combining units 8-1 and 8-2, the analog monopulse comparator 10 generates an analog sum signal by in-phase combining the two composite signals and also generates an analog difference signal by out-of-phase combining the two composite signals (step ST37).

When the analog monopulse comparator 10 generates an analog sum signal, the A/D converter 11-1 converts the analog sum signal into a digital sum signal and outputs the digital sum signal to a radiation pattern forming unit 12.

When the analog monopulse comparator 10 generates an analog difference signal, the A/D converter 11-2 converts the analog difference signal into a digital difference signal and outputs the digital difference signal to the radiation pattern forming unit 12.

When receiving a phase offset instruction corresponding to the second excitation from the excitation time control unit 16, the phase offset processing unit 14-1 of the radiation pattern forming unit 12 shifts the phase of the digital sum signal outputted from the A/D converter 11-1 by the phase offset amount $\Phi_{2,1}$ whose setting is received by the phase offset amount setting unit 13, and outputs the sum signal after phase shift to the time integration arithmetic operation unit 15-1 (step ST38).

When receiving a phase offset instruction corresponding to the second excitation from the excitation time control unit 16, the phase offset processing unit 14-2 of the radiation pattern forming unit 12 shifts the phase of the digital difference signal outputted from the A/D converter 11-2 by the phase offset amount $\Phi_{2,2}$ whose setting is received by the phase offset amount setting unit 13, and outputs the difference signal after phase shift to the time integration arithmetic operation unit 15-2 (step ST38).

Because the example in which the phase offset amount $\Phi_{2,1}$ whose setting is received by the phase offset amount setting unit 13 is $\Phi_{2,1}=0$ is shown in this Embodiment 6, the phase shift provided by the phase offset processing unit 14-1 is 0 degrees. Therefore, the phase of the digital sum signal outputted from the A/D converter 11-1 is not shifted and the sum signal is outputted to the time integration arithmetic operation unit 15-1, just as it is.

On the other hand, because the example in which the phase offset amount $\Phi_{2,2}$ whose setting is received by the phase offset amount setting unit 13 is $\Phi_{2,2}=180$ is shown, the phase shift provided by the phase offset processing unit 14-2 is 180 degrees. Therefore, the phase of the digital difference signal outputted from the A/D converter 11-2 is shifted by 180 degrees, and the difference signal whose phase is shifted by 180 degrees is outputted to the time integration arithmetic operation unit 15-2.

Figure 22A:
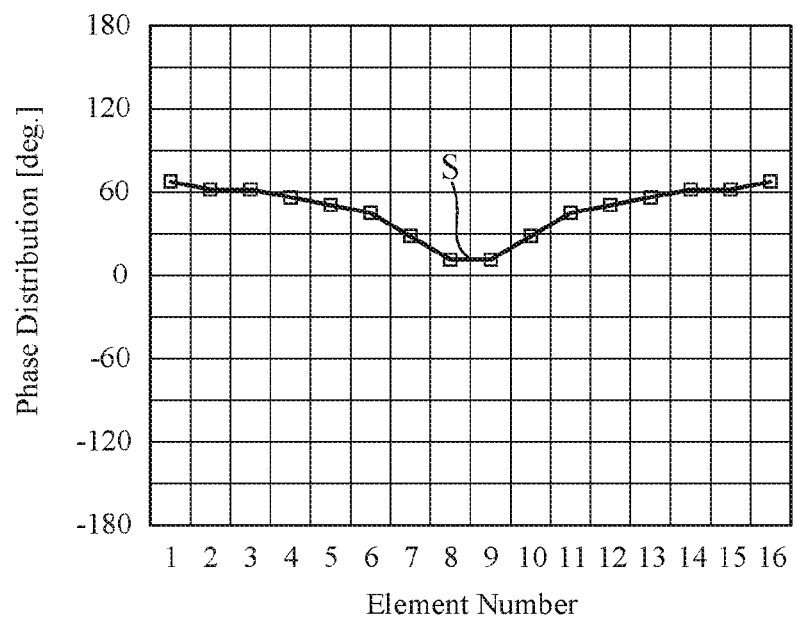
FIG. 22A is an explanatory drawing showing an example of a distribution of excitation phases S after the excitation phases Q shown in FIG. 21A are shifted.
Figure 22B:
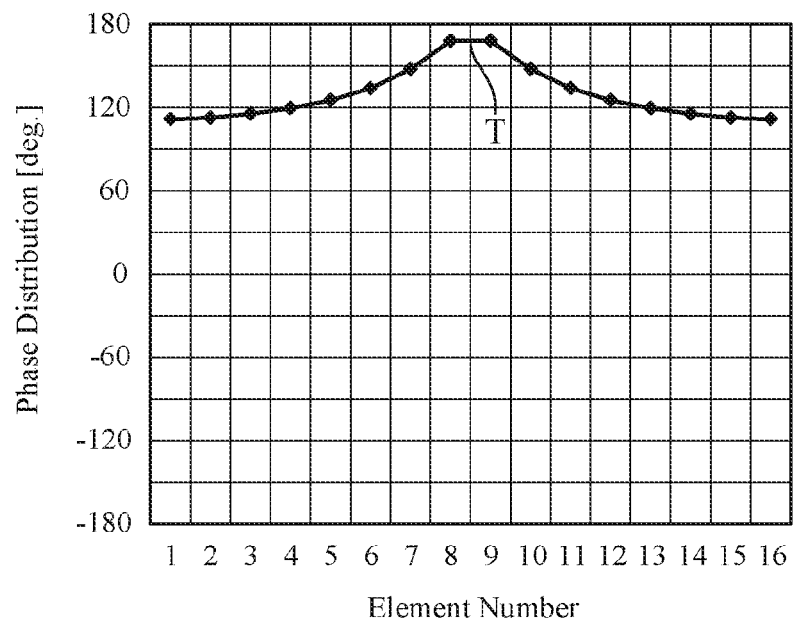
FIG. 22B is an explanatory drawing showing an example of a distribution of excitation phases T after the excitation phases R shown in FIG. 21B are shifted.

FIGS. 22A and 22B are explanatory drawings showing examples of distributions of excitation phases after the excitation phases shown in FIGS. 21A and 21B are shifted.

FIG. 22A shows excitation phases S after the excitation phases Q shown in FIG. 21A are shifted. Because the phase offset amount $\Phi_{1,2}$ is 0, the phase of the difference signal is not shifted, and the excitation phases S of the difference signal are the same as the excitation phases Q shown in FIG. 21A whose setting is received by the phase value setting unit 6.

On the other hand, FIG. 22B shows excitation phases T after the excitation phases R shown in FIG. 21B are shifted. Because the phase offset amount $\Phi_{2,2}$ is 180, the phase of the difference signal is shifted by 180 degrees, and the excitation phases T of the difference signal after phase shift are shifted, by 180 degrees, from the excitation phases R shown in FIG. 21B whose setting is received by the phase value setting unit 6.

When receiving the sum signal after phase shift from the phase offset processing unit 14-1, the time integration arithmetic operation unit 15-1 of the radiation pattern forming unit 12 stores the sum signal after phase shift.

When receiving the difference signal after phase shift from the phase offset processing unit 14-2, the time integration arithmetic operation unit 15-2 of the radiation pattern forming unit 12 stores the difference signal after phase shift.

The excitation time control unit 16 determines whether or not excitations whose number is equal to the number M of times of change (M=2) whose setting is received by the number-of-changes setting unit 5 have been completed (step ST39).

At this time, because the second excitation has been completed (when YES in step ST39), the excitation time control unit 16 outputs a time integration instruction to the time integration arithmetic operation units 15-1 and 15-2.

When receiving the time integration instruction from the excitation time control unit 16, the time integration arithmetic operation unit 15-1 of the radiation pattern forming unit 12 forms a monopulse sum pattern by time-integrating the plurality of sum signals stored whose number is equal to the number M of times of change (M=2) (step ST40).

When receiving the time integration instruction from the excitation time control unit 16, the time integration arithmetic operation unit 15-2 of the radiation pattern forming unit 12 forms a monopulse difference pattern by time-integrating the plurality of difference signals stored whose number is equal to the number M of times of change (M=2) (step ST40).

In this embodiment, the time integration arithmetic operation unit 15-1 forms a monopulse sum pattern by time-integrating the plurality of sum signals stored whose number is equal to the number M of times of change. As an alternative, the time integration arithmetic operation unit can form a monopulse sum pattern by performing a discrete Fourier transform on the plurality of sum signals stored whose number is equal to the number M of times of change.

Further, the time integration arithmetic operation unit 15-2 forms a monopulse difference pattern by time-integrating the plurality of difference signals stored whose number is equal to the number M of times of change. As an alternative, the time integration arithmetic operation unit can form a monopulse difference pattern by performing a discrete Fourier transform on the plurality of difference signals stored whose number is equal to the number M of times of change.

Because the discrete Fourier transform processes on the sum signal and the difference signal include processes corresponding to time integration processes on the sum signal and the difference signal, respectively, the time integration arithmetic operation units can form a monopulse sum pattern and a monopulse difference pattern.

Figure 23A:
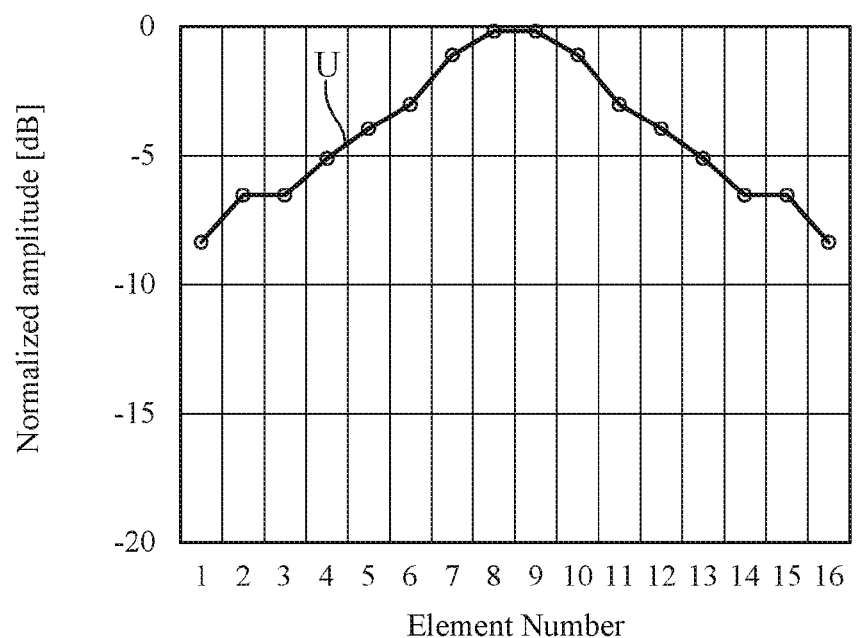
FIG. 23A is an explanatory drawing showing excitation amplitudes U for a monopulse sum pattern.
Figure 23B:
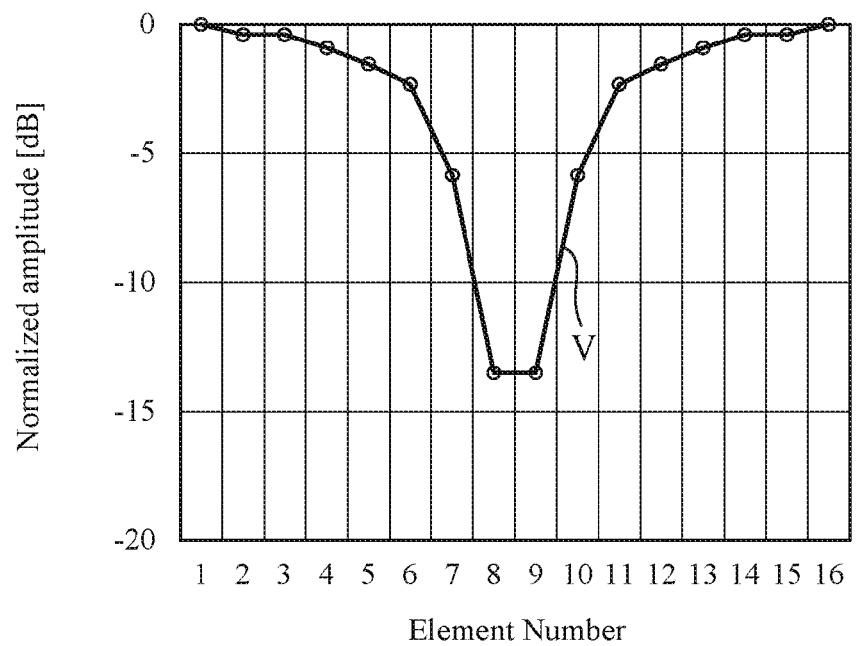
FIG. 23B is an explanatory drawing showing excitation amplitudes V for a monopulse difference pattern.

FIGS. 23A and 23B are explanatory drawings showing examples of excitation amplitudes for the monopulse sum pattern, and excitation amplitudes for the monopulse difference pattern.

FIG. 23A shows excitation amplitudes U for the monopulse sum pattern, and FIG. 23B shows excitation amplitudes V for the monopulse difference pattern.

Therefore, for the monopulse sum pattern, the above-mentioned process is equivalent to exciting the element antennas $2\text{-}1_1$ to $2\text{-}8_1$ and $2\text{-}1_2$ to $2\text{-}8_2$ with the excitation amplitudes U shown in FIG. 23A. For the monopulse difference pattern, the above-mentioned process is equivalent to exciting the element antennas $2\text{-}1_1$ to $2\text{-}8_1$ and $2\text{-}1_2$ to $2\text{-}8_2$ with the excitation amplitudes V shown in FIG. 23B.

Therefore, it can be seen that different aperture distributions are provided for the formation of the sum pattern and for the formation of the difference pattern.

Figure 24:
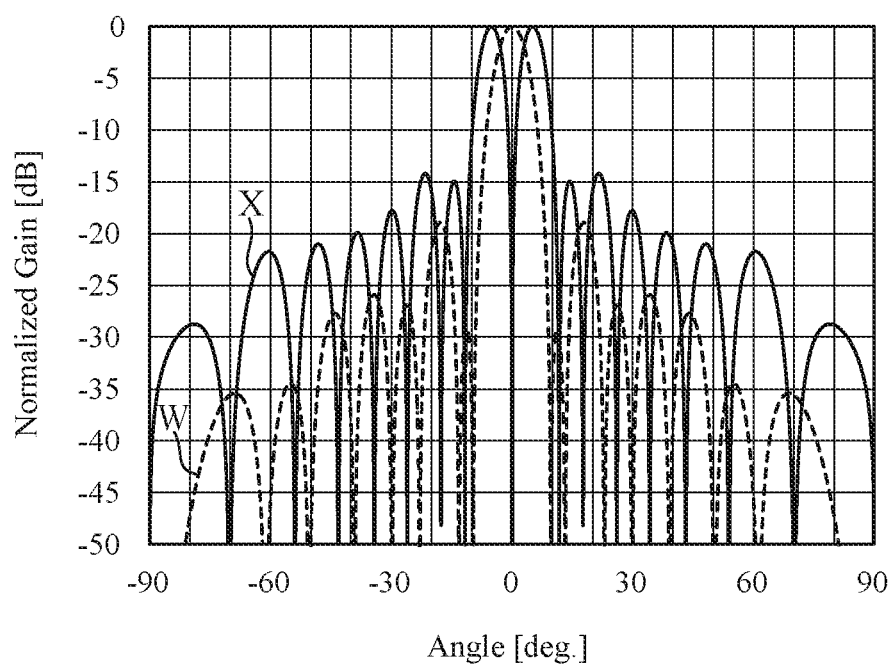
FIG. 24 is an explanatory drawing showing an example of a monopulse sum pattern and a monopulse difference pattern which are formed by a radiation pattern forming unit 12.

FIG. 24 is an explanatory drawing showing an example of the monopulse sum pattern and the monopulse difference pattern which are formed by the radiation pattern forming unit 12.

While the sidelobe levels of the sum pattern W shown in FIG. 24 are higher than those of the sum pattern I shown in FIG. 8B, a reduction in the sidelobes of the difference pattern X shown in FIG. 24 is accomplished as compared with the difference pattern J shown in FIG. 8B.

As can be seen from the above description, because the antenna device according to this Embodiment 6 is configured so as to calculate the phase values of the excitation phases of the element antennas $2\text{-}1_n$ to $2\text{-}8_n$ (n=1, 2, ..., N) from the sum-pattern's target excitation distribution and the difference-pattern's target excitation distribution, and change the excitation phase of the element antennas $2\text{-}1_n$ to $2\text{-}8_n$ by controlling the phase shifters $3\text{-}1_n$ to $3\text{-}8n$ (n=1, 2, ..., N) dependently on the phase values of the excitation phases, the antenna device can change the excitation phases of the element antennas $2\text{-}1_n$ to $2\text{-}8_n$, like that according to above-mentioned Embodiment 1. Therefore, there is provided an advantage of being able to accomplish a reduction in the sidelobes of the monopulse sum pattern and in the sidelobes of the monopulse difference pattern without causing an increase in the hardware cost, and also orient the monopulse sum pattern and the monopulse difference pattern toward desired directions, like in the case of above-mentioned Embodiment 1.

Although the example of applying the excitation phase arithmetic operation unit 60 to the antenna device according to above-mentioned Embodiment 1 is shown in this Embodiment 6, the excitation phase arithmetic operation unit 60 can be alternatively applied to the antenna device according to any one of above-mentioned Embodiments 2 to 5.

While the invention has been described in its preferred embodiments, it is to be understood that an arbitrary combination of two or more of the above-mentioned embodiments can be made, various changes can be made in an arbitrary component according to any one of the above-mentioned embodiments, and an arbitrary component according to any one of the above-mentioned embodiments can be omitted within the scope of the invention.

INDUSTRIAL APPLICABILITY

The antenna device and the antenna excitation method according to the present invention are suitable for use in devices that need to form a sum pattern and a difference pattern in desired directions while accomplishing a reduction in the sidelobes of the sum pattern and in the sidelobes of the difference pattern.

REFERENCE SIGNS LIST 1-1 to 1-N sub array antenna, $2\text{-}1_1$ to $2\text{-}8_1$, ..., $2\text{-}1_N$ to $2\text{-}8_N$ element antenna, $3\text{-}1_1$ to $3\text{-}8_1$, ..., $3\text{-}1_N$ to $3\text{-}8_N$ phase shifter, 4 excitation phase changing unit, 5 number-of-changes setting unit, 6 phase value setting unit, 7 control unit, 8-1 to 8-N electric power combining unit, 9 signal combining unit, 10 analog monopulse comparator, 11-1 A/D converter (first analog-to-digital converter), 11-2, 11-3 A/D converter (second analog-to-digital converter), 11-4 A/D converter (third analog-to-digital converter), 12 radiation pattern forming unit, 13 phase offset amount setting unit, 14-1, 14-2, 14-3, 14-4, 14-K phase offset processing unit, 15-1, 15-2, 15-3, 15-4, 15-K time integration arithmetic operation unit, 16 excitation time control unit, 20 analog monopulse comparator, 21 radiation pattern forming unit, 31-1 to 31-N A/D converter (analog-to-digital converter), 32, 33 digital monopulse comparator, 40 BFN (beamforming network), 41 radiation pattern forming unit, 51 memory, 52 processor, 60 excitation phase arithmetic operation unit, 61 number-of-changes setting unit, target excitation distribution setting unit, 63 sum-pattern's target excitation distribution setting unit, 64 difference-pattern's target excitation distribution setting unit, 65 excitation phase computing unit, 71 interface unit, 72, 73, 76, 77, 80 phase offset processing circuit, and 74, 75, 78, 79, 81 time integration arithmetic processing circuit.

The invention claimed is:

1. An antenna device comprising:
a plurality of sub array antennas each including a plurality of element antennas for receiving signals and a plurality of phase shifters for adjusting excitation phases of said element antennas;
an excitation phase changing unit for changing the excitation phases of said plurality of element antennas by controlling said plurality of phase shifters;
a plurality of electric power combining units disposed respectively for said plurality of sub array antennas, each for combining a plurality of received signals of the plurality of element antennas included in a corresponding one of said sub array antennas into a composite signal, and outputting said composite signal;
a signal combining unit for generating a sum signal by in-phase combining the composite signals outputted from said plurality of electric power combining units, and for also generating a difference signal by out-of-phase combining the composite signals outputted from said plurality of electric power combining units; and
a radiation pattern forming unit for shifting phases of the sum and difference signals generated by said signal combining unit every time the excitation phases are changed by said excitation phase changing unit, for forming a radiation pattern associated with a sum pattern by time-integrating the sum signal after phase shift, and for also forming a radiation pattern associated with a difference pattern by time-integrating the difference signal after phase shift.

2. The antenna device according to claim 1, wherein said signal combining unit generates a sum signal by in-phase combining the composite signals outputted from said plurality of electric power combining units, generates a difference signal in an azimuth angle direction by out-of-phase combining, in the azimuth angle direction, the composite signals outputted from said plurality of electric power combining units, and generates a difference signal in an elevation angle direction by out-of-phase combining, in the elevation angle direction, the composite signals outputted from said plurality of electric power combining units, and said radiation pattern forming unit shifts phases of the sum signal, the difference signal in the azimuth angle direction and the difference signal in the elevation angle direction, which are generated by said signal combining unit, every time the excitation phases are changed by said excitation phase changing unit, forms a radiation pattern associated with a sum pattern by time-integrating the sum signal after phase shift, forms a radiation pattern associated with a difference pattern in the azimuth angle direction by time-integrating the difference signal in the azimuth angle direction after phase shift, and forms a radiation pattern associated with a difference pattern in the elevation angle direction by time-integrating the difference signal in the elevation angle direction after phase shift.

3. The antenna device according to claim 1, wherein said signal combining unit includes:
an analog monopulse comparator for generating an analog sum signal by in-phase combining the composite signals outputted from said plurality of electric power combining units, and for generating an analog difference signal by out-of-phase combining the composite signals outputted from said plurality of electric power combining units;
a first analog-to-digital converter for converting the analog sum signal generated by said analog monopulse comparator into a digital sum signal, and outputting said digital sum signal to said radiation pattern forming unit; and
a second analog-to-digital converter for converting the analog difference signal generated by said analog monopulse comparator into a digital signal, and outputting said digital difference signal to said radiation pattern forming unit.

4. The antenna device according to claim 2, wherein said signal combining unit includes:
an analog monopulse comparator for generating an analog sum signal by in-phase combining the composite signals outputted from said plurality of electric power combining units, for generating an analog difference signal in the azimuth angle direction by out-of-phase combining, in the azimuth angle direction, the composite signals outputted from said plurality of electric power combining units, and for generating an analog difference signal in the elevation angle direction by out-of-phase combining, in the elevation angle direction, the composite signals outputted from said plurality of electric power combining units;
a first analog-to-digital converter for converting the analog sum signal generated by said analog monopulse comparator into a digital sum signal, and outputting said digital sum signal to said radiation pattern forming unit;
a second analog-to-digital converter for converting the analog difference signal in the azimuth angle direction generated by said analog monopulse comparator into a digital difference signal in the azimuth angle direction, and outputting said digital difference signal in the azimuth angle direction to said radiation pattern forming unit; and
a third analog-to-digital converter for converting the analog difference signal in the elevation angle direction generated by said analog monopulse comparator into a digital difference signal in the elevation angle direction, and outputting said digital difference signal in the elevation angle direction to said radiation pattern forming unit.

5. The antenna device according to claim 1, wherein said signal combining unit includes:
a plurality of analog-to-digital converters disposed respectively for said plurality of electric power combining units, for converting the analog composite signals outputted from said plurality of electric power combining units into digital composite signals and outputting said digital composite signals; and
a digital monopulse comparator for generating a digital sum signal by in-phase combining the digital composite signals outputted from said plurality of analog-to-digital converters, and outputting said digital sum signal to said radiation pattern forming unit, and for also generating a digital difference signal by out-of-phase combining the digital composite signals outputted from said plurality of electric power combining units, and outputting said digital difference signal to said radiation pattern forming unit.

6. The antenna device according to claim 2, wherein said signal combining unit includes:
a plurality of analog-to-digital converters disposed respectively for said plurality of electric power combining units, for converting the analog composite signals outputted from said plurality of electric power combining units into digital composite signals and outputting said digital composite signals; and
a digital monopulse comparator for generating a digital sum signal by in-phase combining the digital composite signals outputted from said plurality of analog-to-digital converters, for generating a digital difference signal in the azimuth angle direction by out-of-phase combining, in the azimuth angle direction, the digital composite signals outputted from said plurality of analog-to-digital converters, for generating a digital difference signal in the elevation angle direction by out-of-phase combining, in the elevation angle direction, the digital composite signals outputted from said plurality of analog-to-digital converters, and for outputting said digital sum signal, said digital difference signal in the azimuth angle direction and said digital difference signal in the elevation angle direction to said radiation pattern forming unit.

7. The antenna device according to claim 1, wherein said signal combining unit includes:
a plurality of analog-to-digital converters disposed respectively for said plurality of electric power combining units, for converting the analog composite signals outputted from said plurality of electric power combining units into digital composite signals and outputting said digital composite signals; and
a beamforming network for generating a digital sum signal by in-phase combining the digital composite signals outputted from said plurality of analog-to-digital converters, for generating a digital difference signal by out-of-phase combining the digital composite signals outputted from said plurality of said electric power combining, and for generating a signal for radiation pattern formation by weighting and combining the digital composite signals outputted from said plurality of electric power combining units, and wherein said antenna device shifts phases of the sum signal, the difference signal and the signal for radiation pattern formation, which are generated by said signal combining unit, every time the excitation phases are changed by said excitation phase changing unit, forms a radiation pattern associated with a sum pattern by time-integrating the sum signal after phase shift, forms a radiation pattern associated with a difference pattern by time-integrating the difference signal after phase shift, and forms a radiation pattern by time-integrating the signal for radiation pattern formation after phase shift.

8. The antenna device according to claim 1, wherein said excitation phase changing unit includes:
   a number-of-changes setting unit for setting a number of times of change that the excitation phases of said plurality of element antennas are to be changed;
   a phase value setting unit for setting plural sets of phase values of the excitation phases of said plurality of said element antennas, a number of said sets being equal to the number of times of change set by said number-of-changes setting unit; and
   a control unit for changing the excitation phases of said plurality of element antennas only a number of times, the number of times being equal to the number of times of change set by said number-of-changes setting unit, by controlling said plurality of phase shifters dependently on the phase values set by said phase value setting unit.

9. The antenna device according to claim 8, wherein when the number of times of change set by said number-of-changes setting unit is two, said phase value setting unit sets the phase values of the excitation phases of said plurality of said element antennas in such a way that the excitation phases of said plurality of element antennas after a first change and the excitation phases after a second change have a conjugate relation with each other.

10. The antenna device according to claim 1, wherein said radiation pattern forming unit forms the radiation pattern associated with the sum pattern by performing a discrete Fourier transform on said sum signal after phase shift, and also forms the radiation pattern associated with the difference pattern by performing a discrete Fourier transform on said difference signal after phase shift.

11. The antenna device according to claim 1, wherein said antenna device comprises:
   a number-of-changes setting unit for setting a number of times of change that the excitation phases of said plurality of element antennas are to be changed;
   a target excitation distribution setting unit for setting a target excitation distribution of said sum pattern and a target excitation distribution of said difference pattern; and
   an excitation phase computing unit for computing plural sets of phase values of the excitation phase of said plurality of element antennas from the target excitation distribution of the sum pattern and the target excitation distribution of the difference pattern, which are set by said target excitation distribution setting unit, a number of said sets being equal to the number of times of change set by said number-of-changes setting unit, and
   wherein said excitation phase changing unit changes the excitation phases of said plurality of element antennas only a number of times, the number of times being equal to the number of times of change set by said number-of-changes setting unit, by controlling said plurality of phase shifters dependently on the phase values of the excitation phases computed by said excitation phase computing unit.

12. An antenna excitation method of exciting a plurality of sub array antennas each including a plurality of element antennas for receiving signals and a plurality of phase shifters for adjusting excitation phases of said element antennas, said antenna excitation method comprising the steps of:
   in an excitation phase changing unit, changing the excitation phases of said plurality of element antennas by controlling said plurality of phase shifters;
   in each of a plurality of electric power combining units disposed respectively for said plurality of sub array antennas, combining a plurality of received signals of the plurality of element antennas included in a corresponding one of said sub array antennas into a composite signal, and outputting said composite signal;
   in a signal combining unit, generating a sum signal by in-phase combining the composite signals outputted from said plurality of electric power combining units, and also generating a difference signal by out-of-phase combining the composite signals outputted from said plurality of electric power combining units; and
   in a radiation pattern forming unit, shifting phases of the sum and difference signals generated by said signal combining unit every time the excitation phases are changed by said excitation phase changing unit, forming a radiation pattern associated with a sum pattern by time-integrating the sum signal after phase shift, and also forming a radiation pattern associated with a difference pattern by time-integrating the difference signal after phase shift.

13. The antenna excitation method according to claim 12, wherein said antenna excitation method comprises the steps of:
   in a number-of-changes setting unit included in said excitation phase changing unit, setting a number of times of change that the excitation phases of said plurality of element antennas are to be changed;
   in a phase value setting unit included in said excitation phase changing unit, setting plural sets of phase values of the excitation phases of said plurality of said element antennas, a number of said sets being equal to the number of times of change set by said number-of-changes setting unit; and
   in a control unit included in said excitation phase changing unit, changing the excitation phases of said plurality of element antennas only a number of times, the number of times being equal to the number of times of change set by said number-of-changes setting unit, by controlling said plurality of phase shifters dependently on the phase values set by said phase value setting unit.

14. The antenna excitation method according to claim 12, wherein said antenna excitation method comprises the steps of:
   in a number-of-changes setting unit, setting a number of times of change that the excitation phases of said plurality of element antennas are to be changed;
   in a target excitation distribution setting unit, setting a target excitation distribution of said sum pattern and a target excitation distribution of said difference pattern;
   in an excitation phase computing unit, computing plural sets of phase values of the excitation phase of said plurality of element antennas from the target excitation distribution of the sum pattern and the target excitation distribution of the difference pattern, which are set by said target excitation distribution setting unit, a number of said sets being equal to the number of times of change set by said number-of-changes setting unit; and in said excitation phase changing unit, changing the excitation phases of said plurality of element antennas only a number of times, the number of times being equal to the number of times of change set by said number-of-changes setting unit, by controlling said plurality of phase shifters dependently on the phase values of the excitation phases computed by said excitation phase computing unit.

* * * * *